(12) United States Patent
Okada et al.

(10) Patent No.: US 7,551,945 B2
(45) Date of Patent: Jun. 23, 2009

(54) MOBILE COMMUNICATION TERMINAL

(75) Inventors: Norio Okada, Yokohama (JP); Mihoko Hotta, Kawasaki (JP)

(73) Assignee: Panasonic Corporation, Osaka (JP)

( * ) Notice: Subject to any disclaimer, the term of this patent is extended or adjusted under 35 U.S.C. 154(b) by 225 days.

(21) Appl. No.: 10/535,566

(22) PCT Filed: Nov. 13, 2003

(86) PCT No.: PCT/JP03/14495

§ 371 (c)(1),
(2), (4) Date: May 19, 2005

(87) PCT Pub. No.: WO2004/047413

PCT Pub. Date: Jun. 3, 2004

(65) Prior Publication Data

US 2006/0050168 A1 Mar. 9, 2006

(30) Foreign Application Priority Data

Nov. 20, 2002 (JP) ............................. 2002-336563

(51) Int. Cl.
*H04M 1/00* (2006.01)
(52) U.S. Cl. ................. 455/566; 455/550.1; 455/556.1; 455/575.3; 345/169; 345/184
(58) Field of Classification Search ............. 455/550.1, 455/566, 575.1, 575.3, 556.1; 345/169, 184
See application file for complete search history.

(56) References Cited

U.S. PATENT DOCUMENTS 6,073,033 A 6/2000 Campo 6,549,789 B1* 4/2003 Kfoury ..................... 455/550.1
6,681,124 B2* 1/2004 Prior et al. .................. 455/563
6,965,413 B2* 11/2005 Wada ......................... 348/376

(Continued)

FOREIGN PATENT DOCUMENTS

EP 1 271 897 1/2003

(Continued)

OTHER PUBLICATIONS

Supplementary European Search Report.

*Primary Examiner*—George Eng
*Assistant Examiner*—Marcos L Torres
(74) *Attorney, Agent, or Firm*—Pearne & Gordon LLP

(57) ABSTRACT

Herein disclosed is a mobile communication apparatus, comprising: a body provided with a liquid crystal screen (5) having image data or character data displayed thereon, and an operating unit (6) for selectively performing operations, the body being divided into first and second housings (2 and 3) along a lateral direction perpendicular to a rotation axis; rotating means (4) for connecting the liquid crystal screen (5) with the operating unit (6) with the liquid crystal screen (5) with the operating unit (6) being rotatable with respect to each other around the rotation axis extending in the longitudinal direction of the liquid crystal screen (5) with the operating unit (6); a system control unit (21) for selectively setting predetermined operation modes in response to the rotation positions of the liquid crystal screen (5) with the operating unit (6) assumed when the liquid crystal screen (5) with the operating unit (6) are rotated with respect to each other through the rotating means (4).

2 Claims, 49 Drawing Sheets

U.S. PATENT DOCUMENTS

| | | | |
|---|---|---|---|
| 7,200,423 B2 * | 4/2007 | Bum | 455/566 |
| 2001/0004269 A1 * | 6/2001 | Shibata et al. | 348/33.06 |
| 2002/0077145 A1 | 6/2002 | Kamiya | |

FOREIGN PATENT DOCUMENTS

| | | |
|---|---|---|
| JP | 7-50711 | 2/1995 |
| JP | 8-107375 | 4/1996 |
| JP | 10-70597 | 3/1998 |
| JP | 2001-169166 | 6/2001 |
| JP | 2003-8695 | 1/2003 |
| WO | 01/84269 | 11/2001 |
| WO | 01/84729 | 11/2001 |
| WO | 02-082783 A2 | 10/2002 |

* cited by examiner

FIG.2
(a)
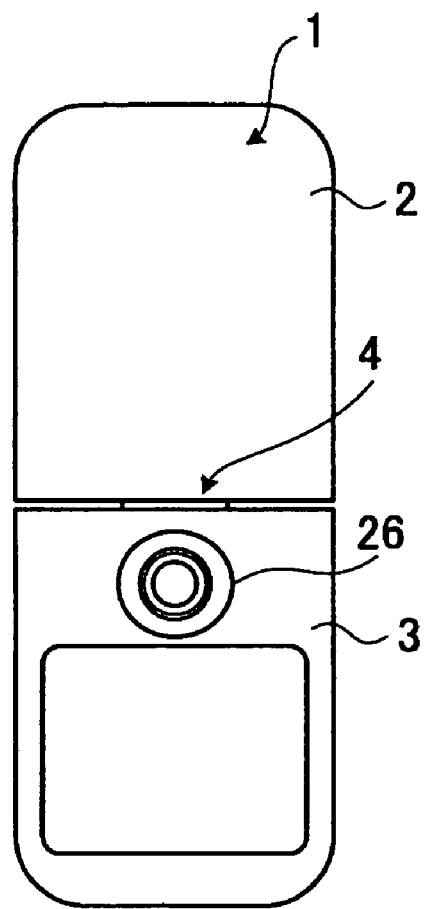
(b)
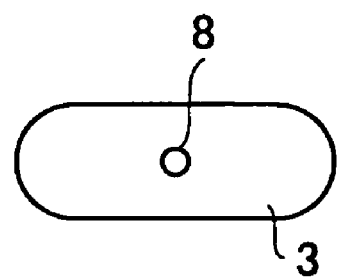

FIG.3
(a)
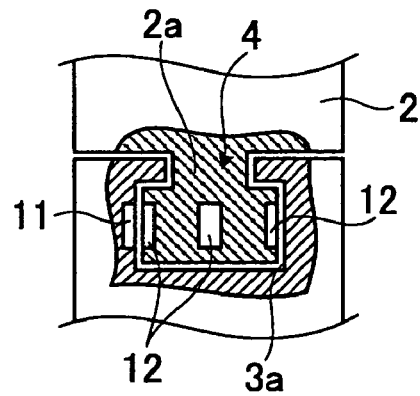
(b)
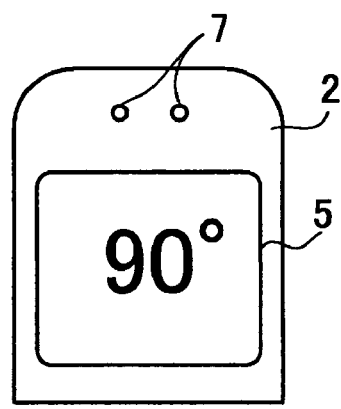
(c)
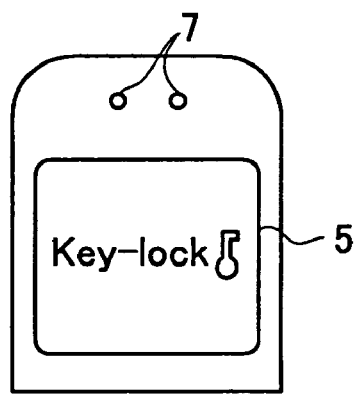

FIG.7
(a)
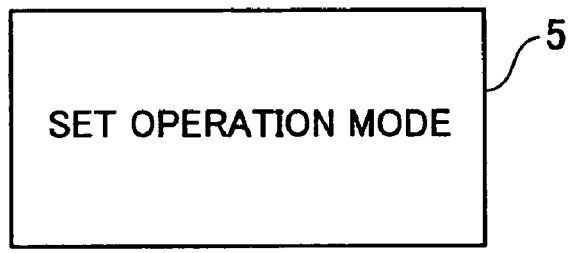
(b)
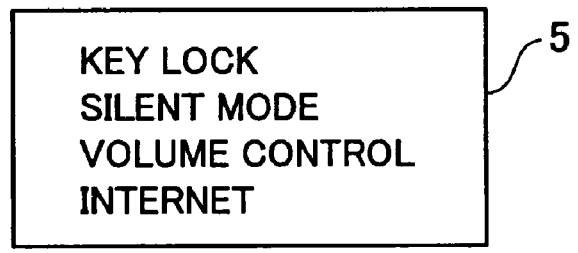
(c)
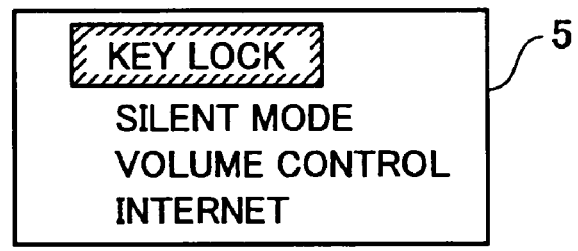
(d)
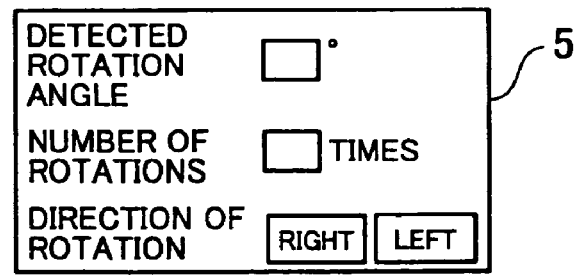

FIG.12
(a)
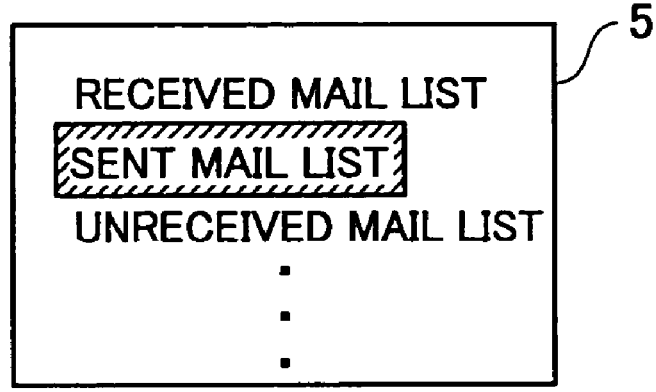
(b)
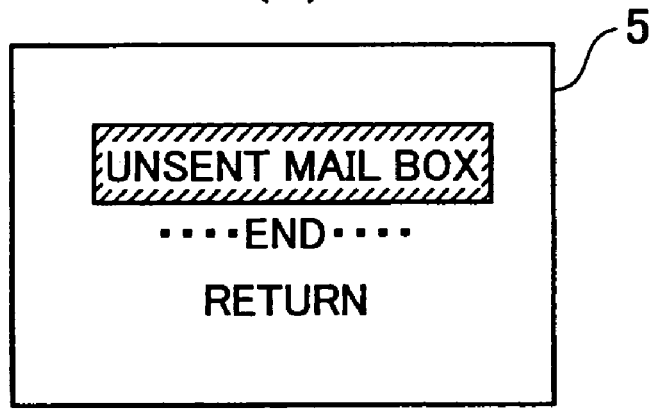
(c)
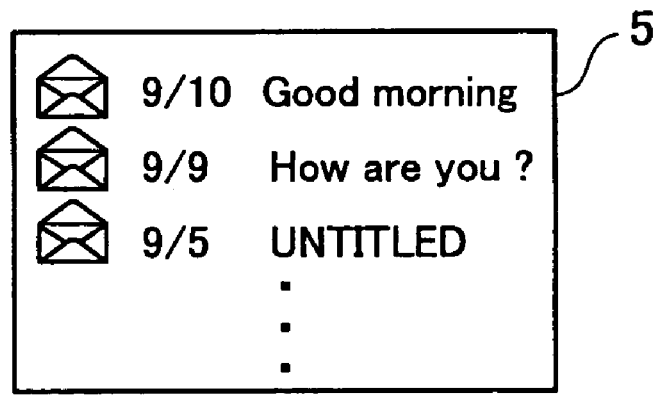

FIG.22
(a)
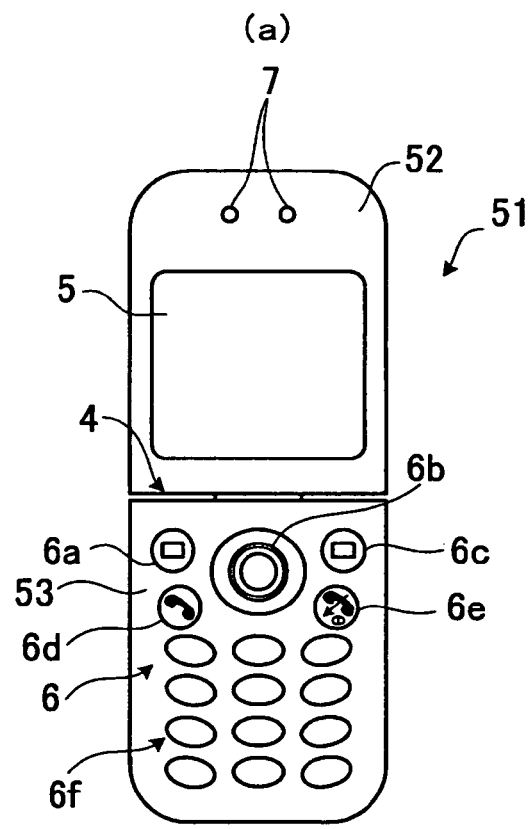
(b)
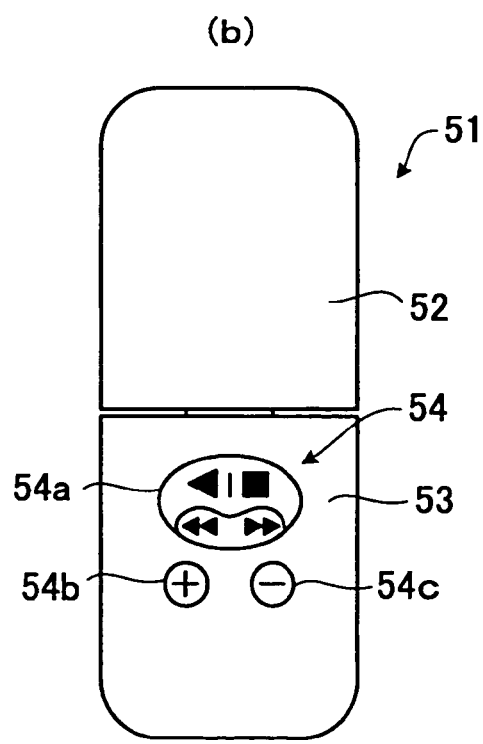

FIG.27
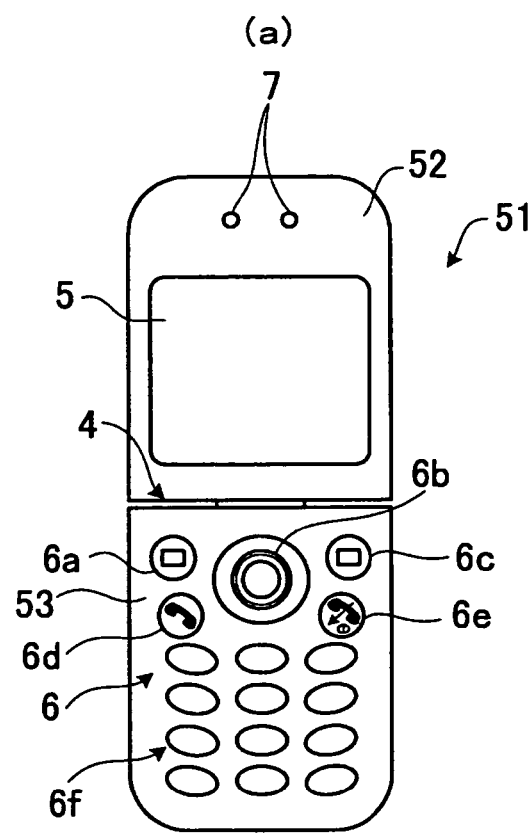
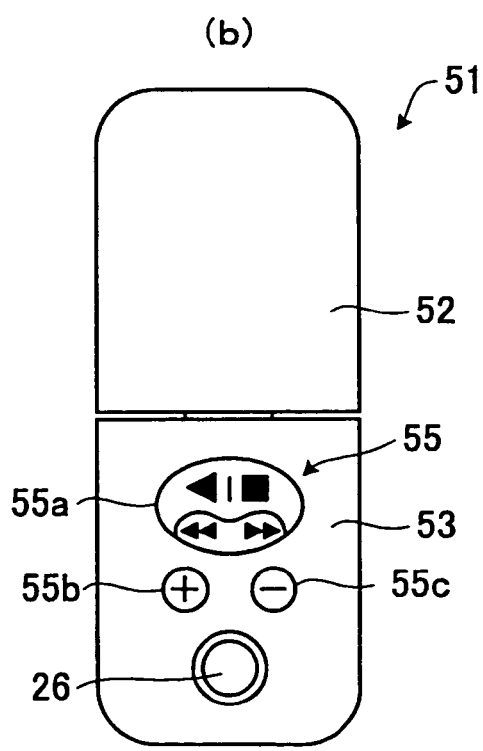

FIG.30
(a)
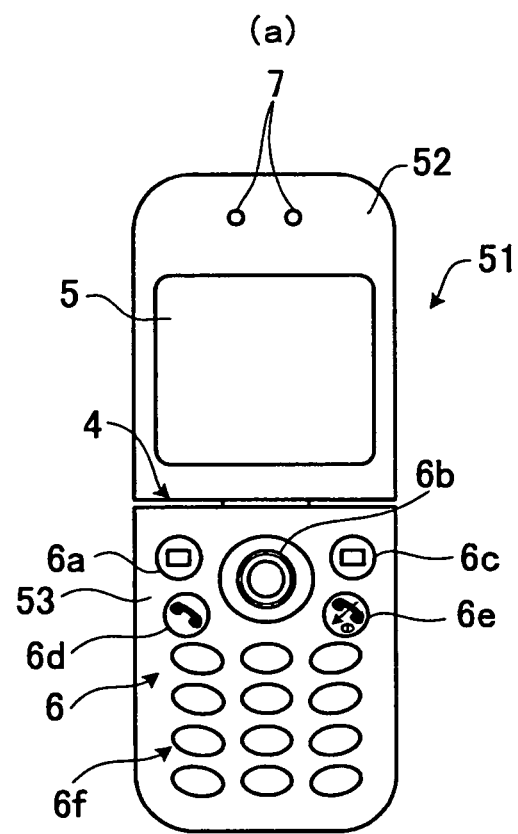
(b)
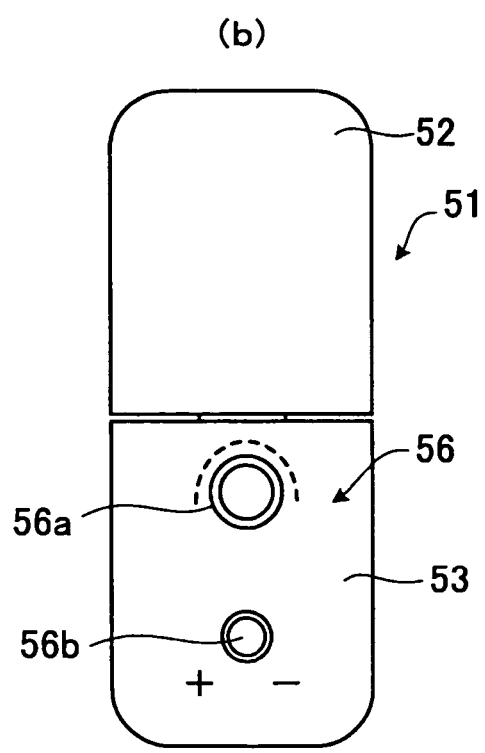

FIG.33
(a)
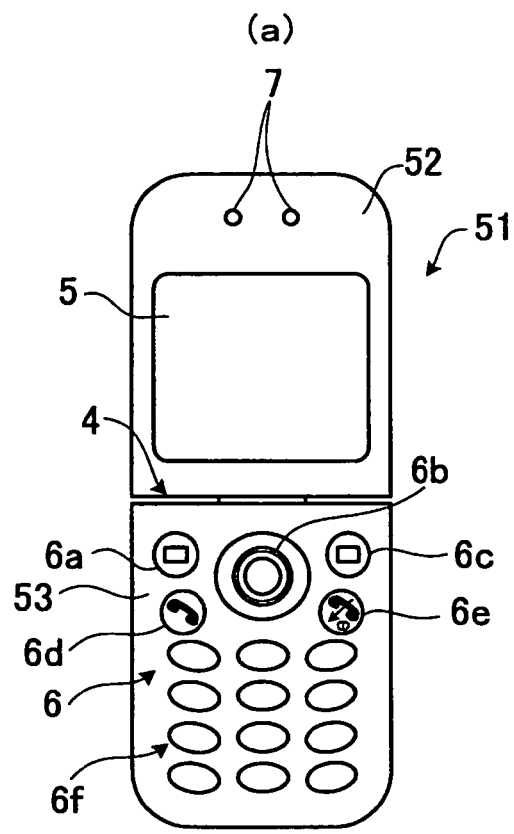
(b)
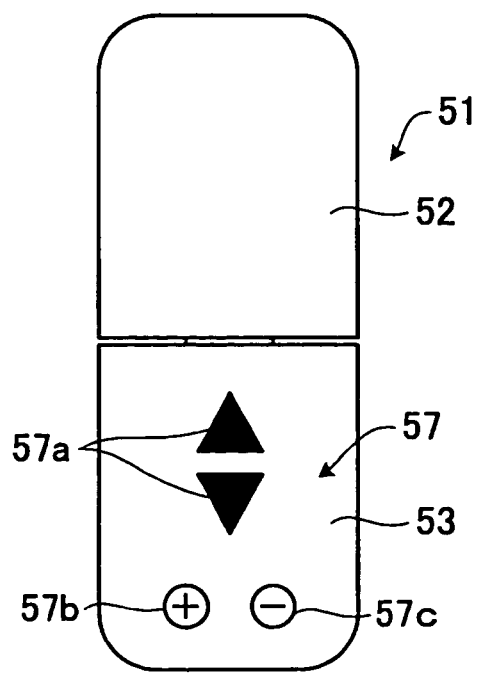

FIG.36
(a)
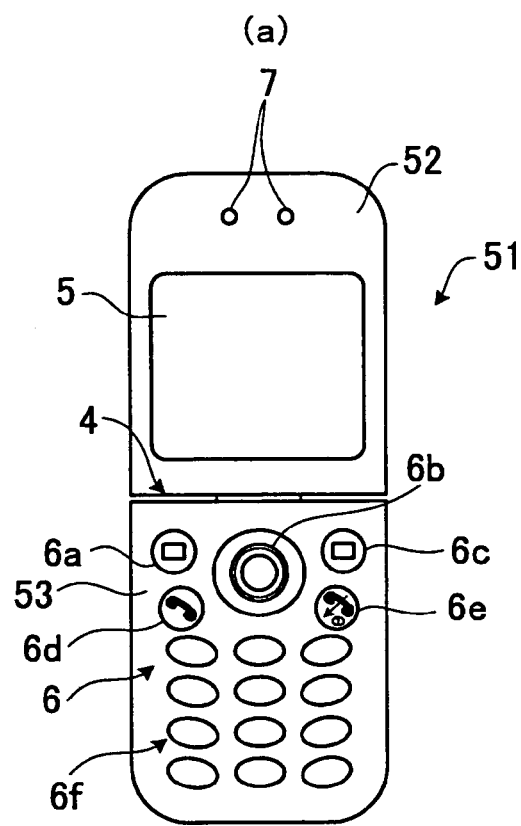
(b)
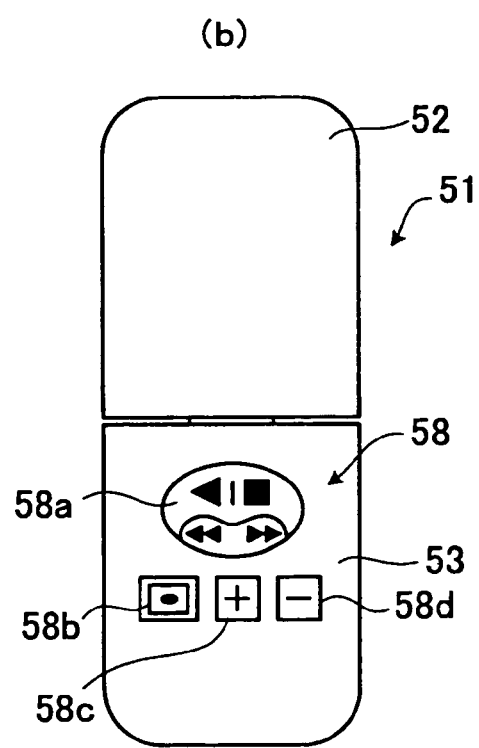

FIG.39
(a)
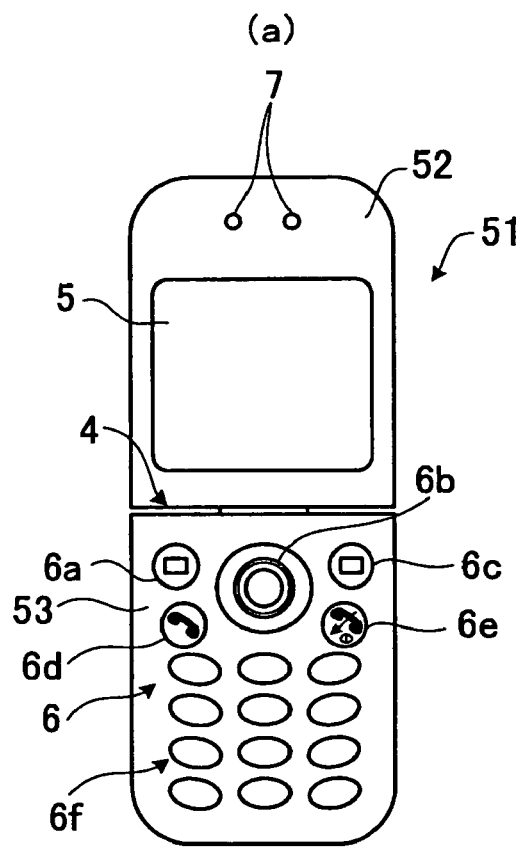
(b)
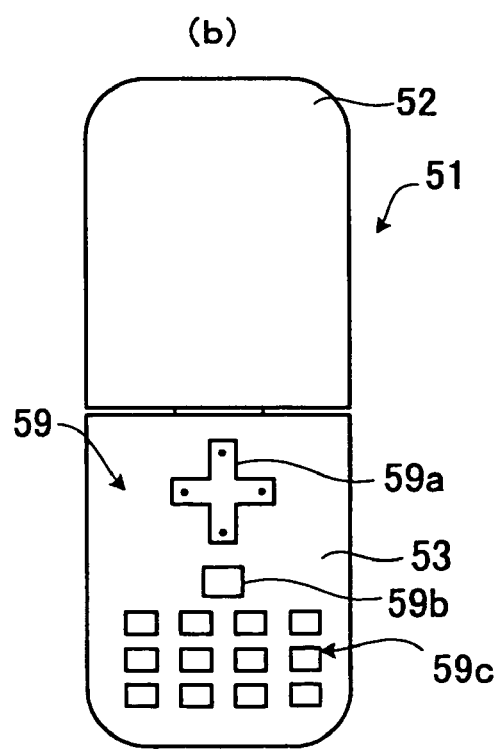

FIG.42
(a)
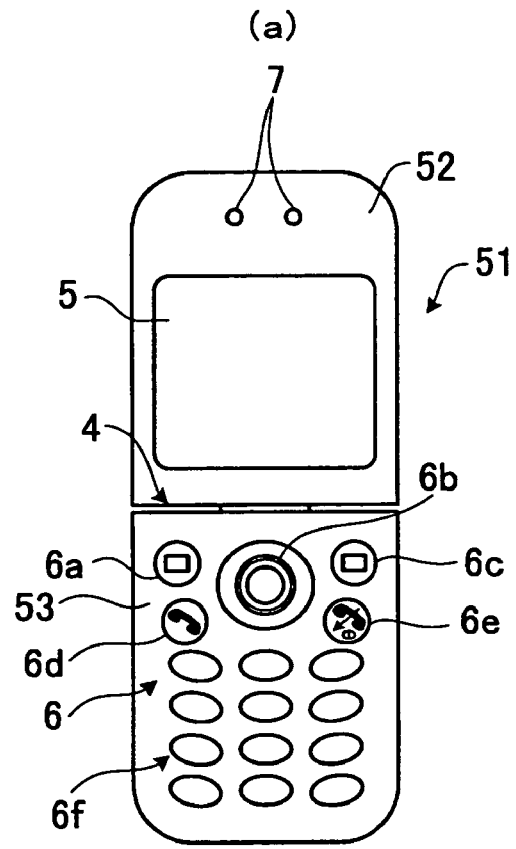
(b)
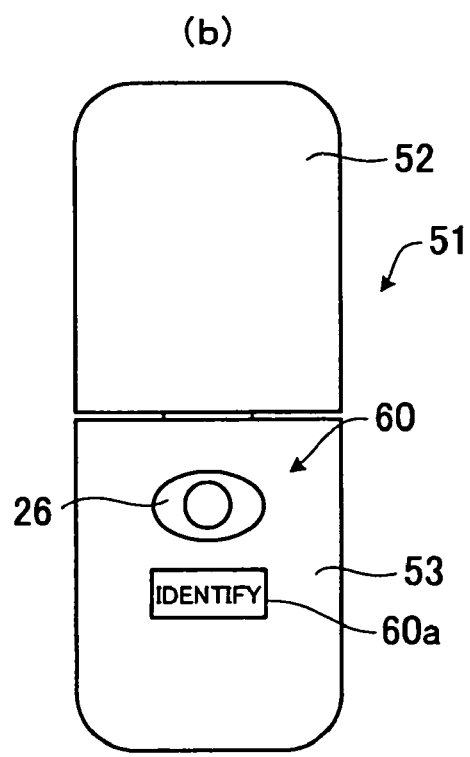

FIG.47
(a)
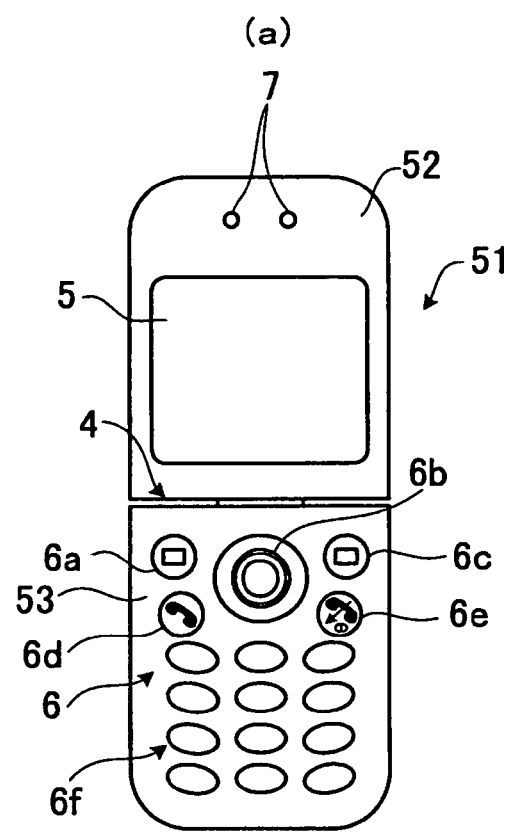
(b)
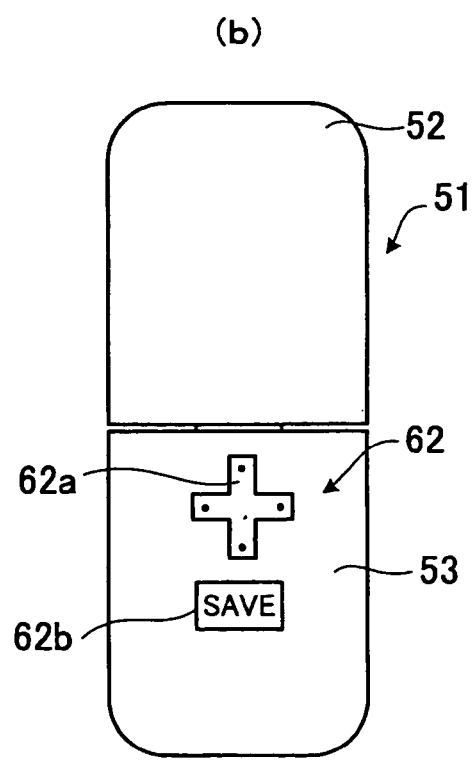

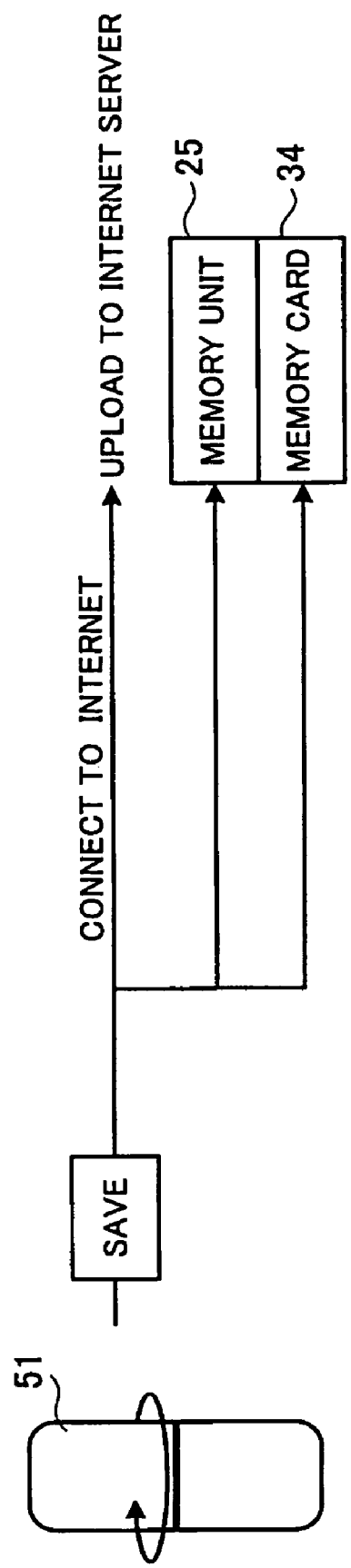

MOBILE COMMUNICATION TERMINAL

TECHNICAL FIELD OF THE INVENTION

The present invention relates to a mobile communication apparatus such as for example a cellular phone having a function for transmitting a near-end speaker's voice and receiving a near-end speaker's voice.

DESCRIPTION OF THE RELATED ART

In general, the mobile communication apparatus such as a cellular phone comprises a body having a surface on which both an operating unit and a display unit are provided. The mobile communication apparatus selectively performs operations for transmitting a near-end speaker's voice, receiving a near-end speaker's voice, connecting the Internet, transmitting and receiving e-mails when the control keys and the numeric keys are selectively operated by a user on the basis of the information displayed by the display unit.

In recent years, there have been used a variety of cellular phones of this type one typical example of which comprises an imaging device such as a camera unit rotatably provided in its body. The camera unit is operative to take an image of an object when the operation key is operated by the user under the camera unit being pointed at the object while the image of the object being watched by the user (see, for example, Japanese Patent Laying-Open Publication No. H08-107375).

The conventional cellular phone, however, encounters such a problem that the operation keys such as control keys and numeric keys are relatively small. Accordingly, the relatively small operation keys tend to force the user to perform a tedious operation even if the key operation is simple and easy.

It is, therefore, an object of the present invention to provide a mobile communication apparatus which can provide an enhanced operationality to allow predetermined operation modes to be easily and selectively switched by the user.

DISCLOSURE OF THE INVENTION

In accordance with the present invention, there is provided a mobile communication apparatus, comprising: displaying means for displaying image data or character data on a screen; operating means for selectively performing operations; rotating means for connecting the displaying means with the operating means with the displaying means and the operating means being rotatable with respect to each other around a rotation axis extending in the longitudinal direction of the displaying means and the operating means; setting means for selectively setting predetermined operation modes in response to the rotation positions of the displaying means and the operating means assumed when the displaying means and the operating means are rotated with respect to each other through the rotating means.

The mobile communication apparatus thus constructed as previously mentioned can provide an enhanced operationality to selectively set the predetermined operation modes with the liquid crystal screen being rotated with respect to the operating means through the rotating means with no key operation.

The rotation position of the liquid crystal screen being rotated with respect to the operating means makes it possible to allow its current operation mode to easily recognized by the user by reason that the predetermined operation modes are selectively set with the liquid crystal screen being rotated with respect to the operating means through the rotating means with no key operation.

The mobile communication apparatus may further comprises a body provided with the displaying means and the operating means and divided into at least two housings along a lateral direction perpendicular to the rotation axis, the housings being pivotably connected by the connecting means.

The mobile communication apparatus thus constructed as previously mentioned can provide an enhanced operationality to selectively set the predetermined operation modes with the liquid crystal screen being rotated with respect to the operating means through the rotating means with no key operation.

The rotation position of the liquid crystal screen being rotated with respect to the operating means makes it possible to allow its current operation mode to easily recognized by the user by reason that the predetermined operation modes are selectively set with the liquid crystal screen being rotated with respect to the operating means through the rotating means with no key operation.

In the mobile communication apparatus, the housings are constituted by a screen side housing having the displaying means accommodated therein, and an operating panel side housing having the operating means accommodated therein.

The mobile communication apparatus thus constructed as previously mentioned can provide an enhanced operationality by reason that each of the screen side housing and the operating panel side housing is larger than each operation key, the predetermined operation modes are selectively set with the screen side housing being rotated with respect to the operating panel side housing, In the mobile communication apparatus, the rotating means includes a rotation shaft provided in one of the housings, and a retaining unit provided in the other of the housings to allow the rotation shaft to be rotatable around the rotation axis.

The rotating means of the mobile communication apparatus thus constructed as previously mentioned can be simple in construction to allow one of the housings to be rotated with respect to the other of the housings.

The mobile communication apparatus further comprises rotation angle detecting means for detecting the rotation angle of the rotating means. The setting means is operative to selectively set the operation modes in response to the rotation angle detected by the rotation angle detecting means.

The mobile communication apparatus thus constructed as previously mentioned can systematically switch operation modes. For example, the mobile communication apparatus can set the key lock mode or the silent mode when the judgment is made that the housings is in inverted relationship with respect to each other on the basis of the rotation angle detected by the rotation angle detecting means. The mobile communication apparatus can set the telephone mode when the judgment is made that the housings is in non-twisted relationship with respect to each other on the basis of the rotation angle detected by the rotation angle detecting means.

The mobile communication apparatus may further comprise a camera unit accommodated in the operating panel side housing.

The mobile communication apparatus thus constructed as previously mentioned can easily take others portrait image by allowing the image displayed on the screen to be watched by the user under the condition that the camera unit is being pointed at others, and easily take self portrait image by allowing the image displayed on the screen to be watched by the user under the condition that the camera unit is being pointed at the user by reason that the camera unit is accommodated in the second housings. The mobile communication apparatus thus constructed as previously mentioned can easily allow the camera unit to be rotated by the user with no rotating mechanism for allowing the camera unit to be pointed to an object. The mobile communication apparatus thus constructed as previously mentioned can easily allow the camera unit to be pointed at the object by reason that the camera unit is provided on the rear surface of the second housing and on the rotation axis.

The mobile communication apparatus has additional operation modes and further comprises sub-operating means for operating the additional operation modes, the sub-operating means being provided on one surface opposite to other surface on which the operating means is provided. The setting means is operative to set a telephone mode when the display means accommodated in one of the housings and the operating means accommodated in the other of the housings are in non-twisted relationship with each other. The setting means is operative to set an additional operation mode when the display means accommodated in one of the housings and the sub-operating means accommodated in the other of the housings are in non-twisted relationship with each other.

The mobile communication apparatus thus constructed as previously mentioned can easily switch between the telephone mode and the additional mode. The mobile communication apparatus can function as a cellular phone to allow the user to have a phone call, or making a phone call when the liquid crystal screen of the screen side housing and the operating unit of the operating unit side housing are in non-twisted relationship with each other. The mobile communication apparatus can function as an additional device when the liquid crystal screen of the screen side housing and the operating unit of the operating unit side housing are in inverted relationship with each other.

BRIEF DESCRIPTION OF THE DRAWINGS

The features and advantages of a mobile communication apparatus according to the present invention will be more clearly understood from the following description taken in conjunction with the accompanying drawings:

FIG. 2(a) is a front view showing a cellular phone according to the first embodiment of the present invention; FIG. 2(b) is a bottom view showing a cellular phone according to the first embodiment of the present invention;

FIG. 3(a) is a fragmental cross-sectional view showing the rotating means of the cellular phone according to the first embodiment of the present invention; FIG. 3(b) is a fragmental front view showing the screen, forming part of the cellular phone according to the first embodiment of the present invention, on which the rotation angle of the screens of the LCD device with respect to the operating means is being displayed; FIG. 3(c) is a fragmental front view showing the screen, forming part of the cellular phone according to the first embodiment of the present invention, on which the current mode is being displayed;

FIG. 7 is a schematic views each showing a screen on which the information is displayed in the user setting mode of the cellular phone according to the first embodiment of the present invention;

FIG. 12 is schematic views each showing a screen on which the information is displayed in layer scrolling mode of the cellular phone according to the first embodiment of the present invention;

FIG. 22(a) is a front view showing the cellular phone according to the second embodiment of the present invention, FIG. 22(b) is a rear view showing the cellular phone according to the second embodiment of the present invention;

FIG. 27(a) is a front view showing the cellular phone according to the third embodiment of the present invention, FIG. 27(b) is a rear view showing the cellular phone according to the third embodiment of the present invention;

FIG. 30(a) is a front view showing the cellular phone according to the fourth embodiment of the present invention, FIG. 30(b) is a rear view showing the cellular phone according to the fourth embodiment of the present invention;

FIG. 33(a) is a front view showing the cellular phone according to the fifth embodiment of the present invention, FIG. 33(b) is a rear view showing the cellular phone according to the fifth embodiment of the present invention;

FIG. 36(a) is a front view showing the cellular phone according to the sixth embodiment of the present invention, FIG. 36(b) is a rear view showing the cellular phone according to the sixth embodiment of the present invention;

FIG. 39(a) is a front view showing the cellular phone according to the seventh embodiment of the present invention, FIG. 39(b) is a rear view showing the cellular phone according to the seventh embodiment of the present invention;

FIG. 42(a) is a front view showing the cellular phone according to the eighth embodiment of the present invention, FIG. 42(b) is a rear view showing the cellular phone according to the eighth embodiment of the present invention;

FIG. 47(a) is a front view showing the cellular phone according to the tenth embodiment of the present invention, FIG. 47(b) is a rear view showing the cellular phone according to the tenth embodiment of the present invention;

FIG. 49 is a schematic view showing available functions in the backup mode of the cellular phone according to the tenth embodiment of the present invention.

DESCRIPTION OF THE PREFERRED EMBODIMENTS

First Embodiment

Figure 1:
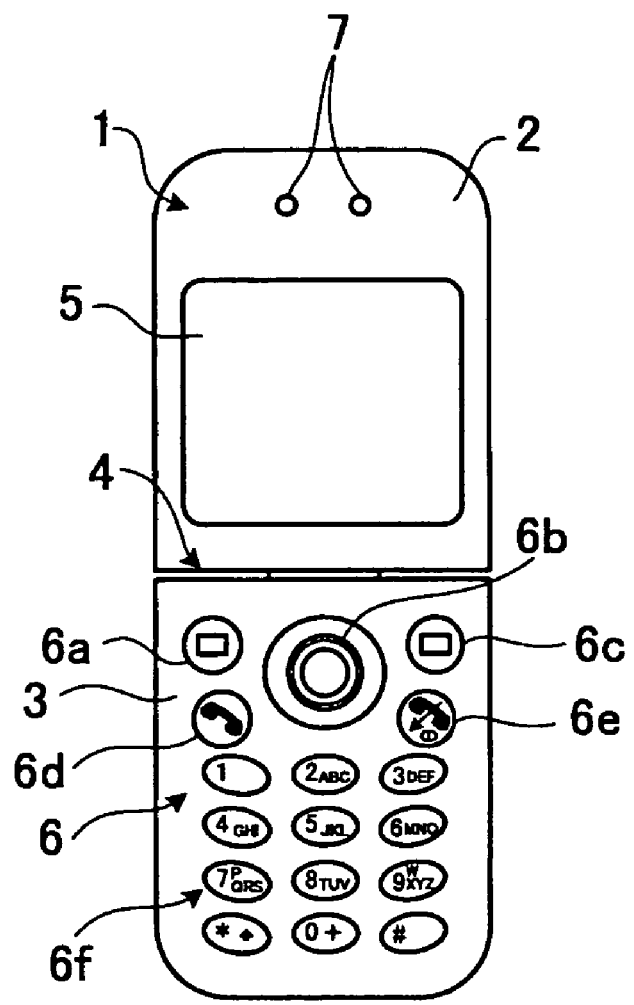
FIG. 1 is a front view showing, as a first embodiment of the cellular phone according to the present invention, a cellular phone.

The preferred embodiments of the mobile communication apparatus according to the present invention will now be described hereinafter in accordance with accompanying drawings. Referring now to the drawings, in particular to FIGS. 1 to 21, there is shown a first embodiment of the mobile communication apparatus to be exemplified by a cellular phone, a personal handy-phone (PHS), and a fixed-line phone.

The constitution of the first embodiment of the mobile communication apparatus according to the present invention will be described hereinafter with reference to FIGS. 1 and 2. The cellular phone 1 is shown, as the mobile communication apparatus, in FIGS. 1 and 2 as comprising a body having first and second housings (a screen unit side housing and an operating unit side housing) 2 and 3 each having a rotation axis, and a supporting means 4 intervening between the first and second housings 2 and 3 to allow one of the first and second housings 2 and 3 to be rotatably moved around the rotation axis of the other of the first and second housings 2 and 3.

The cellular phone 1 further comprises a liquid crystal display device having a screen (liquid crystal screen) 5 to display an image represented by image and character data on the screen, and a speaker unit 7 for outputting one's voice. The liquid crystal screen 5 is provided, as display means, on a front surface of the first housing 2, while the speaker unit 7 is provided in an upper portion of the first housing 2.

The cellular phone 1 further comprises an operating unit 6 to be provided, as operating means, on a front surface of the second housing 3. The operating unit 6 has a mail key 6a, a control key 6b, an address book key 6c, an on-hook key 6d, an off-hook key 6e, and numeric keys 6f. When the mail key 6a is operated by the user, the operating unit 6 is operative to selectively issue instruction to display one or more incoming e-mails on the screen, or to display e-mail in process of creation on the screen. When the control key 6b is operated by the user, the operating unit 6 is operative to issue an instruction to scroll the image down on the screen, or to scroll the image up on the screen. When the address book key 6c is operated by the user, the operating unit 6 is operative to issue an instruction to display the address book on the screen. When the off-hook key 6c is operated by the user, the operating unit 6 is operative to issue an instruction to start off-hook or other operations. When the on-hook key 6d is operated by the user, the operating unit 6 is operative to issue an instruction to complete operations in on-hook state.

The cellular phone 1 further comprises a microphone unit 8 which is provided in the bottom portion of the second housing 3 to receive one's voice, and a camera unit 26 provided, as an imaging device, on the rotation axis of each of the first and second housings 2 and 3 to take an image of an object.

As shown in FIG. 3(a), the rotating means 4 includes a rotation shaft 2a provided in a bottom portion of the first housing 2 (one of the housings), and a groove portion (retaining unit) 3a provided in an upper portion of the second housing 3 (the other of the housings) to allow the rotation shaft to be rotatable around the rotation axis. Accordingly, the first and second housings 2 and 3 are rotatable around the rotation axis under the condition that the rotation shaft 2a is rotatably received by the groove portion 3a.

Here, the rotating means may include a rotation shaft provided in a bottom portion of the second housing, and a groove portion (retaining unit) provided in an upper portion of the first housing to allow the rotation shaft to be rotatable around the rotation axis. It is important that the rotating means intervenes between the first and second housings 2 and 3 to allow the first and second housing to be rotatable around the rotation axis with respect to each other.

The terminals 12 are equiangularly provided on the side surface of the rotation shaft 2a with right angles, while the terminal 11 are provided on the cylindrical surface of the groove portion (retaining unit) 3a. The terminal 11 and one of the terminals 12 are in face-to-face relationship with each other when the liquid crystal screen 5 and the operating unit 6 are held in non-twisted relationship with each other.

When the first and second housings 2 and 3 are rotated with respect to the operating unit 6, the judgment is made on whether or not the first and second housings 2 and 3 are rotated by an angle of 90 degrees with respect to each other after judging that the liquid. crystal screen 5 and the operating unit 6 are in non-twisted relationship with each other, or on whether or not the first and second housings 2 and 3 are rotated by an angle of 180 degrees with respect to each other after judging that the liquid crystal screen 5 and the operating unit 6 are in non-twisted relationship with each other. Here, the voltages of the terminals 11 may be different from each other. In this case, the judgment is made on whether the first and second housings 2 and 3 are rotated with respect to the operating unit 6 in the clockwise direction or in the counter-clockwise direction on the basis of the voltage deference between two terminals 11 adjacent to each other.

The hardware constitution of the cellular phone 1 according to the first embodiment of the present invention will be described hereinafter with reference to FIG. 4.

Figure 4:
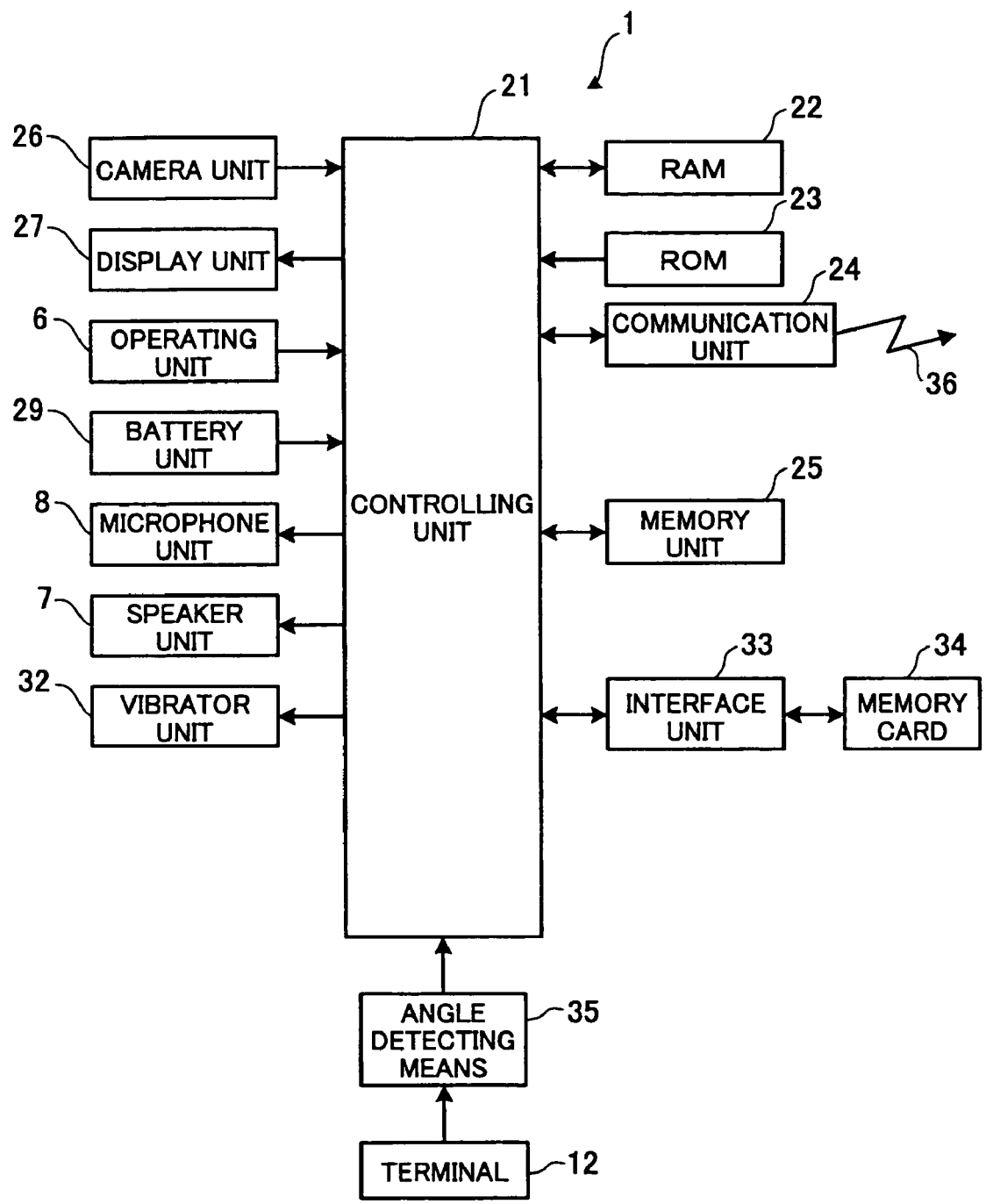
FIG. 4 is a block diagram showing a first embodiment of the cellular phone according to the present invention.

As shown in FIG. 4, the cellular phone 1 comprises a system control unit 21, a random access memory (RAM) 22, a read only memory (ROM) 23, a communication system control unit 24, a memory unit 25, an external memory interfacing unit 33, a camera unit 26, a screen unit 27, an operating unit 6, a battery unit 29, a microphone unit 8, a speaker unit 7, a vibrator unit 32, and a rotation angle detecting unit 35.

The system control unit 21 is operative to execute a program stored in the ROM 23 to totally control the cellular phone 1. The RAM 22 has a memory space, defined as a work area, to has stored therein data which is utilized on the basis of the program executed by the system control unit 21.

The communication control unit 24 is operative to detect an incoming phone call, to make an outgoing phone call, and to perform the voice communication with a far-end communication apparatus through a communication network.

When the incoming phone call is detected by the communication control unit 24, the system control unit 21 is operative to allow the user to receive a message on whether or not the incoming phone call is detected by the communication control unit 24 by selectively having the speaker unit 7 and the vibrator unit 32 output a ringtone or a vibration. Here, the information on whether to have the speaker unit 7 output a ringtone or to have the vibrator unit 32 output a vibration is previously inputted through the operating unit 6.

The memory unit 25 has, as a telephone number book, telephone number data and e-mail address data stored therein. The memory unit 25 may further have data such as for example ringing melodies and images of idles stored therein, the data being obtained through the Internet-access service.

The interface unit 33 is electrically and detachably connected to the publicly-known memory card 34 which may have data such as for example ringing melodies and images of idles stored therein, the data being obtained through the Internet-access service. The interface unit 33 may be operative to receive the data such as for example ringing melodies and images of idles from the memory card 34, and to store the data such as for example ringing melodies and images of idles in the memory unit 25.

The camera unit 26 is constituted by electronic elements such as for example a charge-coupled device (CCD). When the image is taken by the camera unit 26, the analog-to-digital conversion of the image data is performed by an analog to digital converter (not shown), the digitized image data being stored in the memory unit 25 or the memory card 34.

The display unit 27 is constituted by a liquid crystal display device (LCD device) having a screen. The display unit 27 is operative to display on the screen 5 an image having information such as for example date, time, remaining battery level, region within or outside of the communication range, an image in a standby mode, and a message of an incoming mail.

The operating unit 6 has a plurality of control keys 6a to 6f. When the control keys 6a to 6f are selectively operated by the user, the operating unit 6 is operative to selectively issue an instruction to the system control unit 21 to selectively assume an on-hook state and an off-hook state, or to perform an operation of creating and transmitting e-mail, or an operation of connecting to the Internet to download or upload the image data and character data.

The battery unit 29 is operative to supply an electric power to electronic elements such as the system control unit 21 of the cellular phone 1. The battery unit 29 can be rechargeable from an external electric source.

The microphone unit 8 is operative to convert an inputted voice to a voice signal to be transmitted to a far-end speaker's communication apparatus through the system control unit 21, while the speaker unit 7 is operative to output a sound represented by an inputted voice signal, or a ringtone through the system control unit 21.

The rotation angle detecting means 35 has a terminal 11 to detect the rotation angle and the rotation direction of the first housing 2 with respect to the second housing 3 by detecting a terminal 12 provided on a surface of the rotation shaft 2a, and to produce a signal to be outputted to the system control unit 21, the signal being indicative of the rotation angle and the rotation direction of the first housing 2 with respect to the second housing 3.

Figure 5:
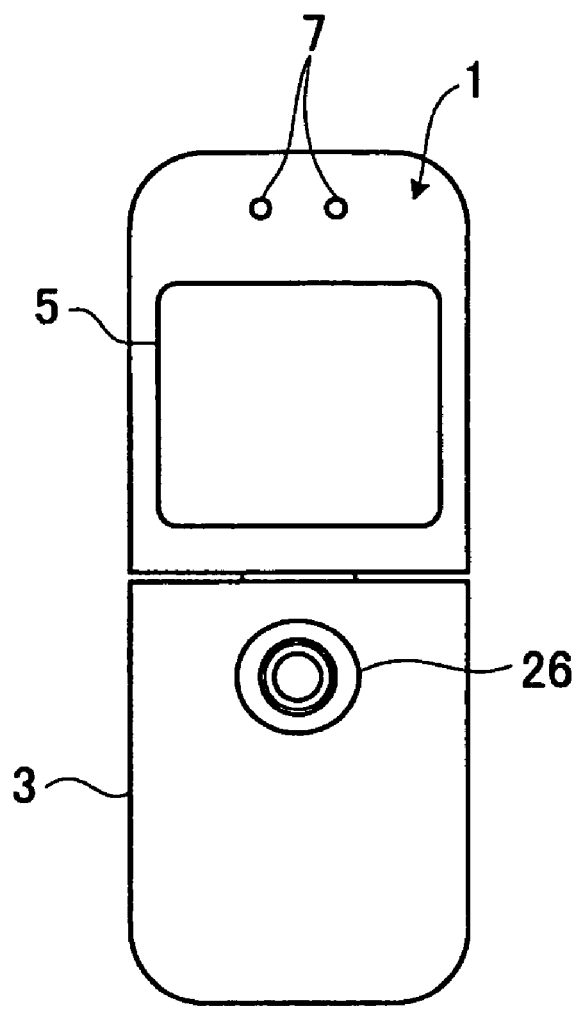
FIG. 5 is a schematic view showing the cellular phone assuming a state in which the first and second housings is in inverted relationship with each other, according to the second embodiment of the present invention; showing the first and second housings being in inverted relationship with respect to each other, the first and second housings each forming part of the cellular phone according to the first embodiment of the present invention.

The system control unit 21 is operative to selectively set the operation modes in response to the signal outputted by the rotation angle detecting means 35. When the liquid crystal screen 5 and the operating unit 6 are in non-twisted relationship with each other (in other words, the liquid crystal screen 5 and the operating unit 6 are in inverted relationship with each other as shown in FIG. 5) as a result of the fact that the first and second housings 2 and 3 are rotated by an angle of 180 degrees with respect to each other, the cellular phone 1 assumes the key lock mode to prevent the operating unit 6 from selectively issuing instructions with the control keys being selectively operated by the user, or the silent mode to prevent the speaker unit 7 from outputting the ringing sound. When the liquid crystal screen 5 and the operating unit 6 are in non-twisted relationship with each other (in other words, the liquid crystal screen 5 and the operating unit 6 are in inverted relationship with each other as shown in FIG. 5), the judgment is made on whether or not the first and second housings 2 and 3 are rotated by an angle of 180 degrees with respect to each other. When the first and second housings 2 and 3 are rotated by an angle of 180 degrees with respect to each other, the cellular phone 1 assumes the key lock mode to prevent the operating unit 6 from selectively issuing instructions with the control keys being selectively operated by the user, or the silent mode to prevent the speaker unit 7 from outputting the ringing sound. When the first and second housings 2 and 3 are further rotated by an angle of 180 degrees with respect to each other, in other words, the liquid crystal screen 5 and the operating unit 6 are in non-twisted relationship with each other, the cellular phone 51 assumes the telephone mode to allows the user to receive a phone call, or to make a phone call by set the off-hook function. In this embodiment, the system control unit 21 constitute setting means for selectively setting operation modes in response to the rotation positions of the displaying means and the operating means assumed when the displaying means and the operating means are rotated with respect to each other through the rotating means.

When the signal is received by the system control unit 21 from the rotation angle detecting means 35, the rotation angle of the liquid crystal screen 5 with respect to the operating unit 6 may be displayed on the liquid crystal screen 5 as shown in FIG. 3(b).

Each of the microphone unit 8, the system control unit 21, the memory unit 35, and other electronic devices of the cellular phone 1 is provided in any one of the first and second housings 2 and 3. Each of the rotation shaft 2a and the groove portion (retaining unit) 3a is provided with signal lines to ensure that the electronic devices of one of the first and second housings 2 and 3 performing communication with the electronic devices of the other of the first and second housings 2 and 3 through the signal lines.

The operation of the cellular phone 1 according to the first embodiment of the present invention will be described hereinafter with reference to FIGS. 6 to 21.

In this embodiment, the cellular phone 1 may primarily set, as a factory default, each of the operation modes on the basis of the axial rotation at the factory in preset step. The cellular phone 1 may set each of the operation modes on the basis of the axial rotation by user if necessary.

Figure 6:
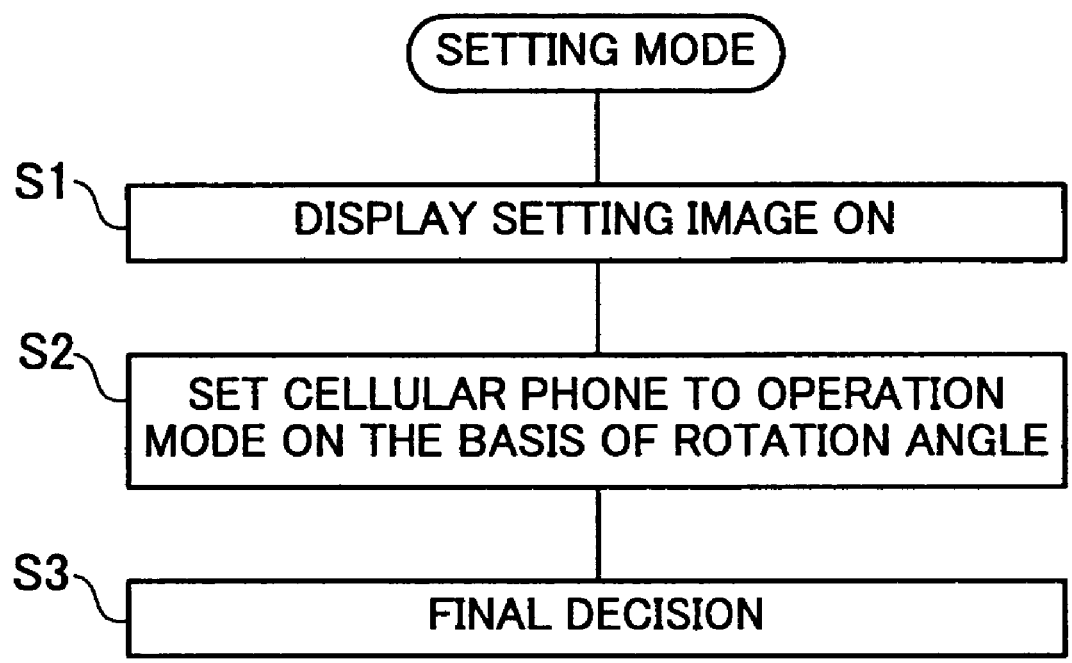
FIG. 6 is a flowchart showing an operation in the user setting mode of the cellular phone according to the first embodiment of the present invention.

The user setting operation is performed by the cellular phone 1 according to the first embodiment on the basis of the flowchart shown in FIG. 6. The information on the function is firstly displayed on the liquid crystal screen 5 (in the step S1).

When the information on the function is displayed on the liquid crystal screen 5 in the step S1 as shown in FIG. 7(a), the judgment is made on whether or not the control key 6b is pushed by the user. When the control key 6b is pushed by the user, the information on the operation modes such as a key lock mode, a silent mode, a volume adjusting mode, a layer scrolling mode, a saving mode, a camera mode, an internet mode, and an e-mail mode is displayed on the liquid crystal screen 5.

The operation information on the shaft rotation of the liquid crystal screen 5 with respect to the operating unit 6 is then set in response to the selected operation mode (in the step S2). More specifically, the information displayed on the liquid crystal screen 5 is scrolled up or scrolled down by the control key 6b. One of the operation modes, for example, "key lock" is then selected by the control key 6b as shown in FIG. 7(c). The operation information on the shaft rotation of the liquid crystal screen 5 with respect to the operating unit 6, to be set in response to the selected operation mode, i.e., key lock mode, is displayed on the liquid crystal screen 5. The rotation angle and the rotation direction of shaft rotation with respect to the key lock mode are inputted on the basis of the operation information displayed on the liquid crystal screen 5. The rotation angle and the rotation direction are then registered as the shaft rotation information with respect to the key lock mode when the control key 6b is pushed by the user (in the step S3).

The setting method of having the cellular phone 51 assume each of a key lock mode, a silent mode, a volume adjusting mode, a layer scrolling mode, a save mode, a camera mode, an internet mode, and a mailer mode is the same as the setting method descried with reference to FIG. 6. The operation of the system control unit 21 of the cellular phone 1 in each of a key lock mode, a silent mode, a volume adjusting mode, a layer scrolling mode, a save mode, a camera mode, an internet mode, and a mailer mode will be described hereinafter with reference to FIGS. 8 to 10, 12, 13, 15, 17, 19, and 20.

(Key Lock Mode and Silent Mode)

Figure 8:
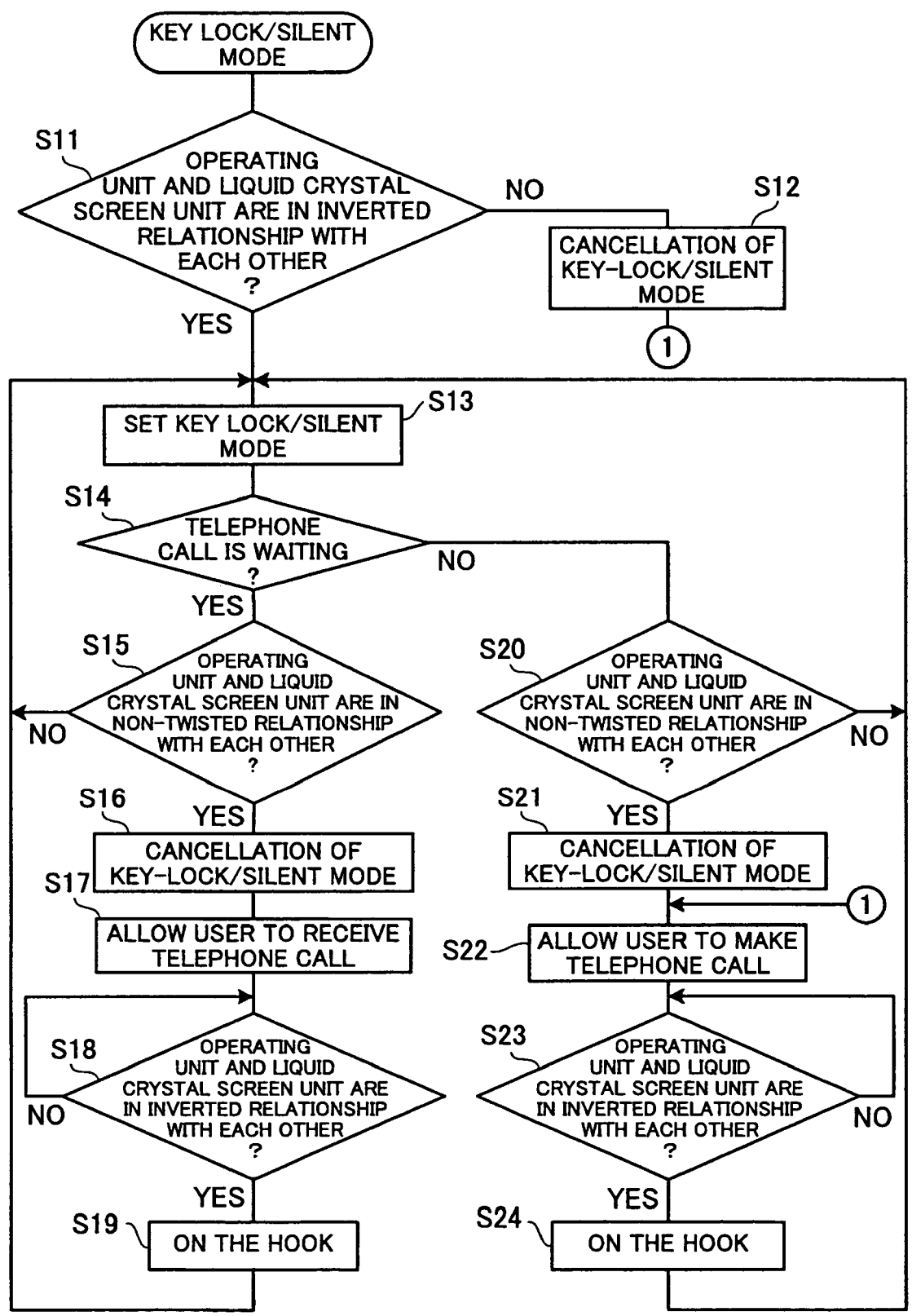
FIG. 8 is a flowchart showing an operation in the key lock mode and in the silent mode of the cellular phone according to the first embodiment of the present invention.

In FIG. 8, the first and second housings 2 and 3 are in a primitive state in which the direction of the liquid crystal screen 5 is substantially the same as the direction of the operating unit 6, in other words, the liquid crystal screen 5 and the operating unit 6 are in non-twisted relationship with each other. The judgment is made on whether or not the first and second housings 2 and 3 are rotated by an angle of 180 degrees with respect to each other when the liquid crystal screen 5 and the operating unit 6 are in non-twisted relationship with each other, in other words, the liquid crystal screen 5 and the operating unit 6 are in inverted relationship with each other as shown in FIG. 5. When the liquid crystal screen 5 and the operating unit 6 are in inverted relationship with each other, the cellular phone 51 assumes a key lock mode or a silent mode.

The judgment is then made by the system control unit 21 (in the step S11) on whether or not the liquid crystal screen 5 and the operating unit 6 are held in inverted relationship with each other. When the liquid crystal screen 5 and the operating unit 6 are not held in inverted relationship with each other, the cellular phone 51 fails to keep on assuming the key lock mode or the silent mode (in the step S12). When, on the other hand, the liquid crystal screen 5 and the operating unit 6 are held in inverted relationship with each other, the cellular phone 51 keeps on assuming the key lock mode or the silent mode (in the step S13). When the judgment is made (in the step S14) that the phone call is receiving in the key lock mode or in the silent mode, the judgment is made (in the step S15) on whether or not the first and second housings 2 and 3 are rotated by an angle of 180 degrees with respect to each other, in other words, the liquid crystal screen 5 and the operating unit 6 are in non-twisted relationship with each other, the cellular phone 51 assumes the telephone mode without keeping on assuming the key lock mode or the silent mode (in the step S16). When the off-hook key 6d is pushed by the user, the cellular phone 51 starts to perform the voice communication with far-end speaker in the telephone mode (in the step S17).

The judgment is then made (in the step S18) on whether or not the first housing 2 is rotated by an angle of 180 degrees with respect to the second housing 3, in other words, the liquid crystal screen 5 and the operating unit 6 are in inverted relationship with each other. When the liquid crystal screen 5 and the operating unit 6 are in inverted relationship with each other, the cellular phone 51 stops performing the voice communication with the far-end speaker by automatically performing an on-hook operation in the telephone mode (in the step S19). The cellular phone 51 then assumes the key lock mode or the silent mode (in the step S13).

When the judgment is made in the step S14 that the phone call is not receiving in the key lock mode or in the silent mode, the judgment is made (in the step S20) on whether or not the liquid crystal screen 5 and the operating unit 6 are in non-twisted relationship with each other, the cellular phone 51 assumes the telephone mode without keeping on assuming the key lock mode or the silent mode (in the step S21). When the off-hook key is pushed by the user after a telephone number is inputted through the numeric keys 6f selectively pushed by the user, or one of the telephone numbers is selected from a telephone number list, the cellular phone 51 starts to perform the voice communication with far-end speaker in the telephone mode (in the step S17).

The judgment is then made (in the step S23) on whether or not the liquid crystal screen 5 and the operating unit 6 are in inverted relationship with each other. When the answer in the step S23 is affirmative "YES", i.e., the liquid crystal screen 5 and the operating unit 6 are in inverted relationship with each other, the cellular phone 51 stops performing the voice communication with the far-end speaker by automatically performing the on-hook operation in the telephone mode (in the step S24). The cellular phone 51 then assumes the key lock mode or the silent mode (in the step S13).

(Volume Control Mode)

Figure 9:
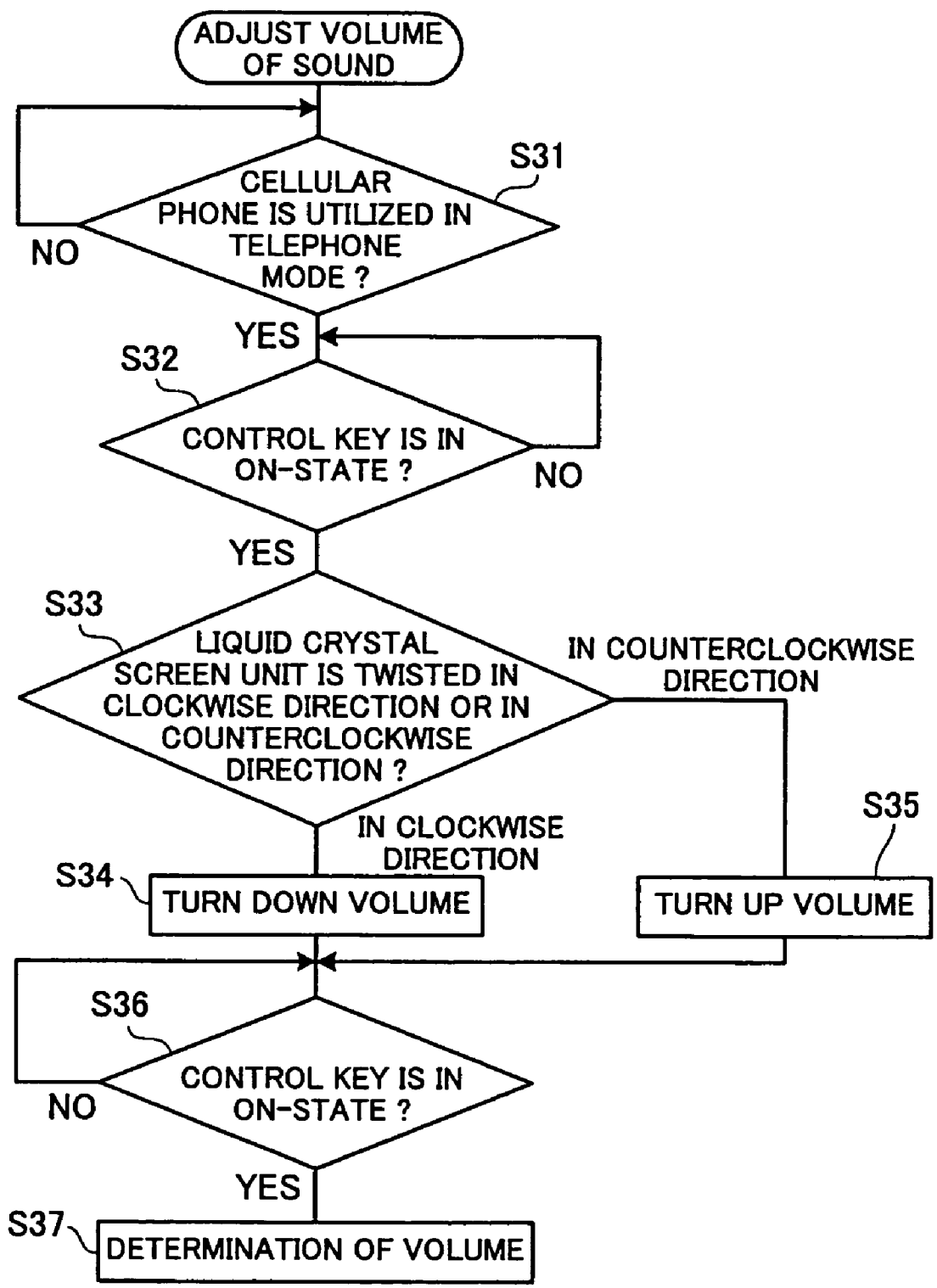
FIG. 9 is a flowchart showing a volume adjusting operation of the cellular phone according to the first embodiment of the present invention.

As shown in FIG. 9, the judgment is firstly made (in the step S31) on whether or not the voice communication is being performed in the telephone mode. When the answer in the step S31 is affirmative "YES", i.e., the voice communication is being performed in the telephone mode, the judgment is made (in the step S32) on whether or not the control key 6b is pushed by the user.

When the answer in the step S32 is affirmative "YES", i.e., the control key 6b is pushed by the user, the judgment is made (in the step S33) on whether the liquid crystal screen 5 is rotated with respect to the operating unit 6 in the clockwise direction or in the counterclockwise direction. The volume is turned down with the liquid crystal screen 5 and the operating unit 6 being rotated by an angle of 180 degrees with respect to each other in the clockwise direction (in the step S34). The volume is turned up with the liquid crystal screen 5 and the operating unit 6 being rotated by an angle of 180 degrees with respect to each other in the counterclockwise direction, (in the step S35).

The judgment is then made (in the step S36) on whether or not the control key 6b is further pushed by the user. When the answer in the step S36 is affirmative "YES", i.e., the control key 6b is further pushed by the user, the adjustment of the volume is established on the basis of the rotation direction and the number of the rotation of the liquid crystal screen 5 with respect to the operating unit 6. As has been described in "KEY LOCK MODE and SILENT MODE" the cellular phone 51 can continue the voice communication without performing the on-hook operation even if the liquid crystal screen 5 and the operating unit 6 are in inverted relationship with respect to each other.

(Layer Scrolling Mode)

The term "layer scrolling" herein described is intended to indicate an operation for scrolling down to the bottom layer, or up to the top layer, or scrolling data in each of layers down or up on the screen.

Figure 10:
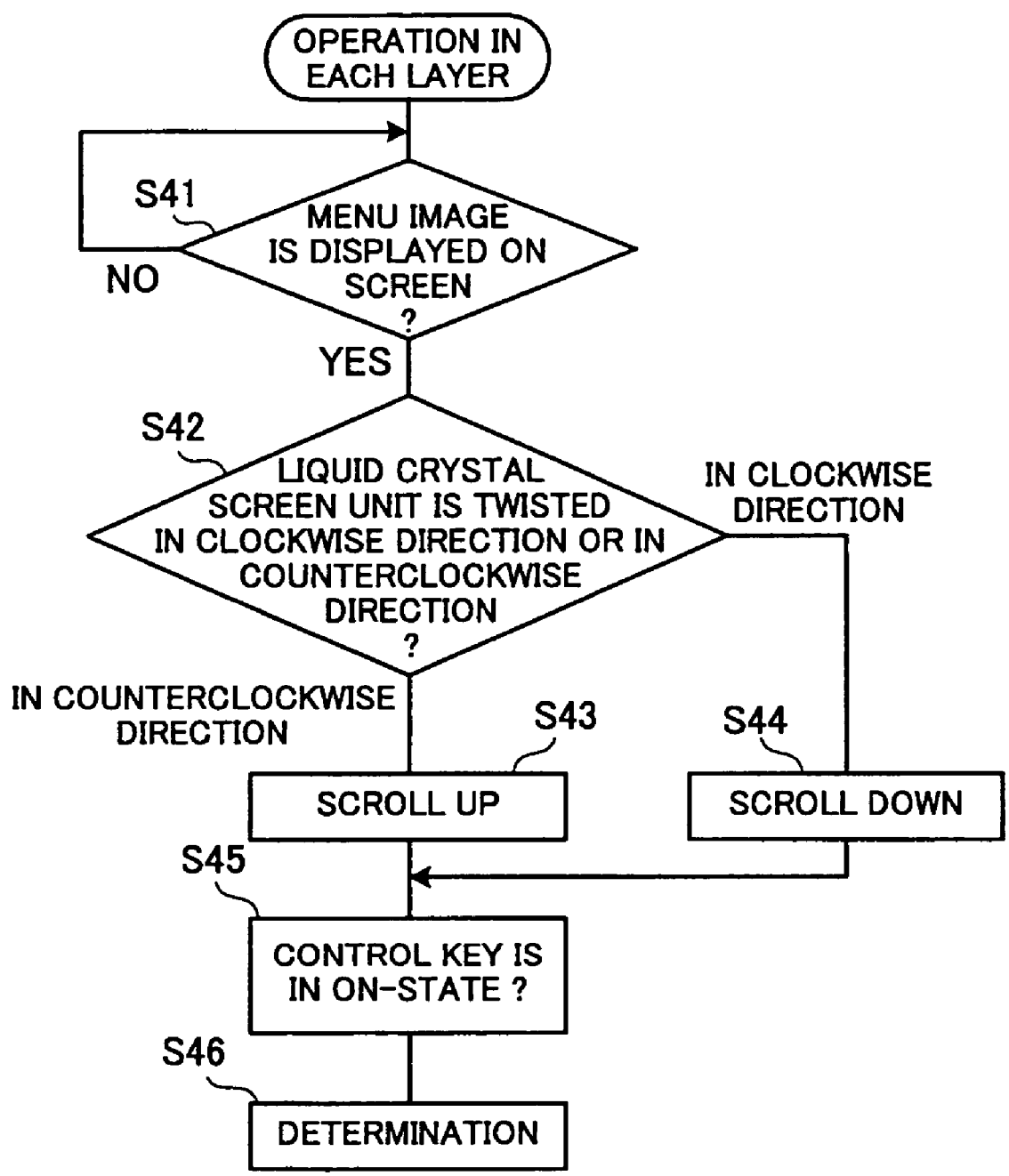
FIG. 10 is a flowchart showing a layer scrolling operation of the cellular phone according to the first embodiment of the present invention.
Figure 11:
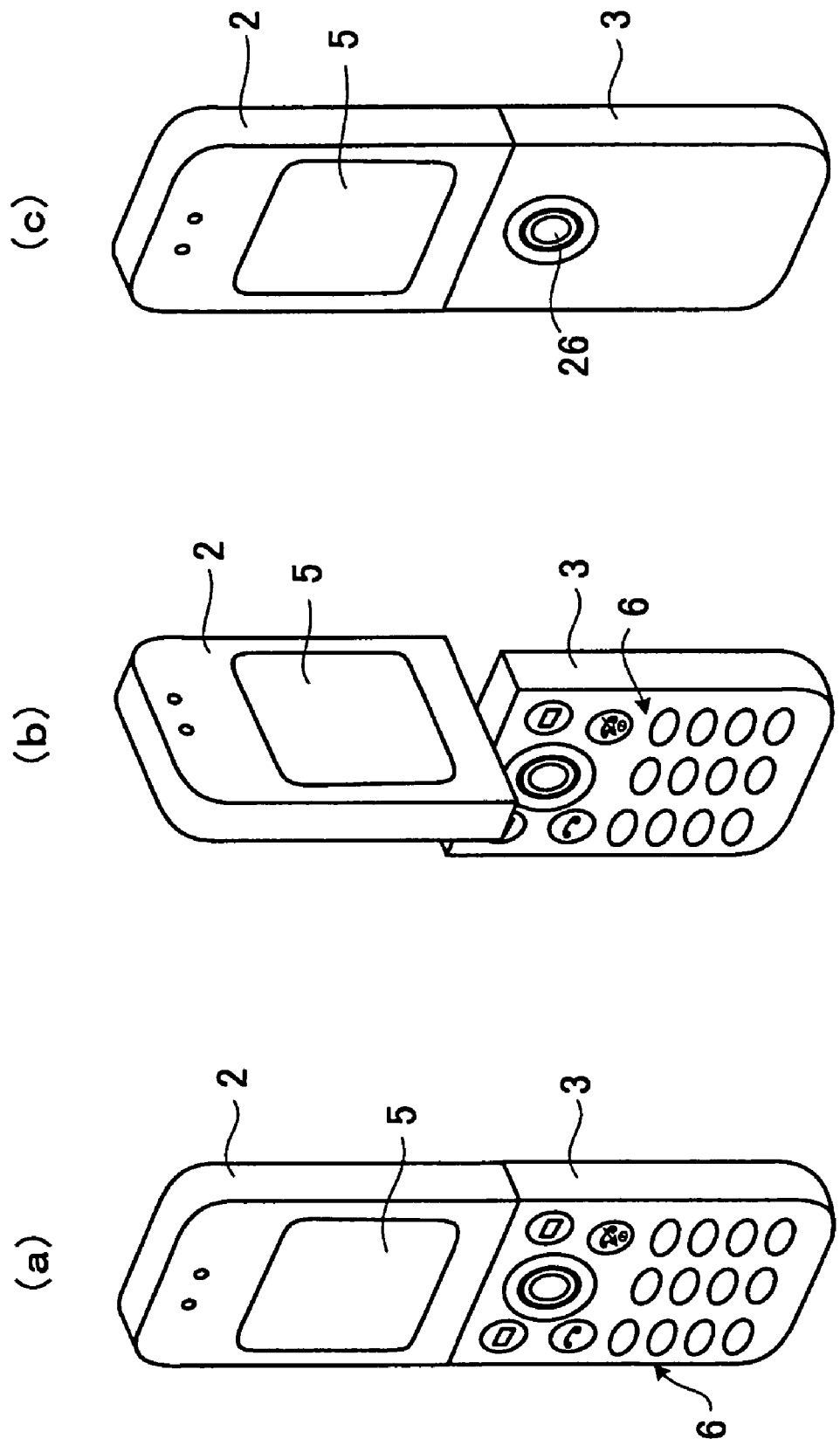
FIG. 11 is perspective views each showing the cellular phone according to the first embodiment of the present invention in the layer scrolling mode.

As shown in FIG. 10, the judgment is made (in the step S41) on whether or not the menu is selected by the user. When the menu item such as for example a telephone number list is selected by the user, the judgment is made (in the step S42) on whether the liquid crystal screen 5 is rotated with respect to the operating unit 6 in the clockwise direction or in the counterclockwise direction. As shown in FIG. 11, the menu is scrolled down on the liquid crystal screen 5 with the liquid crystal screen 5 being rotated by an angle of 45 degrees with respect to the operating unit 6 in the clockwise direction (in the step S43). The menu is scrolled up on the liquid crystal screen 5 with the liquid crystal screen 5 being rotated by an angle of 45 degrees with respect to the operating unit 6 in the clockwise direction (in the step S44).

The judgment is then made (in the step S45) on whether the control key 6b is pushed by the user. When the control key 6b is pushed by the user, the detail of the selected item is displayed on the liquid crystal screen 5.

The layer scrolling mode of the cellular phone 1 will be more specifically described hereinafter with reference to FIG. 12 which is a schematic view showing the liquid crystal screen 5 on which the e-mail information is being displayed. When one of menu items, for example, "e-mail" is selected by the user through the operating unit 6, the detail of "e-mail" is displayed on the liquid crystal screen 5. FIG. 12(a) is a schematic view showing the screen 5 on which the e-mail information is being displayed.

When the liquid crystal screen 5 is repeatedly rotated by an angle of 45 degrees with respect to the operating unit 6 in the clockwise direction, the e-mail information is scrolled down on the screen in order of "RECEIVED MAIL LIST", "SENT MAIL LIST", "UNSENT MAIL LIST", . . . , and other lists.

When "RECEIVED MAIL LIST" is selected from among the menu items with the control key 6b being pushed by the user, "SENT MAIL BOX", "END", and "RETURN" are displayed on the liquid crystal screen 5 as shown in FIG. 12(b). When the liquid crystal screen 5 is rotated by an angle of 45 degrees with respect to the operating unit 6, the e-mail information is scrolled down on the screen in order of "SENT MAIL BOX", "END", and "RETURN".

When "SENT MAIL BOX" is selected with the control key 6b being pushed by the user, the sent mail list in the lower layer is displayed on the liquid crystal display 5 as shown in FIG. 12(c). When the liquid crystal screen 5 is rotated by an angle of 45 degrees with respect to the operating unit 6 in the clockwise direction or in the counterclockwise direction, the sent mail list in the lower layer is scrolled down on the screen. When any one item of the sent mail list in the lower layer is selected by the control key 6b, the detail of the selected item is displayed on the liquid crystal screen 5.

(Save Mode)

Figure 13:
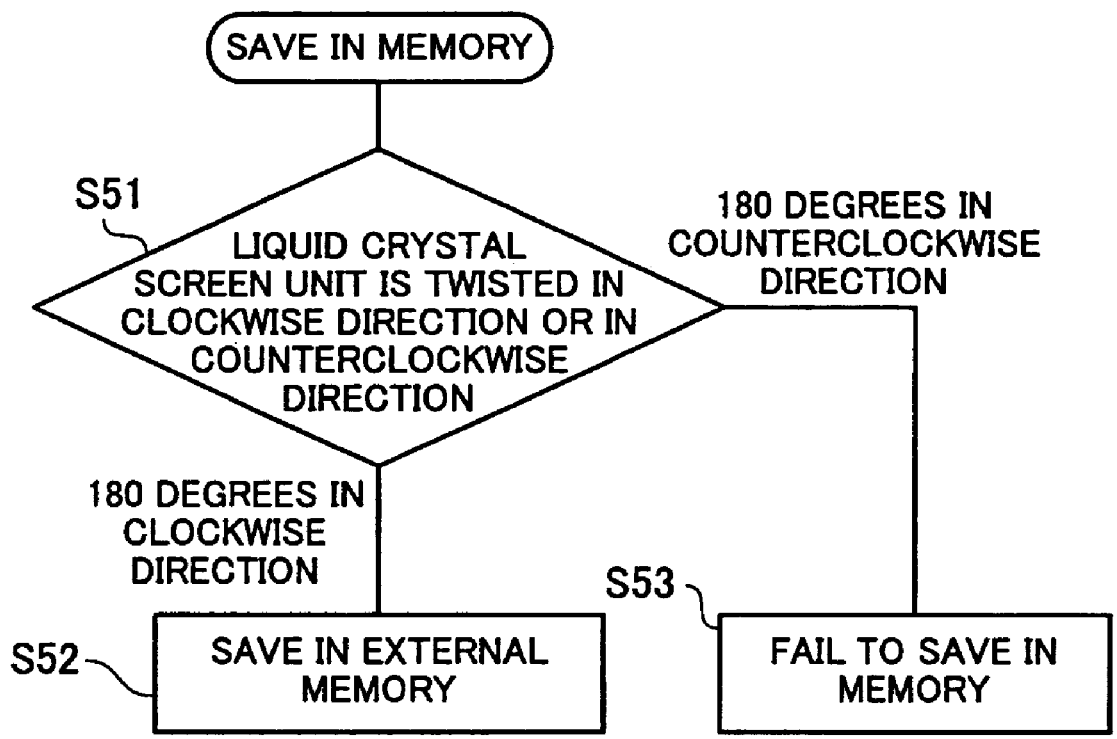
FIG. 13 is a flowchart showing an operation in the saving mode of the cellular phone according to the first embodiment of the present invention.
Figure 14:
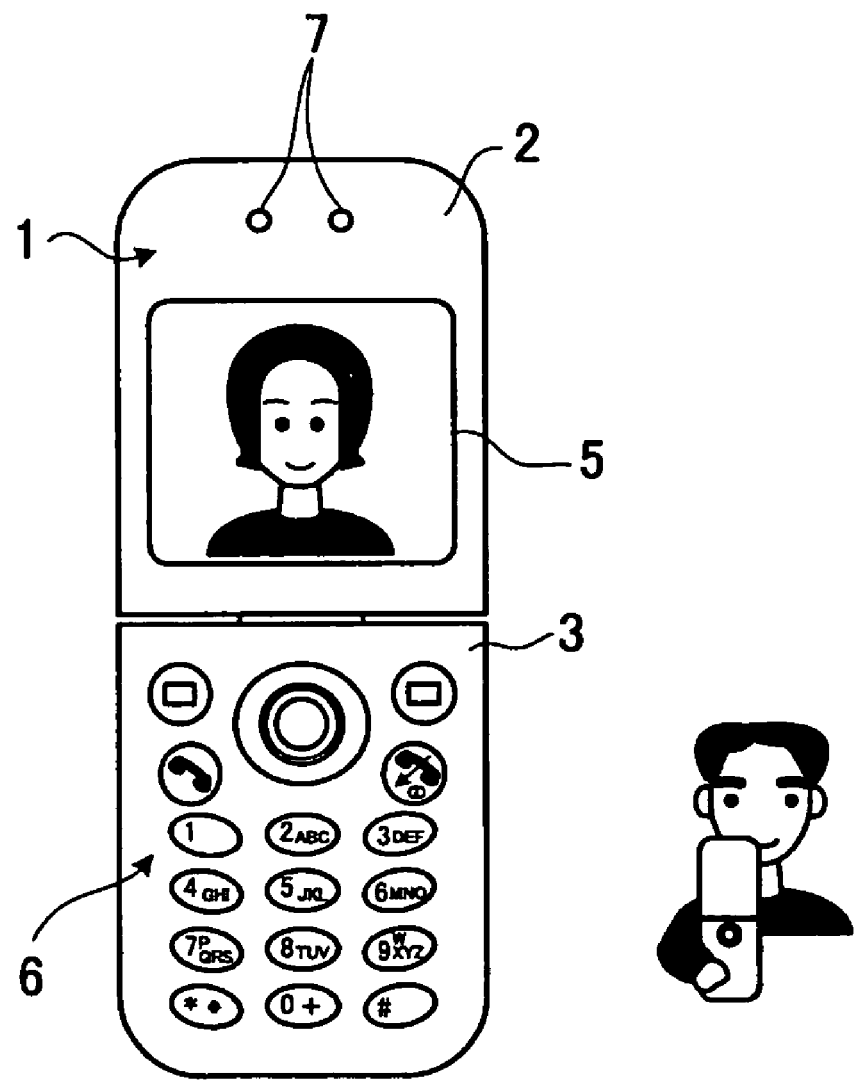
FIG. 14 is a schematic view showing the cellular phone assuming the others image shooting mode, according to the first embodiment of the present invention.

As shown in FIG. 13, the information such as the telephone number or the e-mail address is firstly inputted through the operating unit 6 when the liquid crystal screen 5 and the operating unit 6 are in non-twisted relationship with each other. The judgment is then made (in the step S51) on whether the liquid crystal screen 5 is rotated by an angle of 180 degrees with respect to each other in the clockwise direction or in the counterclockwise direction. When the liquid crystal screen 5 is rotated by an angle of 180 degrees with respect to each other in the clockwise direction, the information inputted through the operating unit 6 is stored in the memory unit 25 or the memory card 34 (in the step S52).

When the liquid crystal screen 5 is rotated by an angle of 180 degrees with respect to each other in the counterclockwise direction, the information inputted through the operating unit 6 is not stored in the memory unit 25 or the memory card 34 (in the step S53). Here, the information inputted through the operating unit 6 may be stored in the memory unit 25 or the memory card 34 in response to the instruction issued through the key operation with no rotation of the liquid crystal screen 5 with respect to the operating unit 6.

(Camera Mode)

The cellular phone 51 has two different camera modes including self-portrait image shooting mode and others image shooting mode. The camera unit 26 is provided in the second housing 3 in this embodiment. Accordingly, the cellular phone 1 assumes the others image shooting mode when the liquid crystal screen 5 and the operating unit 6 are in non-twisted relationship with each other. When the camera unit 26 is being pointed at an object such as for example others, the cellular phone 1 can allow the user to watch an image indicative of the object through the liquid crystal screen 5. When the image is taken by the camera unit 26, the cellular phone 1 can allow the user to adjust the direction of the camera unit 26 on the basis of the image displayed on the screen. Here, the camera unit 26 may take not only a still image but also a moving image.

Figure 15:
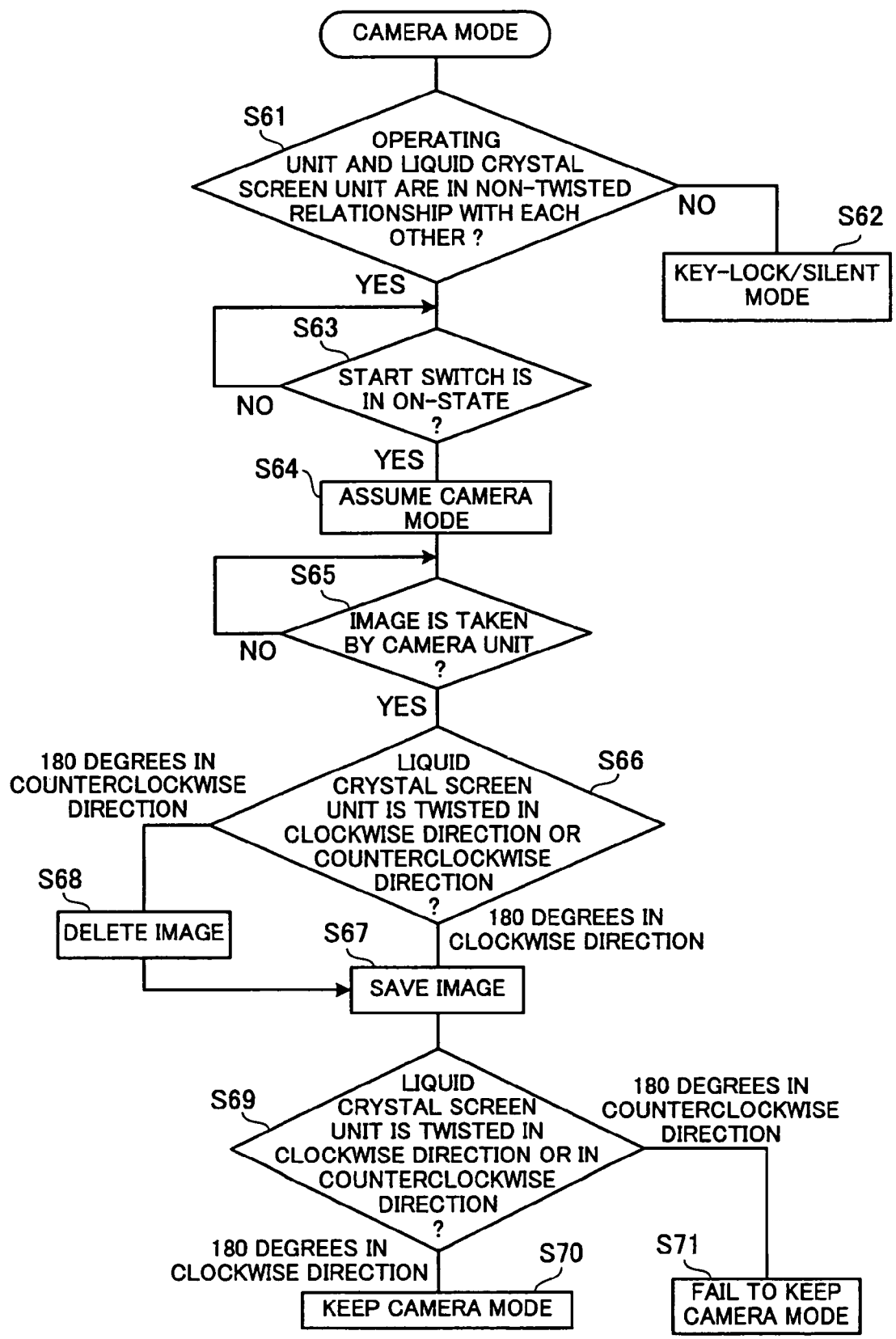
FIG. 15 is a flowchart showing an operation in the others image shooting mode of the cellular phone according to the first embodiment of the present invention.

As shown in FIG. 15, the judgment is firstly made (in the step S61) on whether or not the liquid crystal screen 5 and the operating unit 6 are in non-twisted relationship with each other. When the liquid crystal screen 5 and the operating unit 6 are not in non-twisted relationship with each other, the cellular phone 1 assumes the key lock mode or the silent mode (in the step S62). When the liquid crystal screen 5 and the operating unit 6 are in non-twisted relationship with each other, the judgment is then made (in the step S63) on whether or not the start switch of the camera mode is turned on. Here, the control switch 6b may be operated as the start switch of the camera mode. The operating unit 6 may further have a special start switch of the camera mode.

When the start switch is turned on, the cellular phone 51 assumes the camera mode (in the step S64). The judgment is then made (in the step S65) on whether or not the shutter button or the control key 6b is pushed for the purpose of taking an image. When the shutter button or the control key 6b is pushed for the purpose of taking an image, the judgment is made (in the step S66) on whether the liquid crystal screen 5 is rotated by an angle of 180 degrees with respect to each other in the clockwise direction or in the counterclockwise direction.

When the liquid crystal screen 5 and the operating unit 6 are in inverted relationship with each other as a result of the fact that the liquid crystal screen 5 is rotated by an angle of 180 degrees with respect to the operating unit 6 in the clockwise direction, the image data is stored in the memory unit 25 or the memory card 34 (in the step S67). Here, every time one image is taken in the camera mode, the image may be stored in the memory unit 25 or the memory card 34. When a plurality of images are taken in the camera mode, the images may be collectively stored in the memory unit 25 or the memory card 34.

The judgment is then made (in the step S69) on whether the liquid crystal screen 5 is further rotated by an angle of 180 degrees with respect to the operating unit 6 in the clockwise direction or in the counterclockwise direction. When the liquid crystal screen 5 and the operating unit 6 are in inverted relationship with each other as a result of the fact that the liquid crystal screen 5 is further rotated by an angle of 180 degrees with respect to the operating unit 6 in the clockwise direction, the cellular phone 51 assumes the camera mode (in the step S70). When, on the other hand, the liquid crystal screen 5 and the operating unit 6 are in non-twisted relationship with each other as a result of the fact that the liquid crystal screen 5 is further rotated by an angle of 180 degrees with respect to the operating unit 6 in the counterclockwise direction, the cellular phone 51 fails to assumes the camera mode (in the step S71).

When, on the other hand, the liquid crystal screen 5 and the operating unit 6 are in non-twisted relationship with each other as a result of the fact that the liquid crystal screen 5 is further rotated by an angle of 180 degrees with respect to the operating unit 6 in the counterclockwise direction in the step S66, the image is not stored in the memory unit 25 or the memory card 34 (in the step S68). The judgment is then made (in the step S69) on whether the liquid crystal screen 5 is further rotated by an angle of 180 degrees with respect to the operating unit 6 in the clockwise direction or in the counterclockwise direction. When the liquid crystal screen 5 and the operating unit 6 are in non-twisted relationship with each other as a result of the fact that the liquid crystal screen 5 is further rotated by an angle of 180 degrees with respect to the operating unit 6 in the clockwise direction in the step S69, the cellular phone 51 assumes the camera mode (in the step S70). When, on the other hand, the liquid crystal screen 5 and the operating unit 6 are in non-twisted relationship with each other as a result of the fact that the liquid crystal screen 5 is further rotated by an angle of 180 degrees with respect to the operating unit 6 in the counterclockwise direction in the step S69, the cellular phone 51 fails to assumes the camera mode (in the step S71).

In this embodiment, ever time the liquid crystal screen 5 and the operating unit 6 are rotated by an angle of 180 degrees with respect to each other in the clockwise direction, the storage operation for the image data and the start operation for the camera mode are selectively performed by the cellular phone 1. On the other hand, every time the liquid crystal screen 5 and the operating unit 6 are rotated by an angle of 180 degrees with respect to each other in the counterclockwise direction after the image is taken by the cellular phone 51, the image data is deleted before the operation for the camera mode are selectively performed by the cellular phone 1.

Figure 16:
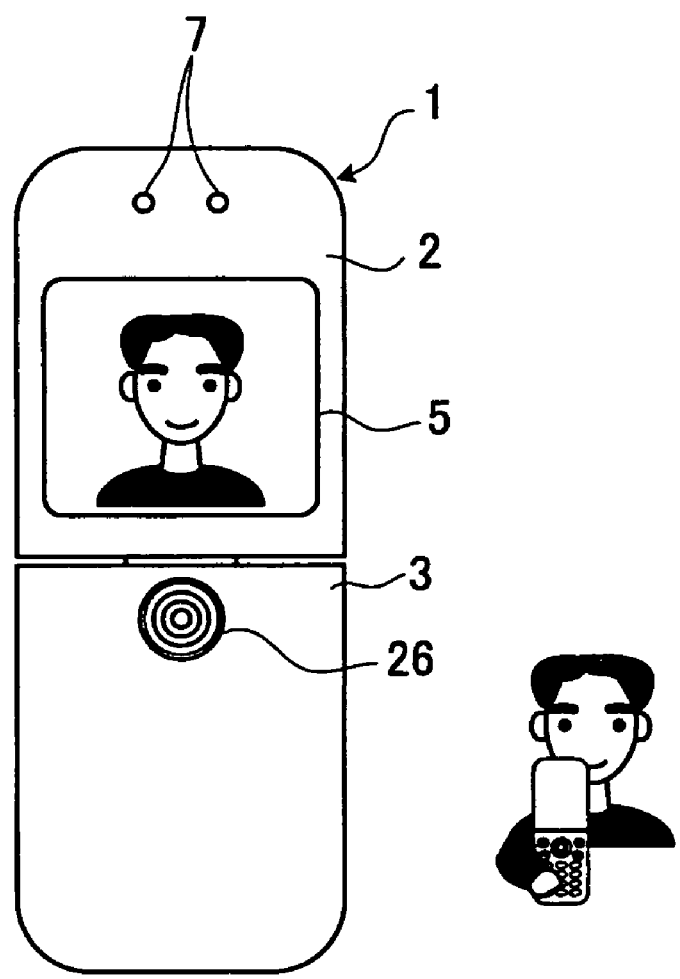
FIG. 16 is a schematic view showing the cellular phone assuming the self-portrait image shooting mode, according to the first embodiment of the present invention.

When, on the other hand, the self-portrait image is taken by the camera unit 26, the first and second housings 2 and 3 are in inverted relationship with respect to each other (See FIG. 16). The camera unit 26 is then pointed at an object such as for example a user. The cellular phone 1 then allows the user to watch an image indicative of the object through the liquid crystal screen 5 when the user adjusts the direction of the camera unit 26 on the basis of the image displayed on the screen. The image is finally taken by the camera unit 26.

Figure 17:
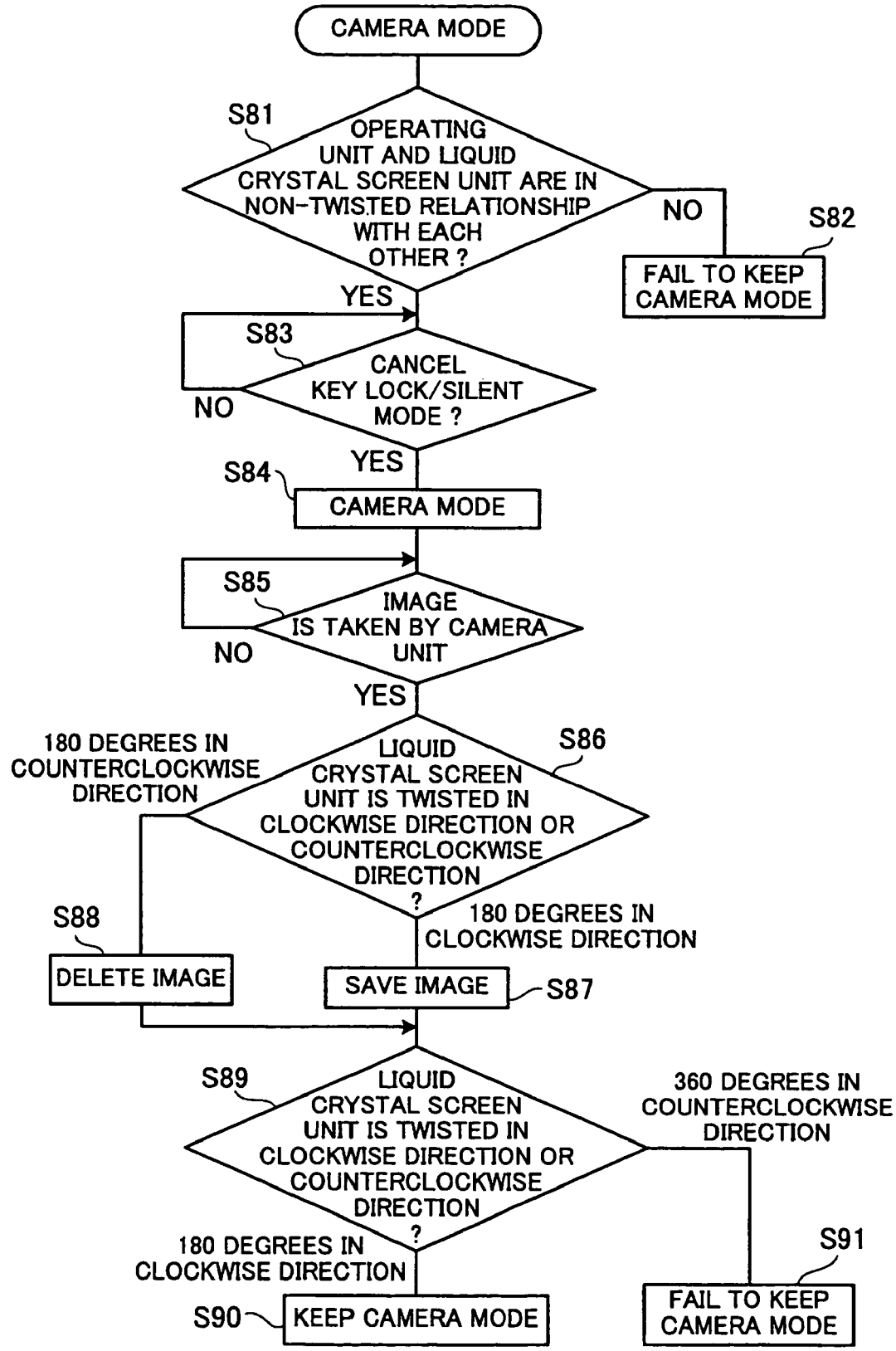
FIG. 17 is a flowchart showing an operation in the self-portrait image shooting mode of the cellular phone according to the first embodiment of the present invention.

As shown in FIG. 17, the judgment is firstly made (in the step S81) on whether or not the liquid crystal screen 5 and the operating unit 6 are in inverted relationship with each other. When the liquid crystal screen 5 and the operating unit 6 are not in inverted relationship with each other, the cellular phone 1 fails to assume the camera mode (in the step S82). When, on the other hand, the liquid crystal screen 5 and the operating unit 6 are in twisted relationship with each other, the judgment is made (in the step S83) on whether or not the key lock mode or the silent mode is cancelled as on the basis of the instruction of the operating unit 6.

When the silent mode is cancelled, the cellular phone 1 assumes the camera mode (in the step S84). The judgment is then made (in the step S85) on whether or not the shutter button or the control key 6b is pushed for the purpose of taking an image.

When the image is taken in the step S85, the judgment is made (in the step S86) on whether the liquid crystal screen 5 is rotated by an angle of 180 degrees with respect to the operating unit 6 in the clockwise direction or in the counterclockwise direction. When the liquid crystal screen 5 and the operating unit 6 are in non-twisted relationship with each other as a result of the fact that the liquid crystal screen 5 is rotated by an angle of 180 degrees with respect to the operating unit 6 in the clockwise direction in the step S86, the image data is stored in the memory unit 25 or the memory card 34 (in the step S87).

The judgment is then made (in the step S89) on whether the liquid crystal screen 5 is rotated by an angle of 180 degrees with respect to the operating unit 6 in the clockwise direction or in the counterclockwise direction. When the liquid crystal screen 5 and the operating unit 6 are in inverted relationship with each other as a result of the fact that the liquid crystal screen 5 is further rotated by an angle of 180 degrees with respect to the operating unit 6 in the clockwise direction, the cellular phone 51 assumes the camera mode (in the step S90). When, on the other hand, the liquid crystal screen 5 and the operating unit 6 are in non-twisted relationship with each other as a result of the fact that the liquid crystal screen 5 is further rotated by an angle of 360 degrees with respect to the operating unit 6 in the counterclockwise direction, the cellular phone 51 fails to assume the camera mode (in the step S90).

When, on the other hand, the liquid crystal screen 5 and the operating unit 6 are in non-twisted relationship with each other as a result of the fact that the liquid crystal screen 5 is further rotated by an angle of 180 degrees with respect to the operating unit 6 in the clockwise direction in the step S86, the image data is not stored in the memory unit 25 or the memory card 34 (in the step S88). The judgment is then made (in the step S89) on whether the liquid crystal screen 5 is rotated by an angle of 180 degrees with respect to the operating unit 6 in the clockwise direction or in the counterclockwise direction. When the liquid crystal screen 5 and the operating unit 6 are in inverted relationship with each other as a result of the fact that the liquid crystal screen 5 is further rotated by an angle of 180 degrees with respect to the operating unit 6 in the clockwise direction, the cellular phone 51 assumes the camera mode (in the step S90). When, on the other hand, the liquid crystal screen 5 and the operating unit 6 are in non-twisted relationship with each other as a result of the fact that the liquid crystal screen 5 is further rotated by an angle of 360 degrees with respect to the operating unit 6 in the counterclockwise direction, the cellular phone 51 fails to assume the camera mode (in the step S90).

In this embodiment, ever time the liquid crystal screen 5 is rotated with respect to the operating unit 6 in the clockwise direction, the operation for storing the image data and the operation for activating the camera mode are alternatively performed by the cellular phone 1. On the other hand, the liquid crystal screen 5 is rotated with respect to the operating unit 6 in the counterclockwise direction, the operation for completing the camera mode is performed by the cellular phone 1 with no operation for storing the image data.

Figure 18:
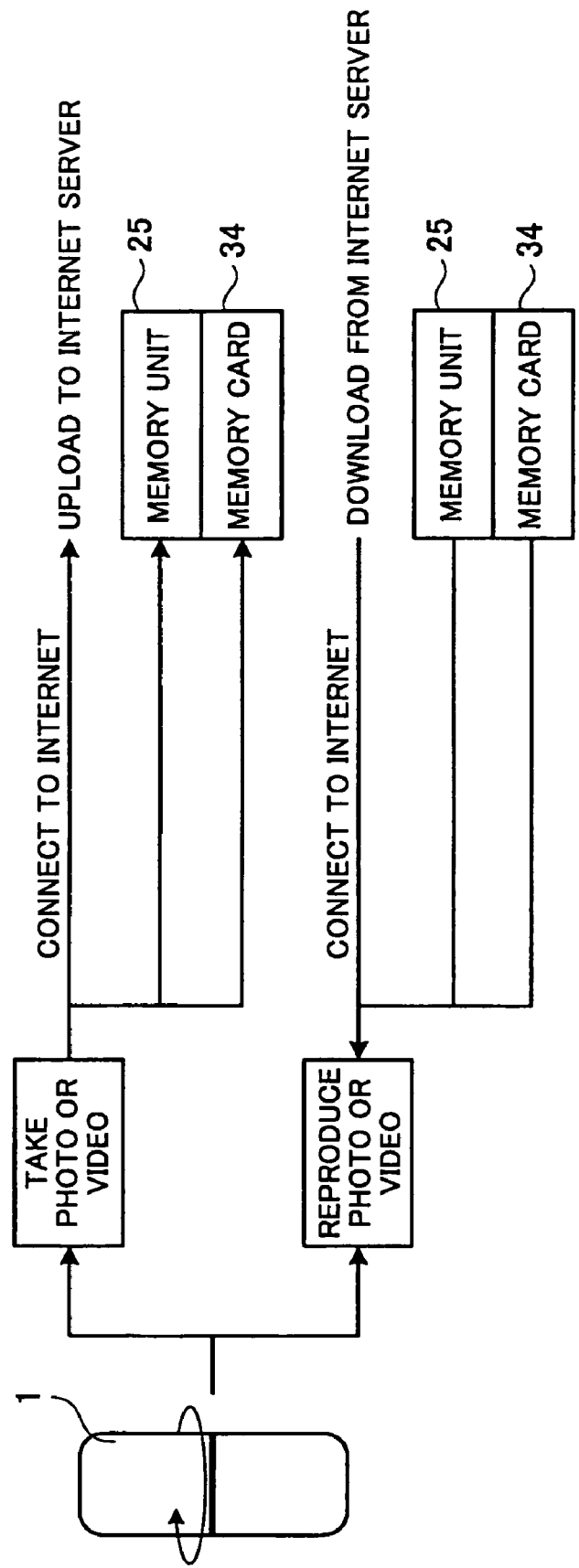
FIG. 18 is a schematic view showing available functions in the camera mode of the cellular phone according to the first embodiment of the present invention.

As shown in FIG. 18, not only an operation for storing the image data in the memory unit 25 and the memory card 34, but also an operation for uploading the image data to the internet server by automatically connecting the Internet may be performed in the camera mode.

More specifically, the operation is performed in the step S66 or the step S86 after the instruction to start to receive the image data from the website is issued by the operating unit 6 as a result of the fact that the control key 6b is operated by the user. When the liquid crystal screen 5 is further rotated by an angle of 180 degrees with respect to the operating unit 6 in the clockwise direction, the cellular phone 51 is automatically connected to the website through the Internet to upload the image data, taken by the camera unit 26, to the website, without storing the image data to the memory unit 25 or the memory card 34.

The instruction to receive the image data from the website through the Internet is issued by the operating unit 6 with the control key 6b. When the liquid crystal screen 5 is rotated by an angle of 180 degrees with respect to the operating unit 6 in the clockwise direction after the control key 6b is operated by the user, the cellular phone 1 starts to receive the image data from the website through the Internet. On the other hand, the instruction to receive the image data from the memory unit 25 or the memory card 34 is issued by the operating unit 6 with the control key 6b. When the liquid crystal screen 5 is rotated by an angle of 180 degrees with respect to the operating unit 6 in the counterclockwise direction, the cellular phone 1 starts to receive the image data from the memory unit 25 or the memory card 34.

(Internet Mode)

In the internet mode, the cellular phone 51 has one or more websites stored therein as a bookmark.

Figure 19:
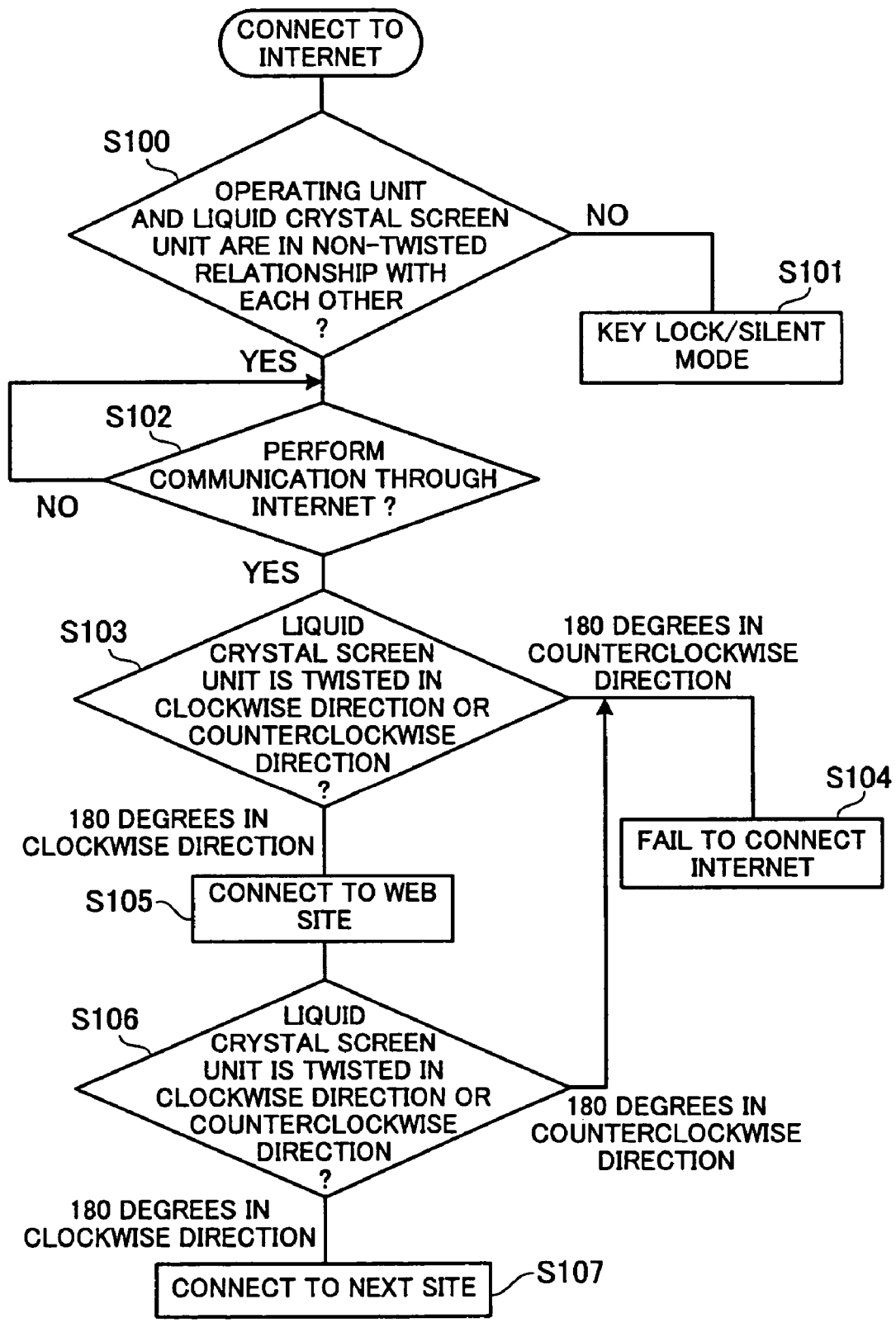
FIG. 19 is a flowchart showing an operation in the internet mode of the cellular phone according to the first embodiment of the present invention.

As shown in FIG. 19, the judgment is then made (in the step S100) on whether or not the liquid crystal screen 5 and the operating unit 6 are in non-twisted relationship with each other when the cellular phone 51 is selectively connected to the websites. When the liquid crystal screen 5 and the operating unit 6 are not in non-twisted relationship with each other, the cellular phone 51 assumes the key-lock mode or the silent mode (in the step S101).

When, on the other hand, the judgment is made in the step S100 that the liquid crystal screen 5 and the operating unit 6 are in non-twisted relationship with each other, the judgment is made (in the step S102) on whether or not the instruction to connect to the Internet is issued by the operating unit 6. When the instruction to connect to the Internet is issued by the operating unit 6, the judgment is made (in the step S103) on whether or not the liquid crystal screen 5 is rotated with respect to the operating unit 6 in the clockwise direction or in the counterclockwise direction.

When the liquid crystal screen 5 is rotated by an angle of 180 degrees with respect to the operating unit 6 in the counterclockwise direction, the cellular phone 1 cancels the internet mode without connecting to the Internet (in the step S104). When, on the other hand, the liquid crystal screen 5 is rotated by an angle of 180 degrees with respect to the operating unit 6 in the clockwise direction, the cellular phone 1 assumes the internet mode to connect to the first-registered website through the Internet (in the step S105).

The judgment is then made (in the step S106) on whether or not the liquid crystal screen 5 is further rotated with respect to the operating unit 6 in the clockwise direction or in the counterclockwise direction. When the liquid crystal screen 5 is further rotated by an angle of 180 degrees with respect to the operating unit 6 in the clockwise direction, the cellular phone 1 connects to the second-registered website through the Internet. When, on the other hand, the liquid crystal screen 5 is further rotated by an angle of 180 degrees with respect to the operating unit 6 in the counterclockwise direction, the cellular phone 1 cancels the internet mode (in the step S104).

When the liquid crystal screen 5 is further rotated by an angle of 180 degrees with respect to the operating unit 6 in the clockwise direction, the cellular phone 1 selectively connects to the websites, previously registered as bookmarks, through the Internet. It's preferred that the order of each of the registered websites is determined on the basis of the priority of each of the registered websites.

(E-Mail Mode)

Figure 20:
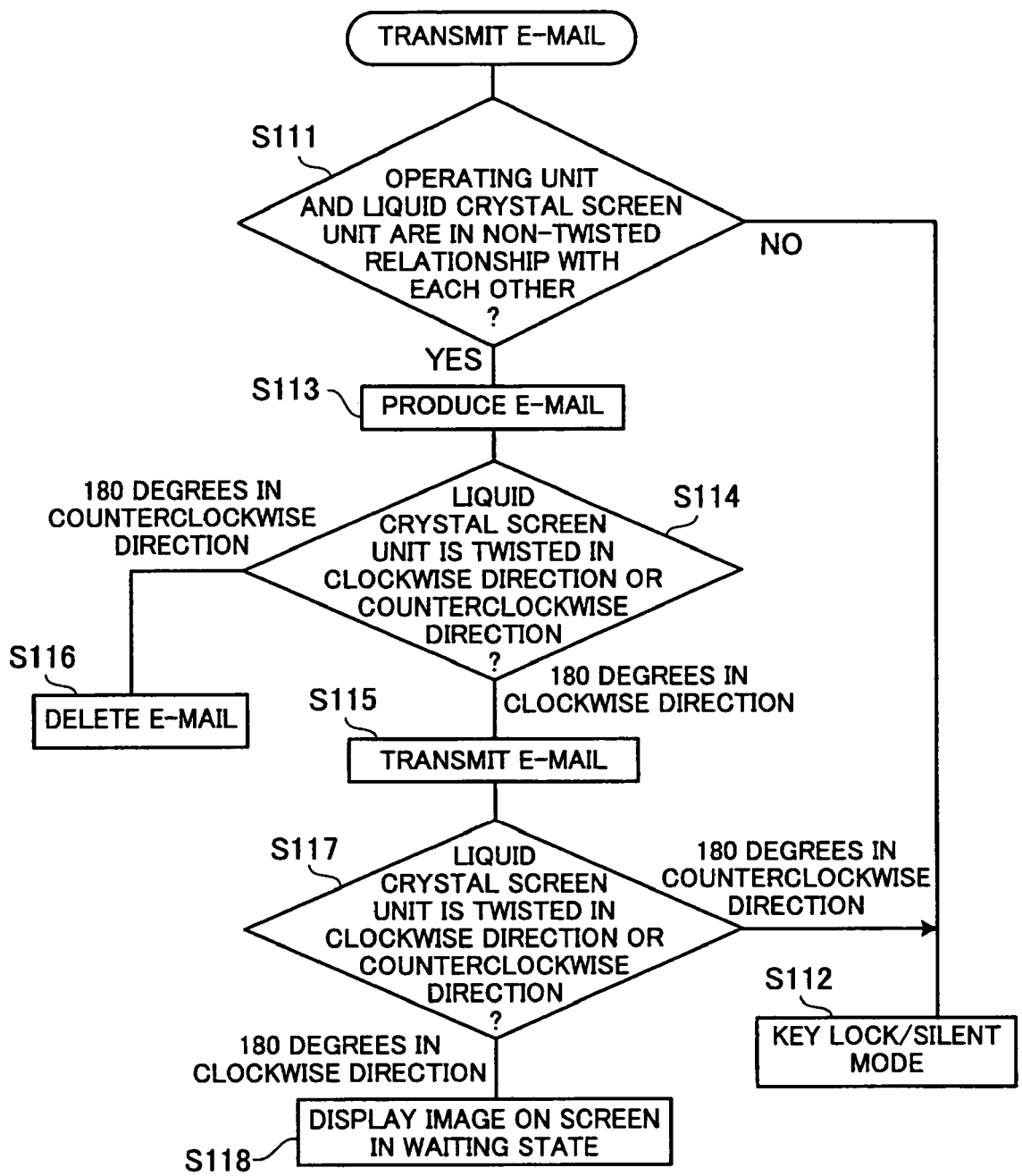
FIG. 20 is a flowchart showing an operation in the e-mail mode of the cellular phone according to the first embodiment of the present invention.

As shown in FIG. 20, the judgment is then made (in the step S111) on whether or not the liquid crystal screen 5 and the operating unit 6 are in non-twisted relationship with each other. When the liquid crystal screen 5 and the operating unit 6 are not in non-twisted relationship with each other, the cellular phone 1 assumes the key-lock mode or the silent mode (in the step S112).

When, on the other hand, the liquid crystal screen 5 and the operating unit 6 are in non-twisted relationship with each other, the cellular phone 1 allows the user to create an e-mail (in the step S113). The judgment is then made (in the step S114) on whether or not the liquid crystal screen 5 is rotated with respect to the operating unit 6 in the clockwise direction or in the counterclockwise direction.

When the liquid crystal screen 5 is rotated by an angle of 180 degrees with respect to the operating unit 6 in the counterclockwise direction, the e-mail is deleted by the cellular phone 1 (in the step S116). When, on the other hand, the liquid crystal screen 5 is rotated by an angle of 180 degrees with respect to the operating unit 6 in the clockwise direction, the e-mail is transmitted by the cellular phone 1 (in the step S115). When the liquid crystal screen 5 is further rotated by an angle of 180 degrees with respect to the operating unit 6 in the clockwise direction, the cellular phone 1 allows a standby image to be displayed on the liquid crystal screen 5 (in the step S116). When, on the other hand, the liquid crystal screen 5 is further rotated by an angle of 180 degrees with respect to the operating unit 6 in the counterclockwise direction, the cellular phone 1 assumes the key-lock mode or the silent mode (in the step S112).

Each of the above mentioned operation functions of the cellular phone 1 can be primarily set at the factory before each of the operation functions of the cellular phone 1 is arbitrarily set by the user. Here, any one of the above mentioned operation functions of the cellular phone 1 may be primarily set at the factory.

From the above detail description, it will be understood that the cellular phone 1 according to the first embodiment of the present invention can provide an enhanced operationality by selectively assume the operation modes with the rotation angle of the first housing 2 being rotated with respect to the second housing 3 through the rotating means 4.

In this embodiment, the user can selectively set the cellular phone to the operation modes with the first and second housings 2 and 3 being rotated with respect to each other in the clockwise direction or in the counterclockwise direction through the rotating means 4.

When the cellular phone 1 selectively assumes the operation modes, the first housing 2 is repeatedly rotated by a specific angle, for example, 180 degrees and 45 degrees with respect to the second housing 3. However, the specific angle may be defined with an angle smaller than 45 degrees.

In this embodiment, the cellular phone 1 is straight in shape. Therefore, the cellular phone 1 can provide an enhanced operationality with no open and close operations.

The second housing 3 can be rotated with respect to the first housing 2. Therefore, the camera unit 26 accommodated in the second housing 3 can be rotated with respect to the first housing 2 with no rotating mechanism for allowing the camera unit to be pointed to an object.

The camera unit 26 is provided on the rear surface of the second housing 3 and on the rotation axis with no rotating mechanism for allowing the camera unit 26 to be rotatable round the rotation axis. This leads to the fact that the camera unit 26 provided on the rotation axis can be easily pointed at an object.

In this embodiment, the first and second housings 2 and 3 are rotated with respect to the first and second housings 2 and 3 by the user. However, the first and second housings 2 and 3 may be automatically rotated with respect to the first and second housings 2 and 3. In this case, the first and second housings 2 and 3 are rotatably connected to each other through a rotating means such as for example a driving motor. When the control key 6b is pushed by the user, the first and second housings 2 and 3 are rotated by a specific angle with respect to each other.

Figure 21:
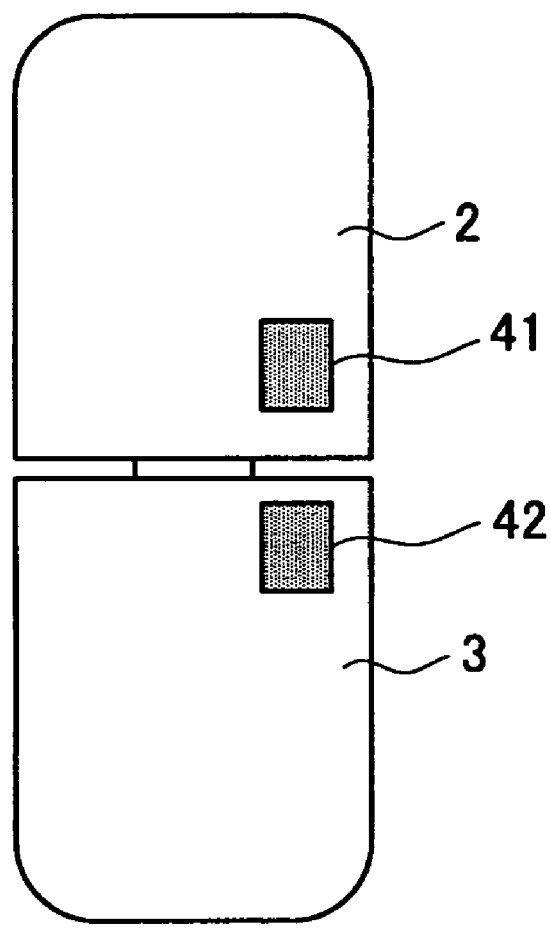
FIG. 21 is a schematic view showing the cellular phone having the wireless communication interface, according to the first embodiment of the present invention.

In this embodiment, each of the rotation shaft 2a and groove portion (retaining unit) 3a has a plurality of signal lines, while the communication is conducted between the electronic elements accommodated in the first housing 2 and the electronic elements accommodated in the second housing 3 through the signal lines. However, the cellular phone 51 may have wireless communication interface units 41 and 42 which are respectively provided in the first and second housings 2 and 3 to perform wireless communication with each other. In this case, the electronic elements accommodated in each of the second housings 2 and 3 can perform wirelessly communication through the wireless communication interface units 41 and 42 as shown in FIG. 21.

Second Embodiment

Referring now to the drawings, in particular to FIGS. 22 to 26, there is shown a second embodiment of the mobile communication apparatus according to the present invention. The elements of the second embodiment of the mobile communication apparatus the same as those of the first embodiment of the mobile communication apparatus will not be described but bear the same reference numerals as those of the first embodiment of the mobile communication apparatus.

Figure 23:
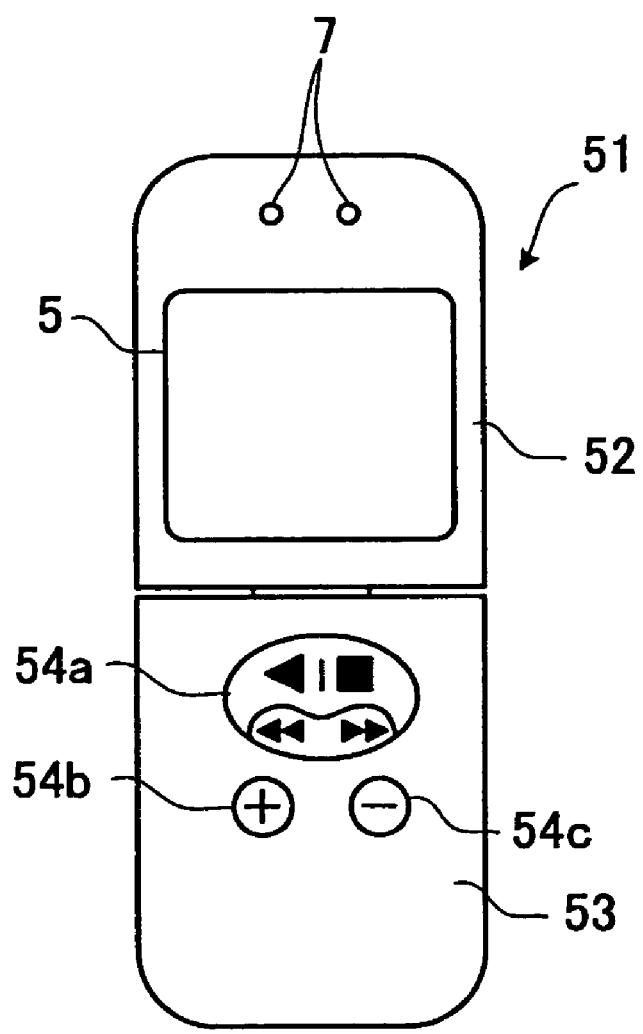
FIG. 23 is a schematic view showing the cellular phone assuming a state in which the first and second housings is in inverted relationship with each other, according to the second embodiment of the present invention.

Each of FIGS. 22 and 23 is a schematic view showing a cellular phone 51 which has, as a predetermined additional function, an audio function. As shown in FIGS. 22 and 23, the cellular phone 51 comprises a sub-operating unit 54 for selectively performing operations in the audio mode. The sub-operating unit 54 is provided on a rear surface of the second housing 53 to have control keys 54a to 54c. When the control key 54a is operated by the user, the sub-operating unit 54 is operative to selectively issue "reproduction", "stop", "fast-forward", and "fast-rewind" instructions. When the control key 54b is operated by the user, the sub-operating unit 54 is operative to issue an instruction to turn up the volume. When the control key 54c is operated by the user, the sub-operating unit 54 is operative to issue an instruction to turn down the volume.

Figure 24:
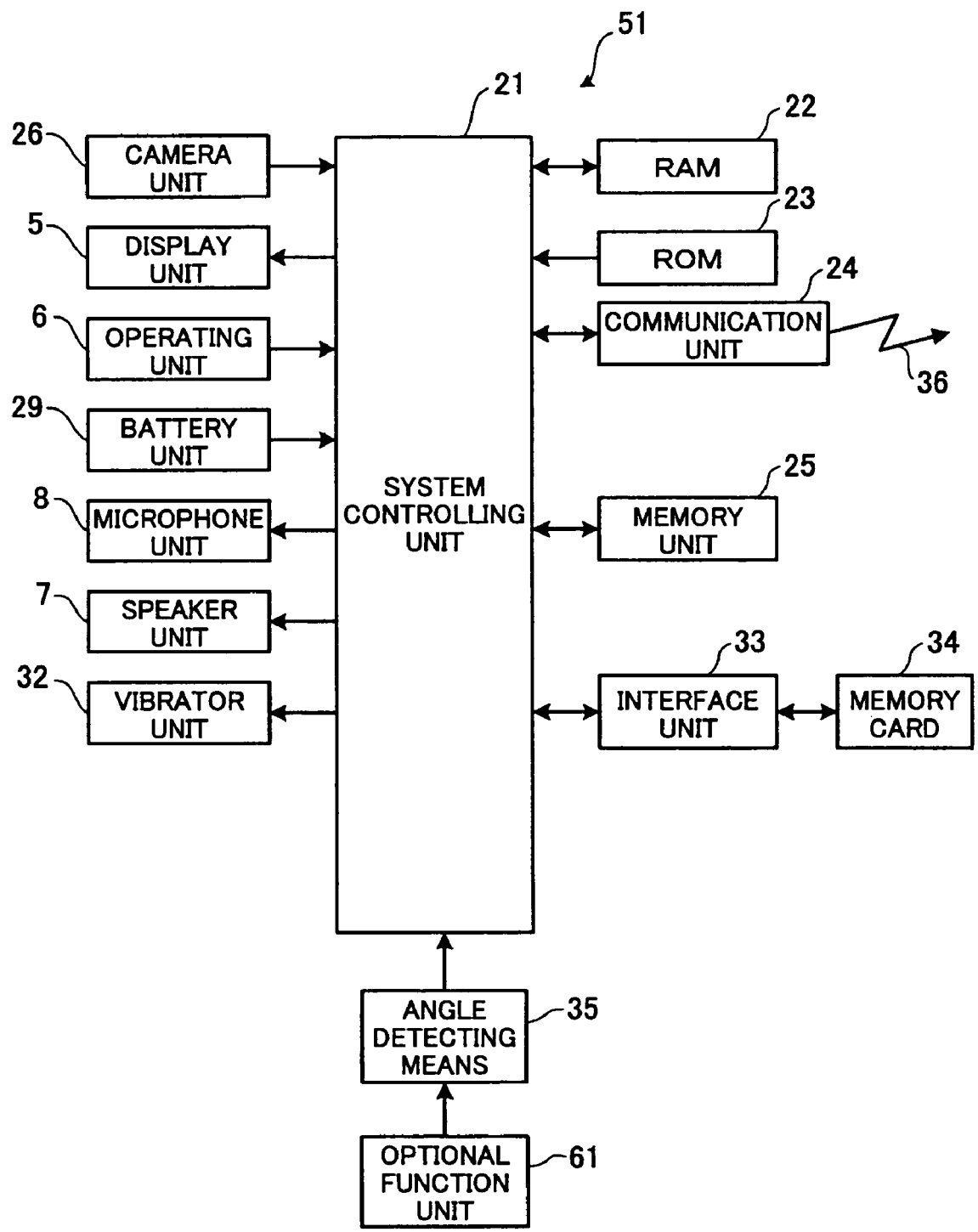
FIG. 24 is a block diagram showing each of the second to tenth embodiments of the cellular phone according to the present invention.

FIG. 24 is a block diagram showing a cellular phone 51. As shown in FIG. 24, the cellular phone 51 comprises rotation angle detecting means 35 which is the same as that of the cellular phone according to the first embodiment of the present invention. The rotation angle detecting means 35 is operative to detect the rotation angle of the first housings 52 with respect to the second housing 53 to output a signal indicative of the rotation angle of the first housings 52 with respect to the second housing 53.

Figure 25:
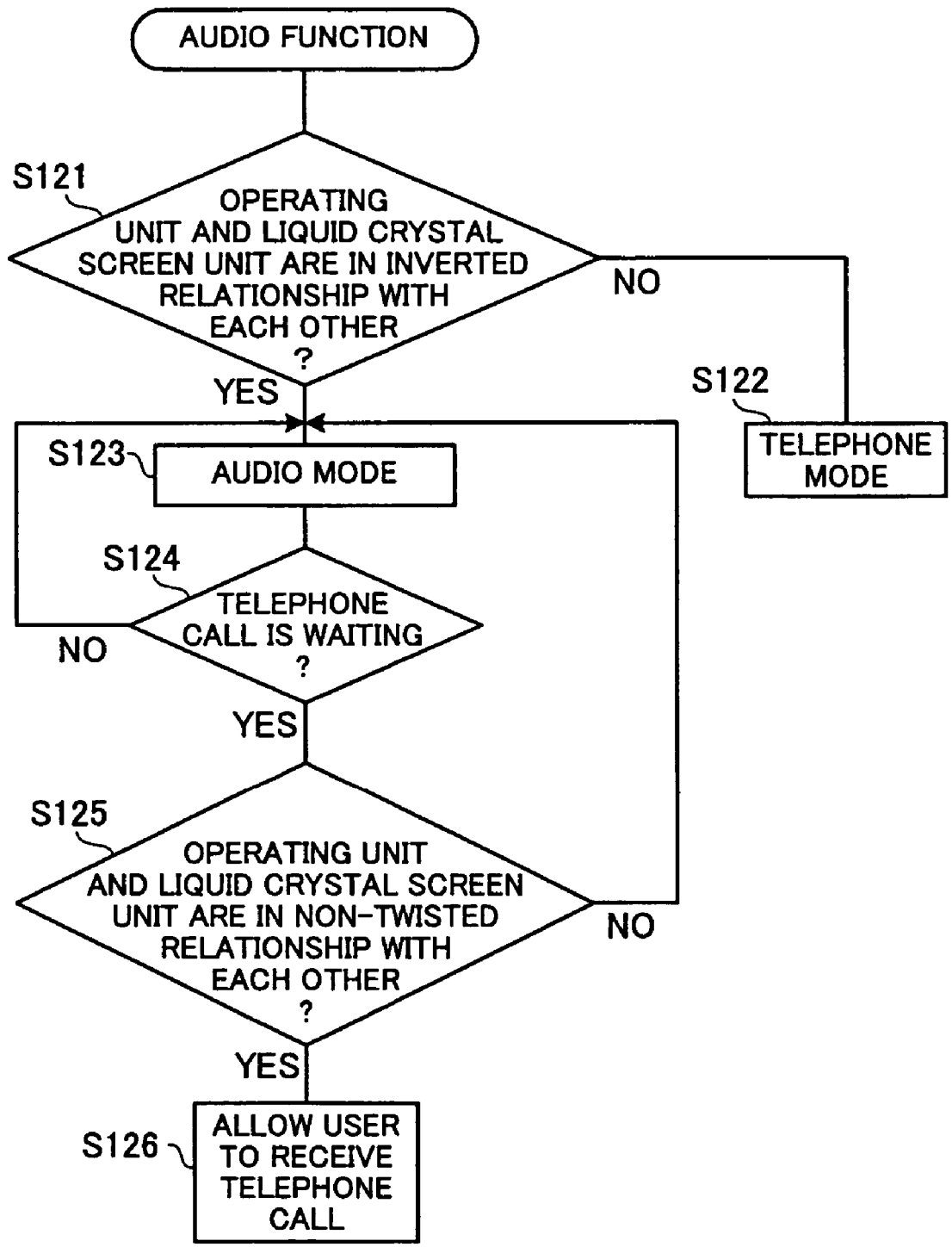
FIG. 25 is a flowchart showing an operation in the audio mode of the cellular phone according to the second embodiment of the present invention.

The audio function of the cellular phone 51 according to the second embodiment of the present invention will be described hereinafter with reference to FIG. 25. The judgment is firstly made (in the step S121) on whether or not the liquid crystal screen 5 and the operating unit 6 are in inverted relationship with each other. When the liquid crystal screen 5 and the operating unit 6 are in non-twisted relationship with each other, the cellular phone 51 assumes a telephone mode to allow a user to receive a phone call, or to make a phone call without assuming the audio mode (in the step S122).

Figure 26:
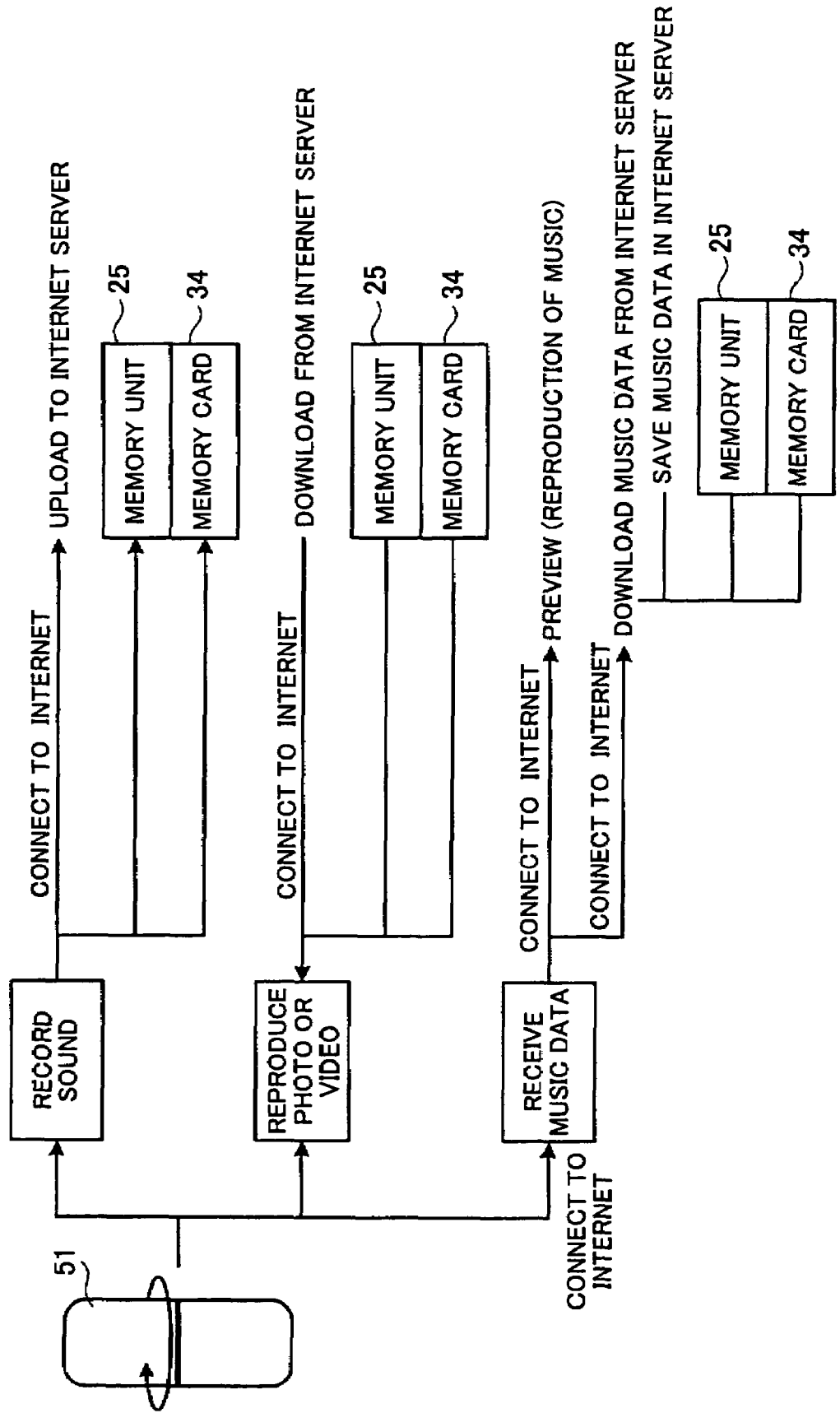
FIG. 26 is a schematic view showing available functions in the audio mode of the cellular phone according to the second embodiment of the present invention.

When, on the other hand, the liquid crystal screen 5 and the operating unit 6 are in inverted relationship with each other, in other words, the sub-operating unit 54 and the liquid crystal screen 5 are in non-twisted relationship with each other, the cellular phone 51 assumes the audio mode (in the step S123). As shown in FIG. 26, the voice inputted by the microphone unit 8 is stored in the memory unit 25 or in the memory card 34, or uploaded to the Internet server in the audio mode.

The judgments are made on whether or not the liquid crystal screen 5 and the operating unit 6 are in inverted relationship with each other in the audio mode, and on whether or not the first housing 52 is rotated by an angle of 360 degrees with respect to the second housing 53. When the liquid crystal screen 5 and the operating unit 6 are in inverted relationship with each other in the audio mode as a result of the fact that the first housing 52 is rotated by an angle of 360 degrees with respect to the second housing 53, the system control unit 21 outputs a voice represented by the voice data stored in the memory unit 25 or the memory card 34, or outputs a sound represented by the voice data received from the internet server, on the basis of the signal outputted by the rotation angle detecting means 35. Here, the memory unit 25, the memory card 34, and the Internet server are selectively switched by the control key 6b when the voice is recorded or reproduced by the system control unit 21.

When the first housing 52 is further rotated by an angle of 360 degrees with respect to the second housing 53, the system control unit 21 connects to the Internet to receive preview data from the internet server, and outputs a music sound represented by the preview data, or receives music data from the memory media such as for example CD and DVD, and records the music data in the memory unit 25, the memory card 34, or the internet server on the basis of the signal outputted by the rotation angle detecting means 35.

The judgment is made (in the step S124) on whether or not the incoming phone call is being detected in the audio mode. When the incoming phone call is being detected in the audio mode, the judgment is made (in the step S125) on whether or not the liquid crystal screen 5 and the operating unit 6 are in non-twisted relationship with each other. When the liquid crystal screen 5 and the operating unit 6 are in non-twisted relationship with each other, the cellular phone 51 assumes the telephone mode to allows the user to receive the phone call (in the step S126).

From the above detail description, it will be understood that the cellular phone 51 according to the second embodiment of the present invention can easily switch between the telephone mode and the audio mode with an enhanced operationality.

Third Embodiment

Referring now to the drawings, in particular to FIGS. 24 and 27 to 29, there is shown a third embodiment of the mobile communication apparatus according to the present invention. The elements of the third embodiment of the mobile communication apparatus the same as those of the first embodiment of the mobile communication apparatus will not be described but bear the same reference numerals as those of the first embodiment of the mobile communication apparatus. In this embodiment, the cellular phone 51 has, as additional functions, not only a camera function 26 but also an audio function.

As shown in FIG. 27, the cellular phone 51 comprises a sub-operating unit 55 for selectively performing operations in each of the camera mode and the predetermined mode. The sub-operating unit 55 is provided on a rear surface of the second housing 53 to have control keys 55a to 55c. When the control key 55a is operated by the user, the sub-operating unit 55 is operative to selectively issue "reproduction", "stop", "fast-forward", and "fast-rewind" instructions. When the control key 55b is operated by the user, the sub-operating unit 55 is operative to issue an instruction to turn up the volume. When the control key 55c is operated by the user, the sub-operating unit 55 is operative to issue an instruction to turn down the volume.

FIG. 24 is a block diagram showing the cellular phone 51. As shown in FIG. 24, the cellular phone 51 comprises rotation angle detecting means 35 for detecting the rotation angle of the first housings 52 with respect to the second housing 53 to output a signal indicative of the rotation angle of the first housings 52 with respect to the second housing 53 when the first housings 52 is rotated with respect to the second housing 53.

Figure 28:
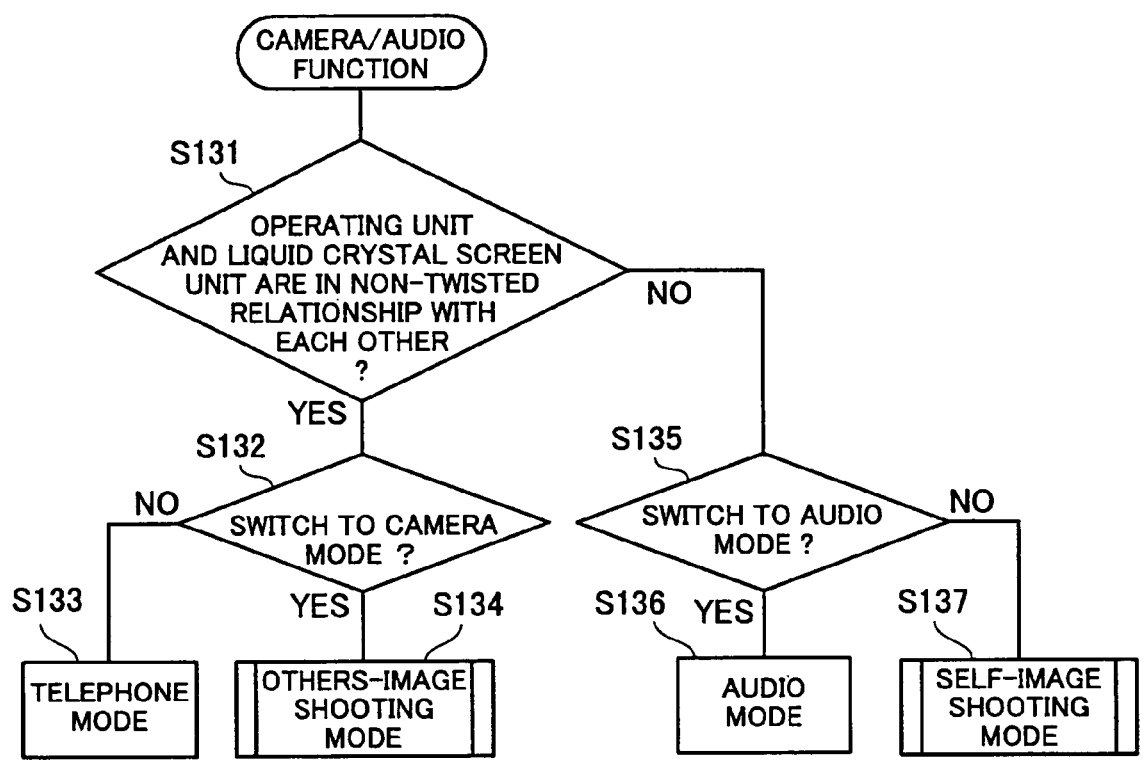
FIG. 28 is a flowchart showing an operation in each of the camera mode and the audio mode of the cellular phone according to the third embodiment of the present invention.

The audio function of the cellular phone 51 according to the third embodiment of the present invention will be described hereinafter with reference to FIG. 28. In this embodiment, any one of the camera mode and the audio mode is selected when the control key 6b of the operating unit 6 is operated by the user in a user setting step.

The judgment is firstly made (in the step S131) on whether or not the liquid crystal screen 5 and the operating unit 6 are in inverted relationship with each other. When the judgment is made in the step S131 that the liquid crystal screen 5 and the operating unit 6 are in non-twisted relationship with each other, the judgment is made (in the step S132) on whether or not the camera mode is selected by the control key 6b. When the judgment is made in the step S132 that the camera mode is not selected by the control key 6b, the cellular phone 51 assumes a telephone mode (in the step S133). When, on the other hand, the judgment is made in the step S132 that the camera mode is selected by the control key 6b, the cellular phone 51 assumes others image shooting mode shown in FIG. 29 (in the step S133).

Figure 29:
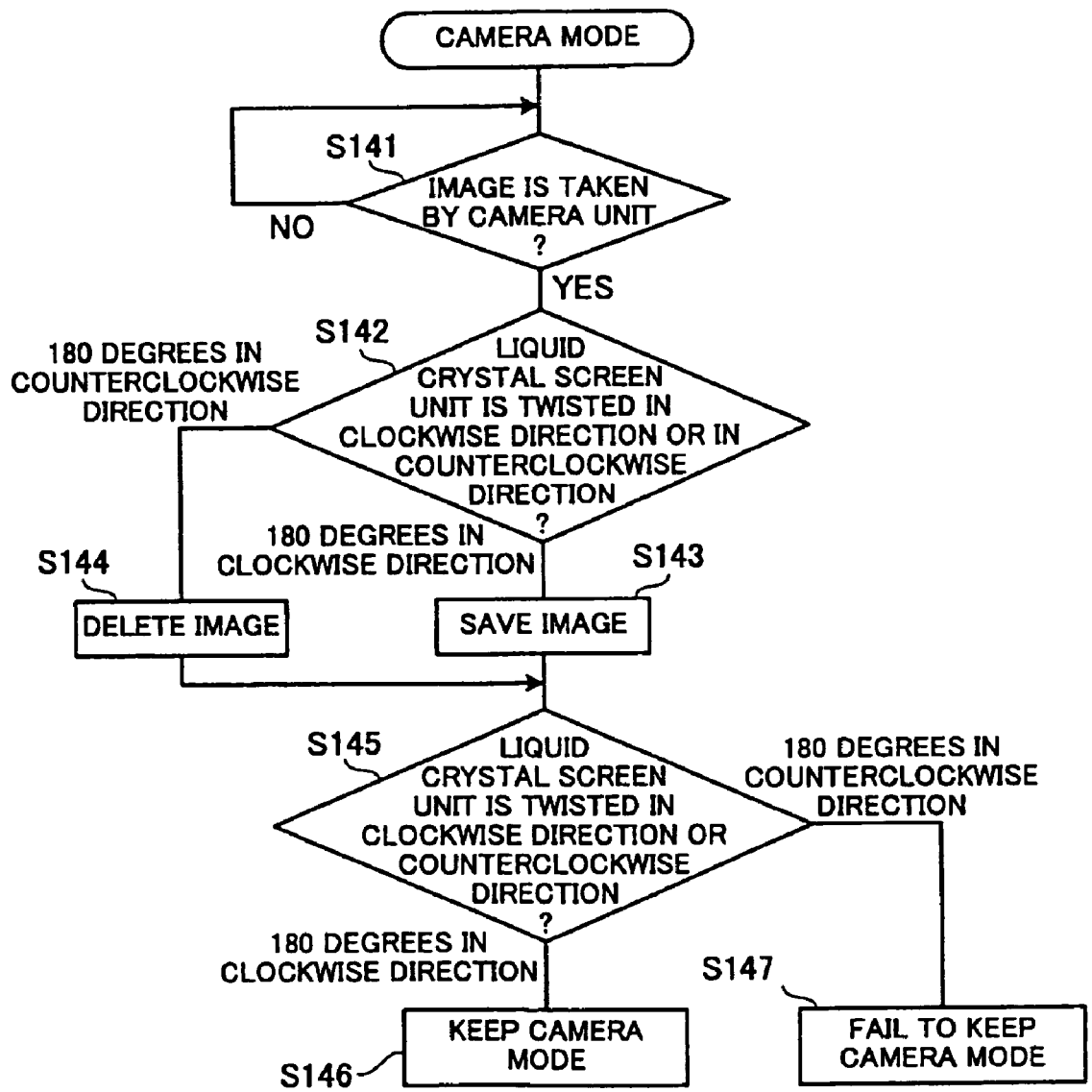
FIG. 29 is a flowchart showing an operation in the camera mode of the cellular phone according to the third embodiment of the present invention.

As shown in FIG. 29, the judgment is then made (in the step S141) on whether or not the shutter button or the control key 6b is pushed by the user, the image is taken in the others image shooting mode. When the image is taken in the others image shooting mode, the judgment is made (in the step S142) on whether or not the liquid crystal screen 5 and the operating unit 6 are rotated with respect to the operating unit 6 in the clockwise direction or in the counterclockwise direction. When the judgment is then made in the step S142 that the liquid crystal screen 5 and the operating unit 6 are rotated by an angle of 180 degrees with respect to each other in the clockwise direction before the liquid crystal screen 5 and the operating unit 6 are in inverted relationship with each other, the cellular phone 51 assumes the save mode to store the image in the memory unit 25 or the memory card 34 (in the step S143). Here, every time one image is taken in the camera mode, the cellular phone 51 may be operative to store the image in the memory unit 25 or the memory card 34. The cellular phone 51 may be operative to take a plurality of images before storing the images in the memory unit 25 or the memory card 34.

The judgment is then made (in the step S145) on whether or not the liquid crystal screen 5 and the operating unit 6 are further rotated with respect to the operating unit 6 in the clockwise direction or in the counterclockwise direction on the basis of the rotation angle detected by the rotation angle detecting means 35. When the judgment is then made in the step S145 that the liquid crystal screen 5 and the operating unit 6 are rotated by an angle of 180 degrees with respect to each other in the clockwise direction before the liquid crystal screen 5 and the operating unit 6 are in non-twisted relationship with each other, the cellular phone 51 returns to the others image shooting mode (in the step S146). When, on the other hand, the judgment is then made in the step S145 that the liquid crystal screen 5 and the operating unit 6 are rotated by an angle of 180 degrees with respect to each other in the counterclockwise direction before the liquid crystal screen 5 and the operating unit 6 are in non-twisted relationship with each other, the cellular phone 51 completes the others image shooting mode (in the step S147).

When, on the other hand, the judgment is then made in the step S142 that the liquid crystal screen 5 and the operating unit 6 are in inverted relationship with each other as a result of the fact that the liquid crystal screen 5 and the operating unit 6 are rotated by an angle of 180 degrees with respect to each other in the counterclockwise direction, the image is deleted (in the step S144). The step S144 proceeds to the step S145.

When the liquid crystal screen 5 and the operating unit 6 are repeatedly twisted at 180 degrees with respect to each other in the clockwise direction, the cellular phone 51 alternatively assumes the camera mode and the storage mode. When, on the other hand, the liquid crystal screen 5 and the operating unit 6 are repeatedly twisted at 180 degrees with respect to each other in the counterclockwise direction, the cellular phone 51 completes the camera mode without assuming the storage mode to store the image in the memory unit 25 or the memory card 34.

When the judgment is firstly made in the step S131 that the liquid crystal screen 5 and the operating unit 6 are in inverted relationship with each other; in other words, the sub-operating unit 55 and the liquid crystal screen 5 are in non-twisted relationship with each other, the judgment is made (in the step S135) on whether or not the instruction to the system control unit 21 to switch to the audio mode is issued by the operating unit 6 as a result of the fact that the control key 6 is operated by the user. When the judgment is made in the step S135 that the instruction to the system control unit 21 to switch to the camera mode is issued by the operating unit 6, the cellular phone 51 assumes self-portrait image shooting mode (in the step S137).

As shown in FIG. 29, the judgment is then made (in the step S141) on whether or not the shutter button or the control key 6b is operated by the user; in other words, the image is taken in the self-portrait image shooting mode. When the judgment is made in the step S141 that the image is taken in the self-portrait image shooting mode, the judgment is made (in the step S142) on whether or not the liquid crystal screen 5 is rotated with respect to the operating unit 6 in the clockwise direction or in the counterclockwise direction. When the judgment is then made in the step S142 that the liquid crystal screen 5 and the operating unit 6 are rotated by an angle of 180 degrees with respect to each other in the clockwise direction before the liquid crystal screen 5 and the operating unit 6 are in non-twisted relationship with each other, the cellular phone 51 assumes the storage mode to store the image in the memory unit 25 or the memory card 34 (in the step S143).

The judgment is then made (in the step S145) on whether or not the liquid crystal screen 5 and the operating unit 6 are further rotated with respect to the operating unit 6 in the clockwise direction or in the counterclockwise direction. When the judgment is then made in the step S145 that the liquid crystal screen 5 and the operating unit 6 are rotated by an angle of 180 degrees with respect to each other in the clockwise direction before the liquid crystal screen 5 and the operating unit 6 are in inverted relationship with each other, the cellular phone 51 returns to the self-portrait image shooting mode (in the step S146). When, on the other hand, the judgment is then made in the step S145 that the liquid crystal screen 5 and the operating unit 6 are rotated by an angle of 180 degrees with respect to each other in the counterclockwise direction before the liquid crystal screen 5 and the operating unit 6 are in inverted relationship with each other, the cellular phone 51 completes the others image shooting mode (in the step S147).

When, on the other hand, the judgment is then made in the step S142 that the liquid crystal screen 5 and the operating unit 6 are rotated by an angle of 180 degrees with respect to each other in the counterclockwise direction before the liquid crystal screen 5 and the operating unit 6 are in non-inverted relationship with each other, the image is deleted (in the step S144). The step S144 proceeds to the step S145.

When the liquid crystal screen 5 and the operating unit 6 are repeatedly twisted at 180 degrees with respect to each other in the clockwise direction, the cellular phone 51 alternatively assumes the camera mode and the storage mode. When, on the other hand, the liquid crystal screen 5 and the operating unit 6 are repeatedly twisted at 180 degrees with respect to each other in the counterclockwise direction, the cellular phone 51 completes the camera mode without assuming the storage mode to store the image in the memory unit 25 or the memory card 34.

When, on the other hand, the instruction to the system control unit 21 to switch to the audio mode is issued by the operating unit 6 as a result of the fact that the control key 6 is operated by the user, the voice signal produced by the microphone unit 8 is stored in the memory unit 25 or the memory card 34, or uploaded to the internet server.

When the liquid crystal screen 5 and the operating unit 6 are rotated by an angle of 360 degrees with respect to each other just before the liquid crystal screen 5 and the operating unit 6 are in inverted relationship with each other, the cellular phone 51 allows the sub-operating unit 55 to issue an instruction to the system control unit 21 to reproduce a voice indicative of the voice signal retrieved from the memory unit 25 or the memory card 34, or received from the internet server. When the control key 6b is operated by the user, the memory unit 25, the memory card 34, and the internet server are selectively switched by the system control unit 21.

When the first and second housings 52 and 53 are further rotated by an angle of 360 degrees with respect to each other, the cellular phone 51 allows the sub-operating unit 54 to issue an instruction to the system control unit 21 to receive preview data from the internet server to reproduce music sound from the preview data, or to receive music data from the memory media such as for example CD and DVD to store the music data in the memory unit 25 or the memory card 34, or to transmit the music data to the internet server.

The judgment is made on whether or not the incoming phone call is being detected in the audio mode. When the incoming phone call is being detected in the audio mode, the judgment is made on whether or not the liquid crystal screen 5 and the operating unit 6 are in non-twisted relationship with each other. When the liquid crystal screen 5 and the operating unit 6 are in non-twisted relationship with each other, the cellular phone 51 assumes the telephone mode to allows the user to receive the phone call.

From the above detail description, it will be understood that the cellular phone 51 according to the third embodiment of the present invention can easily switch between the camera mode and the audio mode with an enhanced operationality.

Fourth Embodiment

Referring now to the drawings, in particular to FIGS. 24, 30 to 32, there is shown a fourth embodiment of the mobile communication apparatus according to the present invention. The elements of the fourth embodiment of the mobile communication apparatus the same as those of the first embodiment of the mobile communication apparatus will not be described but bear the same reference numerals as those of the first embodiment of the mobile communication apparatus.

The cellular phone 51 has, as a predetermined additional function, a radio function. As shown in FIG. 30, the cellular phone 51 comprises a sub-operating unit 56 for selectively issuing instructions to the system control unit 21 in the radio mode. The sub-operating unit 56 is provided on a rear surface of the second housing 53 to have pivotal control keys 56a and 56b. When the pivotal control key 56a is pivotally moved by the user, the sub-operating unit 56 is operative to issue an instruction to the system control unit 21 to selectively tune in on stations. When the pivotal control key 56b is pivotally moved by the user, the sub-operating unit 56 is operative to issue an instruction to the system control unit 21 to turn up, or turn down the volume.

FIG. 24 is a block diagram showing the cellular phone 51. As shown in FIG. 24, the cellular phone 51 further comprises rotation angle detecting means 35 for detecting the rotation angle of the first housing 52 with respect to the second housing 53 to output a signal indicative of the rotation angle of the first housing 52 with respect to the second housing 53 when the first housings 52 is rotated with respect to the second housing 53.

Figure 31:
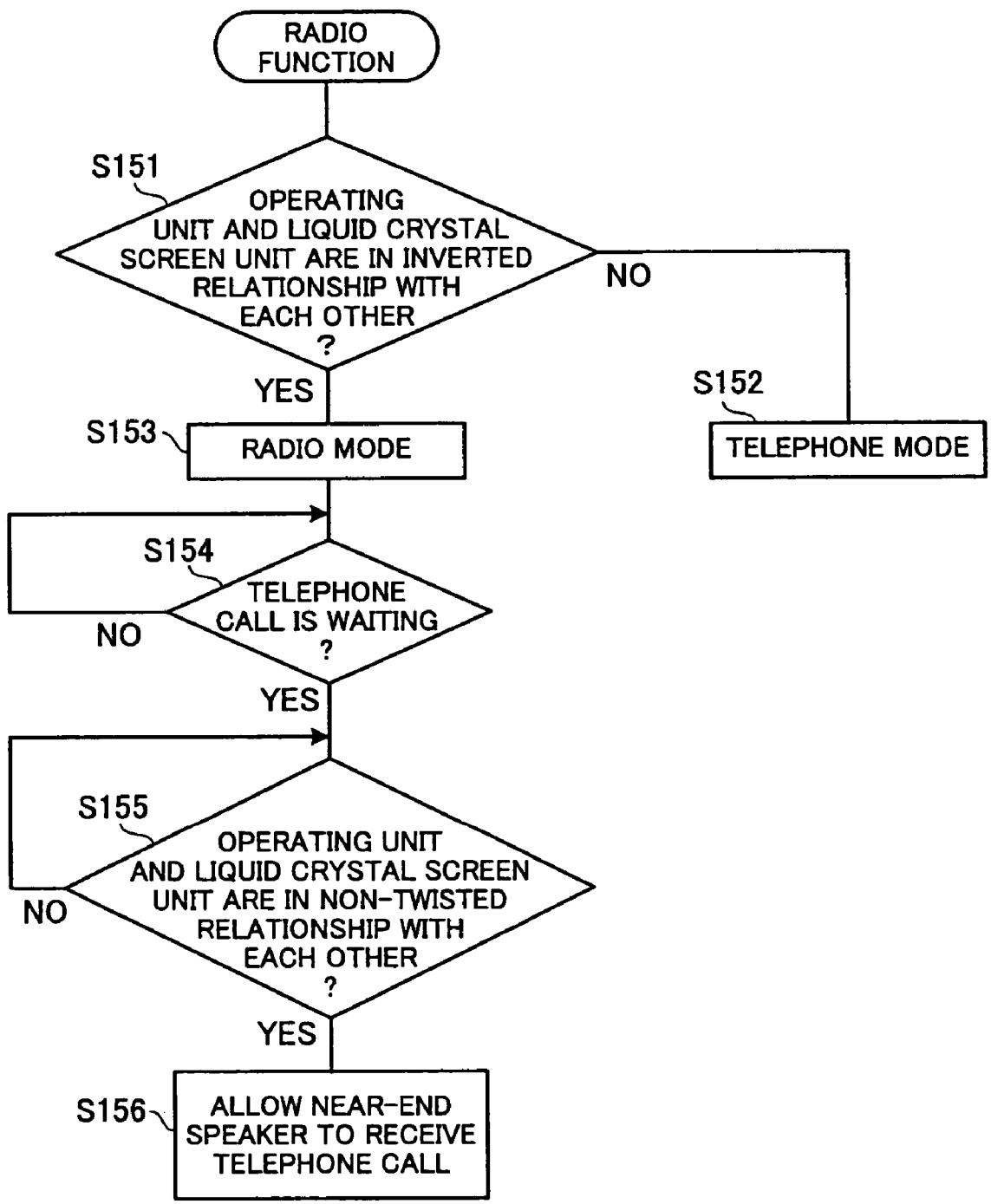
FIG. 31 is a flowchart showing an operation in the radio mode of the cellular phone according to the fourth embodiment of the present invention.

The radio function of the cellular phone 51 according to the fourth embodiment of the present invention will be described hereinafter with reference to FIG. 31. The judgment is firstly made (in the step S151) on whether or not the liquid crystal screen 5 and the operating unit 6 are in inverted relationship with each other. When the liquid crystal screen 5 and the operating unit 6 are in non-twisted relationship with each other, the cellular phone 51 assumes a telephone mode, without assuming the radio mode, to allow a user to receive a phone call, or to make a phone call (in the step S152).

Figure 32:
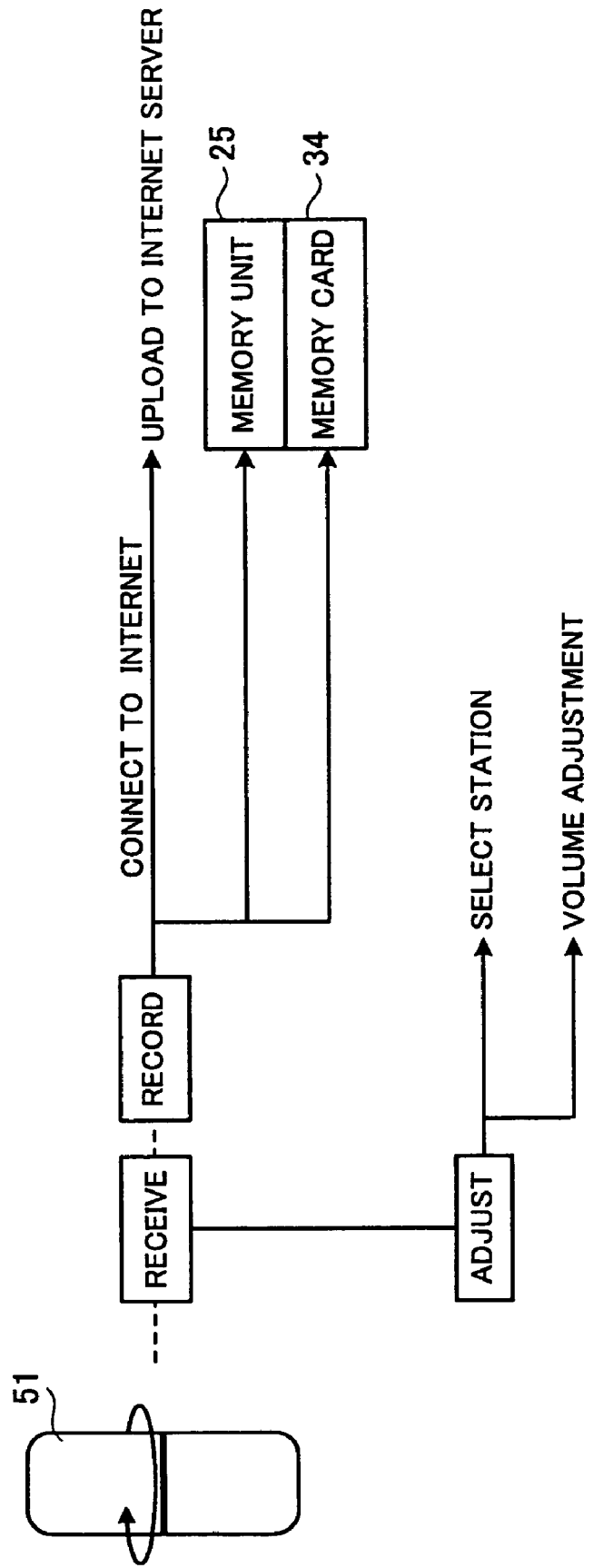
FIG. 32 is a schematic view showing available functions in the radio mode of the cellular phone according to the fourth embodiment of the present invention.

When, on the other hand, the liquid crystal screen 5 and the operating unit 6 are in inverted relationship with each other; in other words, the sub-operating unit 56 and the liquid crystal screen 5 are in non-inverted relationship with each other, the cellular phone 51 assumes the radio mode (in the step S153) to receive an audio signal from a radio station, and to output a sound represented by the audio signal through the speaker unit 7 as shown in FIG. 32.

The judgment is made on whether or not the first and second housings 52 and 53 are further rotated by an angle of 360 degrees with respect to each other. When the first and second housings 52 and 53 are further rotated by an angle of 360 degrees with respect to each other, the system control unit 21 records the audio signal, received from the radio station, in the memory unit 25 or the memory card 34, or automatically connects to the Internet to record the audio signal, received from the radio station, to the internet server.

The pivotal control key 56b is not essential for the radio function. In other words, the sub-operating unit 57 may have only a pivotal control key 56a without the pivotal control key 56b. When the pivotal control key 56a is operated by the user in this case, the volume is turned up with the liquid crystal screen 5 being rotated by an angle of 45 degrees with respect to the operating unit 6 in the clockwise direction. On the other hand, the volume is turned down with the liquid crystal screen 5 being rotated by an angle of 45 degrees with respect to the operating unit 6 in the counterclockwise direction.

The pivotal control key 56a is not essential for the radio function. In other words, the sub-operating unit 57 may have only a pivotal control key 56b without the pivotal control key 56a. When the pivotal control key 56b is held down for over a second in this case, the volume is turned up with the liquid crystal screen 5 being rotated by an angle of 45 degrees with respect to the operating unit 6 in the clockwise direction. On the other hand, the volume is turned down with the liquid crystal screen 5 being rotated by an angle of 45 degrees with respect to the operating unit 6 in the counterclockwise direction.

The judgment is made (in the step S154) on whether or not the incoming phone call is being detected in the radio mode. When the incoming phone call is being detected in the radio mode, the judgment is made (in the step S155) on whether or not the liquid crystal screen 5 and the operating unit 6 are in non-twisted relationship with each other. When the liquid crystal screen 5 and the operating unit 6 are in non-twisted relationship with each other, the cellular phone 51 assumes the telephone mode to allows the user to receive the phone call (in the step S156).

From the above detail description, it will be understood that the cellular phone 51 according to the fourth embodiment of the present invention can easily switch between the telephone mode and the radio mode with an enhanced operationality.

Fifth Embodiment

Referring now to the drawings, in particular to FIGS. 24, 33 to 35, there is shown a fifth embodiment of the mobile communication apparatus according to the present invention. The elements of the fifth embodiment of the mobile communication apparatus the same as those of the first embodiment of the mobile communication apparatus will not be described but bear the same reference numerals as those of the first embodiment of the mobile communication apparatus.

The cellular phone 51 has, as an additional function, a television function. As shown in FIG. 33, the cellular phone 51 comprises a sub-operating unit 57 for selectively issuing instructions to the system control unit 21 in the television mode. The sub-operating unit 57 is provided on a rear surface of the second housing 53 to have control keys 57a to 57c. When the control key 57a is operated by an user, the sub-operating unit 57 is operative to issue an instruction to the system control unit 21 to selectively tune in on stations. When the control key 57b is operated by the user, the sub-operating unit 57 is operative to issue an instruction to the system control unit 21 to turn up the volume. When the control key 57c is operated by the user, the sub-operating unit 57 is operative to issue an instruction to the system control unit 21 to turn down the volume.

FIG. 24 is a block diagram showing the cellular phone 51. As shown in FIG. 24, the cellular phone 51 further comprises rotation angle detecting means 35 for detecting the rotation angle of the first housings 52 with respect to the second housing 53 to output a signal indicative of the rotation angle of the first hosing 52 when the first housings 52 is rotated with respect to the second housing 53.

Figure 34:
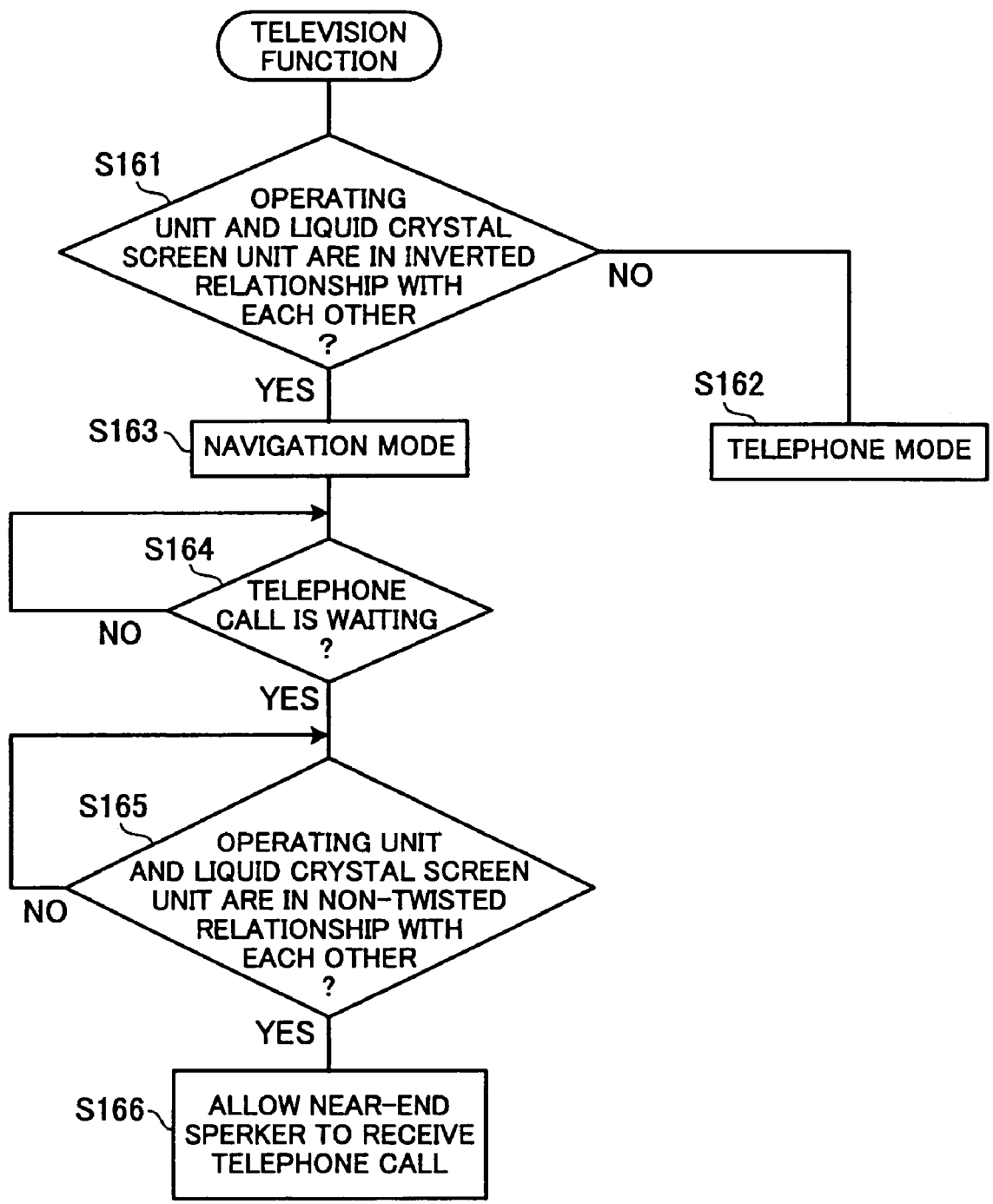
FIG. 34 is a flowchart showing an operation in the television mode of the cellular phone according to the fifth embodiment of the present invention.

The television function of the cellular phone 51 according to the fifth embodiment of the present invention will be described hereinafter with reference to FIG. 34. The judgment is firstly made (in the step S161) on whether or not the liquid crystal screen 5 and the operating unit 6 are in inverted relationship with each other. When the liquid crystal screen 5 and the operating unit 6 are in non-twisted relationship with each other, the cellular phone 51 assumes a telephone mode, without assuming the television mode, to allow a user to receive a phone call, or to make a phone call (in the step S162).

Figure 35:
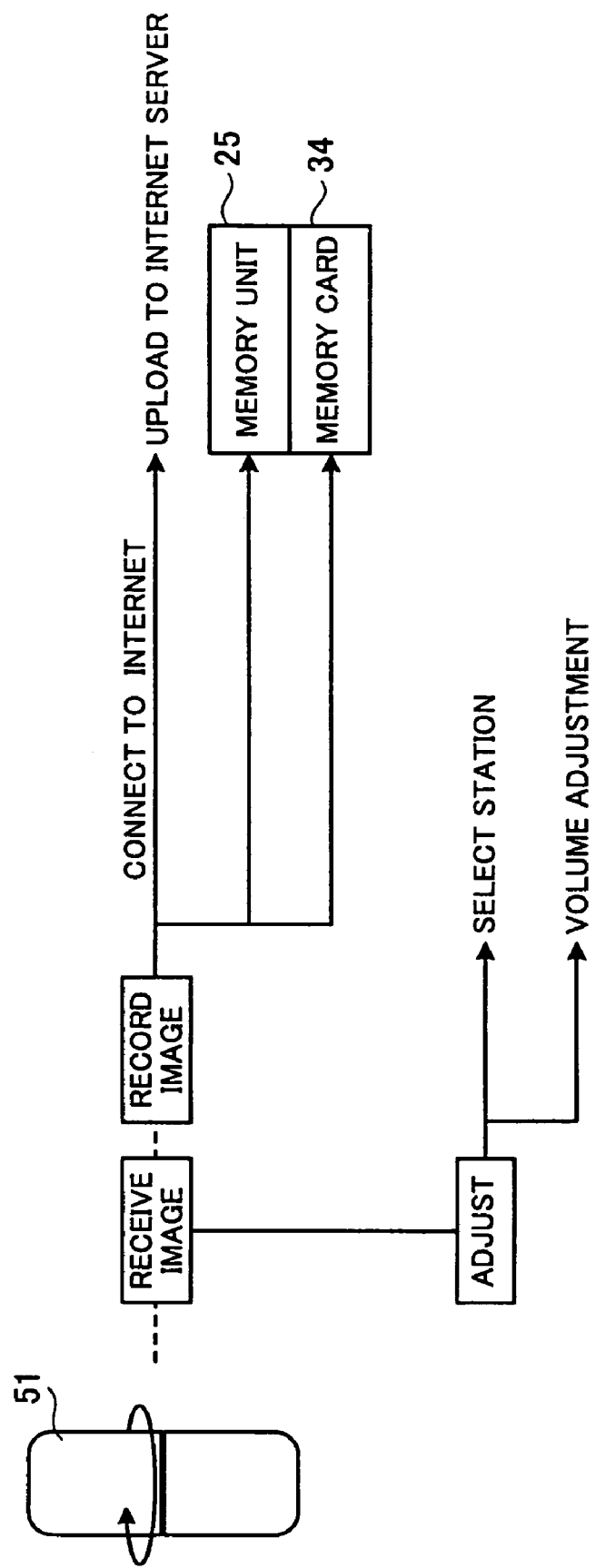
FIG. 35 is a schematic view showing available functions in the television mode of the cellular phone according to the fifth embodiment of the present invention.

When the liquid crystal screen 5 and the operating unit 6 are in inverted relationship with each other, in other words, the sub-operating unit 57 and the liquid crystal screen 5 are in non-inverted relationship with each other, the cellular phone 51 assumes the television mode (in the step S163). As shown in FIG. 35, the image component of the broadcasting signal is displayed on the liquid crystal screen 5, the sound component of the broadcasting signal being outputted through the speaker unit 7.

When, on the other hand, the first housing 2 is rotated by an angle of 360 degrees with respect to the second housing 3, the broadcasting signal is recorded in the memory unit 25 or the memory card 34. Here, the broadcasting signal may be recorded in the internet server after the cellular phone 51 is automatically connected to the Internet.

The control keys 57*b* and 57*c* are not essential for the television function. In other words, the sub-operating unit 57 may have a control key 57*c* without the control keys 57*b* and 57*c*. When the control key 57*c* is pushed by the user in this case, the volume is turned up with the rotation angle of the liquid crystal screen 5 being rotated by an angle of 45 degrees with respect to the operating unit 6 in the clockwise direction. On the other hand, the volume is turned down with the rotation angle of the liquid crystal screen 5 being rotated by an angle of 45 degrees with respect to the operating unit 6 in the counterclockwise direction.

The control key 57*a* is not essential for the television function. In other words, the sub-operating unit 57 may have control keys 57*b* and 57*c* without the control key 57*a*. When one of the control keys 57*b* and 57*c* is held down for over a second in this case, the volume is turned up with the liquid crystal screen 5 being rotated by an angle of 45 degrees with respect to the operating unit 6 in the clockwise direction. On the other hand, the volume is turned down with the liquid crystal screen 5 being rotated by an angle of 45 degrees with respect to the operating unit 6 in the counterclockwise direction.

The judgment is made (in the step S164) on whether or not the incoming phone call is being detected in the television mode. When the incoming phone call is being detected in the television mode, the judgment is made (in the step S165) on whether or not the liquid crystal screen 5 and the operating unit 6 are in non-twisted relationship with each other. When the liquid crystal screen 5 and the operating unit 6 are in non-twisted relationship with each other, the cellular phone 51 assumes the telephone mode to allows the user to receive the phone call (in the step S166).

From the above detail description, it will be understood that the cellular phone 51 according to the fifth embodiment of the present invention can easily switch between the telephone mode and the television mode with an enhanced operationality.

Sixth Embodiment

Referring now to the drawings, in particular to FIGS. 24, 36 to 38, there is shown a sixth embodiment of the mobile communication apparatus according to the present invention. The elements of the sixth embodiment of the mobile communication apparatus the same as those of the first embodiment of the mobile communication apparatus will not be described but bear the same reference numerals as those of the first embodiment of the mobile communication apparatus.

The cellular phone 51 is operative to assume, as an additional function, a video function. The cellular phone 51 comprises a sub-operating unit 58 for selectively issuing instructions to the system control unit 21. As shown in FIG. 36, the sub-operating unit 58 is provided on a rear surface of the second housing 53 to have control keys 58*a* to 58*c*. The sub-operating unit 58 is provided on a rear surface of the second housing 53 to have control keys 58*a* to 58*d*. When the control key 58*a* is operated by the user, the sub-operating unit 58 is operative to selectively issue "reproduction", "stop", "fast-forward", and "fast-rewind" instructions. When the control key 58*b* is operated by the user, the sub-operating unit 58 is operative to issue an instruction to record the video. When the control key 58*c* is operated by the user, the sub-operating unit 58 is operative to issue an instruction to turn up the volume. When the control key 58*d* is operated by the user, the sub-operating unit 58 is operative to issue an instruction to turn down the volume.

FIG. 24 is a block diagram showing the cellular phone 51 according to the sixth embodiment of the present invention. As shown in FIG. 24, the cellular phone 51 further comprises rotation angle detecting means 35 for detecting the rotation angle of the first housings 52 to output a signal indicative of the rotation angle of the first hosing 52 when the first housings 52 is rotated with respect to the second housing 53.

Figure 37:
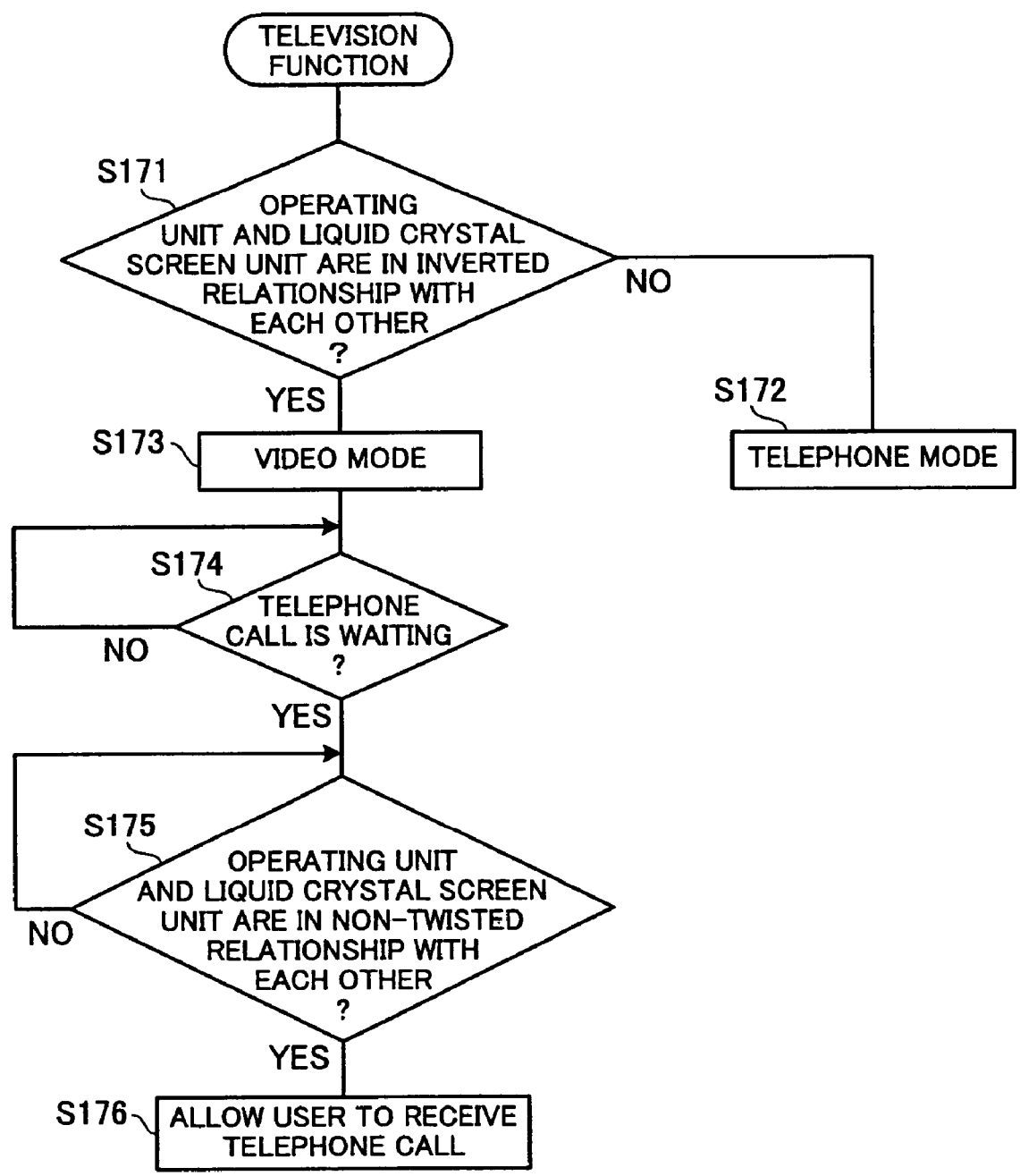
FIG. 37 is a flowchart showing an operation in the video mode of the cellular phone according to the sixth embodiment of the present invention.
Figure 38:
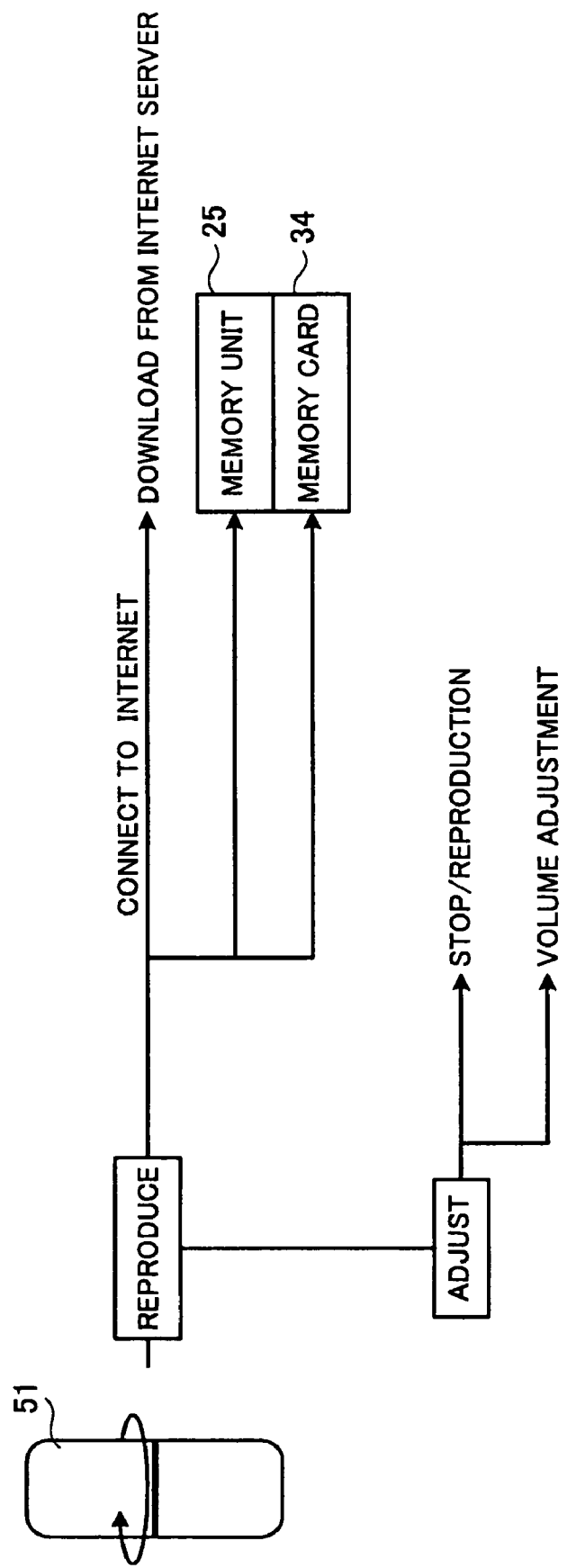
FIG. 38 is a schematic view showing available functions in the video mode of the cellular phone according to the sixth embodiment of the present invention.

The video function of the cellular phone 51 according to the sixth embodiment of the present invention will be described hereinafter with reference to FIG. 37. As shown in FIG. 37, the judgment is firstly made (in the step S171) on whether or not the liquid crystal screen 5 and the operating unit 6 are in inverted relationship with each other. When the liquid crystal screen 5 and the operating unit 6 are in non-twisted relationship with each other, the cellular phone 51 assumes a telephone mode, without assuming a video mode, to allow a user to receive a phone call, or to make a phone call (in the step S172).

When the liquid crystal screen 5 and the operating unit 6 are in inverted relationship with each other, in other words, the sub-operating unit 58 and the liquid crystal screen 5 are in non-inverted relationship with each other, the cellular phone 51 assumes the video mode (in the step S173) to be automatically connected to the internet server through the Internet to reproduce a video, such as for example a movie and a music, through the Internet, or to reproduce a video represented by the video data stored in the memory unit 25 or the memory card 34, to display an image on the liquid crystal screen 5, and to output a sound through the speaker unit 7.

When the control keys are selectively operated by the user, the sub-operating unit 58 is operative to selectively issue "reproduction" and "stop" instructions to reproduce or stop reproducing the video. However, the cellular phone 51 may be operative to reproduce or stop reproducing the video, and to turn up the volume or turn down the volume with the liquid crystal screen 5 being rotated by an angle of 45 degrees with respect to the operating unit 6 in the clockwise direction or in the counterclockwise direction.

When one of the control keys 58*b* and 58*c* is held down for over a second in this case, the reproduction of the video fails to be performed in response to the rotation angle of the liquid crystal screen 5 being rotated by an angle of 180 degrees with respect to the operating unit 6 in the clockwise direction. On the other hand, the reproduction of the video is performed in response to the rotation angle of the liquid crystal screen 5 being rotated by an angle of 180 degrees with respect to the operating unit 6 in the counterclockwise direction.

The control keys 58c and 58d are not essential for the video function. In other words, the sub-operating unit 57 may have control keys 58a and 58b without the control keys 58c and 58d. When the control key 58a is pushed by the user in this case, the volume is turned up with the liquid crystal screen 5 being rotated by an angle of 45 degrees with respect to the operating unit 6 in the clockwise direction. On the other hand, the volume is turned down with the liquid crystal screen 5 being rotated by an angle of 45 degrees with respect to the operating unit 6 in the counterclockwise direction.

The judgment is made (in the step S174) on whether or not the incoming phone call is being detected in the video mode. When the incoming phone call is being detected in the video mode, the judgment is made (in the step S175) on whether or not the liquid crystal screen 5 and the operating unit 6 are in non-twisted relationship with each other. When the liquid crystal screen 5 and the operating unit 6 are in non-twisted relationship with each other, the cellular phone 51 assumes the telephone mode to allows the user to receive the phone call (in the step S176).

From the above detail description, it will be understood that the cellular phone 51 according to the sixth embodiment of the present invention can easily switch between the telephone mode and the video mode with an enhanced operationality.

Seventh Embodiment

Referring now to the drawings, in particular to FIGS. 24, 39 to 41, there is shown a seventh embodiment of the mobile communication apparatus according to the present invention. The elements of the seventh embodiment of the mobile communication apparatus the same as those of the first embodiment of the mobile communication apparatus will not be described but bear the same reference numerals as those of the first embodiment of the mobile communication apparatus.

The cellular phone 51 has, as a predetermined additional function, a navigation function to function as a navigation apparatus. The cellular phone 51 comprises a sub-operating unit 59 for selectively issuing instructions to the system control unit 21. As shown in FIG. 39, the sub-operating unit 59 is provided on a rear surface of the second housing 53 to have a control key 59a, a determination key 59b, and a plurality of function keys 59c. When one of the function keys 59c is operated by the user, the sub-operating unit 59 may be operative to issue an instruction to the system control unit 21 to zoom-in or zoom out the map displayed on the screen, or to indicate the travelling direction.

FIG. 24 is a block diagram showing the cellular phone 51. As shown in FIG. 24, the cellular phone 51 further comprises rotation angle detecting means 35 for detecting the rotation angle of the first housings 52 to output a signal indicative of the rotation angle of the first hosing 52 when the first housings 52 is rotated with respect to the second housing 53.

Figure 40:
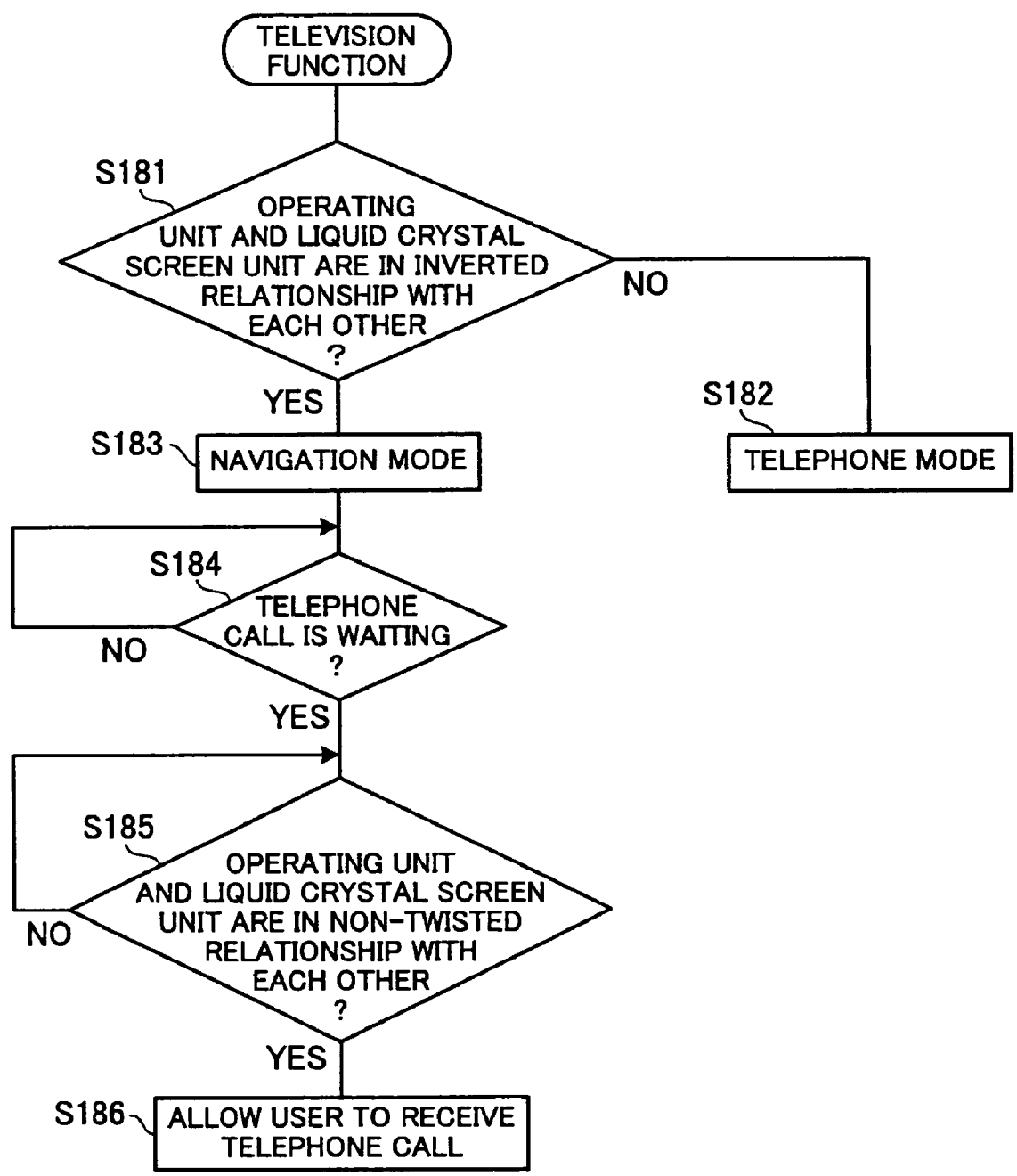
FIG. 40 is a flowchart showing an operation in the navigation mode of the cellular phone according to the seventh embodiment of the present invention.

The navigation function of the cellular phone 51 according to the seventh embodiment of the present invention will be described hereinafter with reference to FIG. 40. As shown in FIG. 40, the judgment is firstly made (in the step S181) on whether or not the liquid crystal screen 5 and the operating unit 6 are in inverted relationship with each other. When the liquid crystal screen 5 and the operating unit 6 are in non-twisted relationship with each other, the cellular phone 51 assumes a telephone mode, without assuming a navigation mode, to allow a user to receive a phone call, or to make a phone call (in the step S182).

When, on the other hand, the liquid crystal screen 5 and the operating unit 6 are in inverted relationship with each other, the cellular phone 51 assumes the navigation mode (in the step S183).

Figure 41:
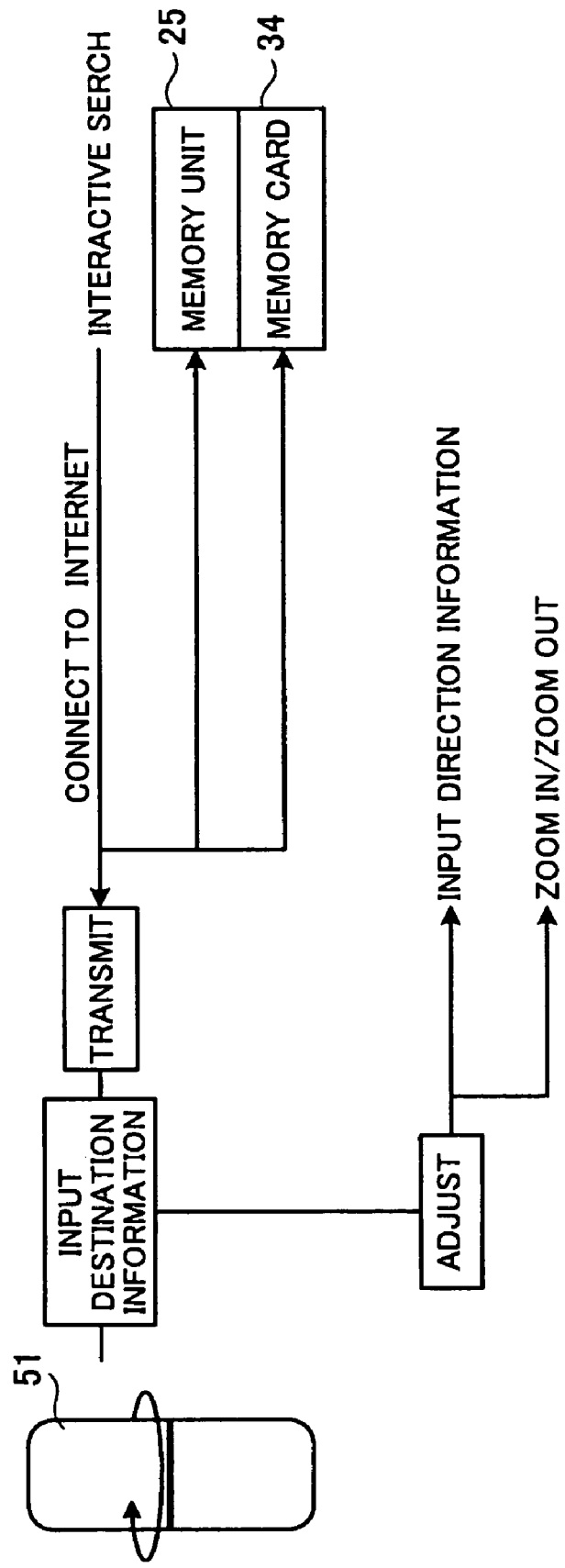
FIG. 41 is a schematic view showing available functions in the navigation mode of the cellular phone according to the seventh embodiment of the present invention.

As shown in FIG. 41, the destination information is firstly inputted thought the sub-operating unit 59. The judgments are then made on whether or not the retrieval key is then pushed by the user, on whether or not the liquid crystal screen 5 and the operating unit 6 are in non-twisted relationship with each other, and on whether or not the liquid crystal screen 5 is rotated by an angle of 360 degrees with respect to the operating unit 6. When the liquid crystal screen 5 is rotated by an angle of 360 degrees with respect to the operating unit 6, the cellular phone 51 is automatically connected to the Internet to receive the map information from the internet server. The map represented by the map information received from the internet server and the route information is then displayed on the liquid crystal screen 5 on the basis of the destination information and the current position detected by the GPS sensor.

The direction key is not essential for the navigation function. The rightward direction indicating instruction may be issued in response to the rotation angle of the liquid crystal screen 5 being rotated by an angle of 360 degrees with respect to the operating unit 6 in the clockwise direction. On the other hand, the leftward direction indicating instruction may be issued in response to the rotation angle of the liquid crystal screen 5 being rotated by an angle of 360 degrees with respect to the operating unit 6 in the counterclockwise direction. The zoom-in and zoom-out keys are not essential for the navigation function. The zoom-in instruction may be issued with the liquid crystal screen 5 being rotated by an angle of 45 degrees with respect to the operating unit 6 in the clockwise direction. On the other hand, the zoom-out instruction may be issued with the liquid crystal screen 5 being rotated by an angle of 360 degrees with respect to the operating unit 6 in the counterclockwise direction.

The judgment is made (in the step S184) on whether or not the incoming phone call is being detected in the navigation mode. When the incoming phone call is being detected in the navigation mode, the judgment is made (in the step S185) on whether or not the liquid crystal screen 5 and the operating unit 6 are in non-twisted relationship with each other. When the liquid crystal screen 5 and the operating unit 6 are in non-twisted relationship with each other, the cellular phone 51 assumes the telephone mode to allows the user to receive the phone call (in the step S186).

From the above detail description, it will be understood that the cellular phone 51 according to the seventh embodiment of the present invention can easily switch between the telephone mode and the navigation mode with an enhanced operationality.

Eighth Embodiment

Referring now to the drawings, in particular to FIGS. 24, 42 to 44, there is shown an eighth embodiment of the mobile communication apparatus according to the present invention. The elements of the eighth embodiment of the mobile communication apparatus the same as those of the first embodiment of the mobile communication apparatus will not be described but bear the same reference numerals as those of the first embodiment of the mobile communication apparatus.

The cellular phone 51 has, as an additional function 61 shown in FIG. 24, a user authentication function. The cellular phone 51 comprises a sub-operating unit 60 for selectively issuing instructions to the system control unit 21. As shown in FIG. 42, the sub-operating unit 60 is provided on a rear surface of the second housing 53 to have an identify key 60a.

The judgment is made on whether or not the liquid crystal screen 5 and the operating unit 6 are in inverted relationship with each other on the basis of the signal outputted by the rotation angle detecting means 35. When the liquid crystal screen 5 and the operating unit 6 are in inverted relationship with each other, the image of the user's iris is taken by the camera unit 26, and compared by the system control unit 21 with the owner's biometric data stored in the memory unit 25, the memory card 34, or the internet server. The cellular phone 51 is operative to allow the user to receive the personal information from the internet server through the Internet when the user is authenticated as the owner on the basis of the comparison of the user's iris.

Figure 43:
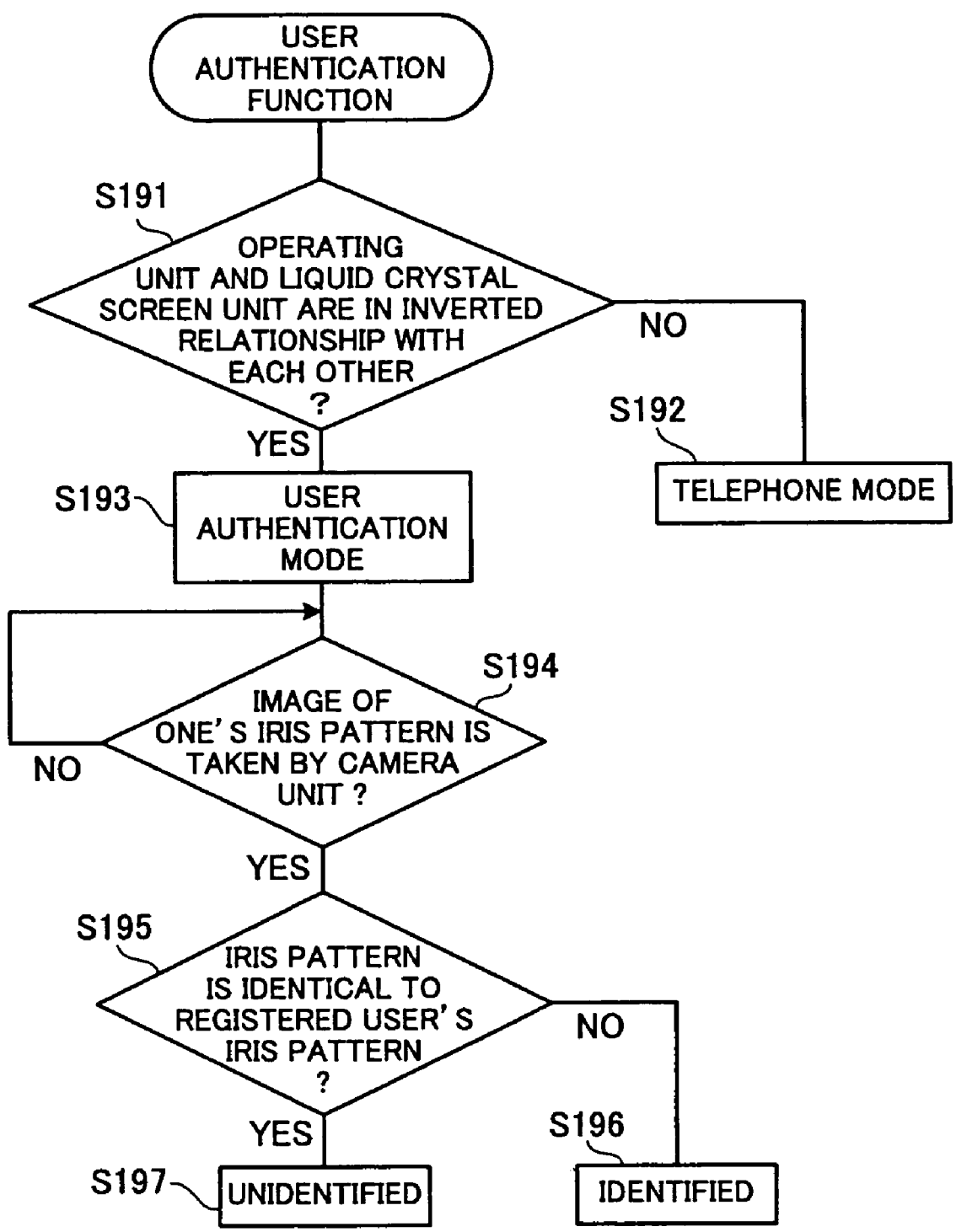
FIG. 43 is a flowchart showing an operation in the user authentication mode of the cellular phone according to the eighth embodiment of the present invention.
Figure 44:
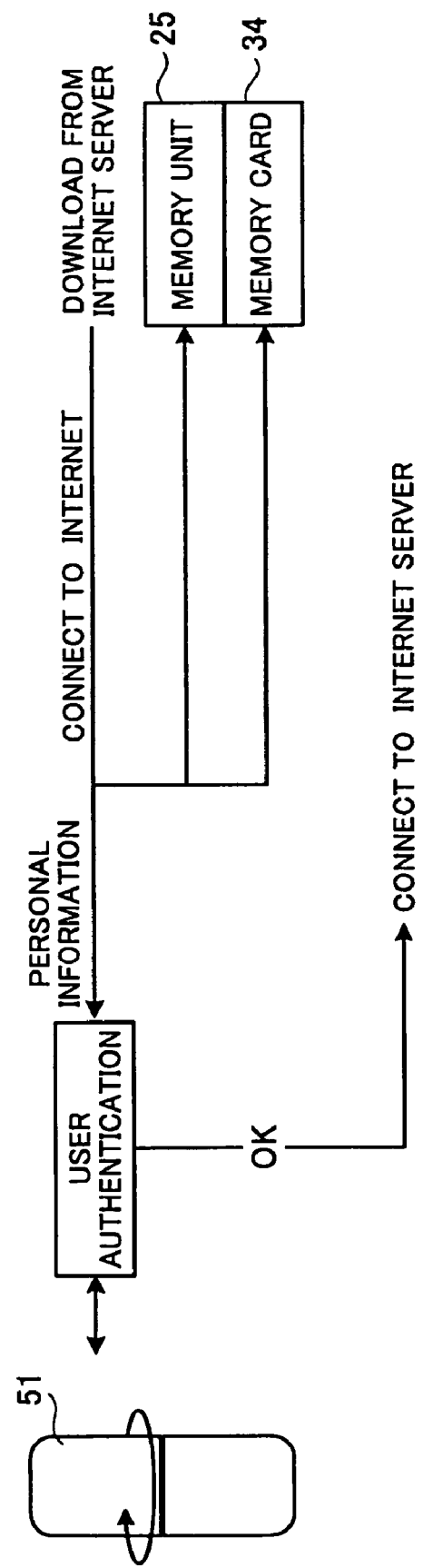
FIG. 44 is a schematic view showing available functions in the user authentication mode of the cellular phone according to the eighth embodiment of the present invention.

The user authentication function of the cellular phone 51 according to the eighth embodiment of the present invention will be described hereinafter with reference to FIG. 43. The judgment is firstly made (in the step S191) on whether or not the liquid crystal screen 5 and the operating unit 6 are in inverted relationship with each other. When the liquid crystal screen 5 and the operating unit 6 are in non-twisted relationship with each other, the cellular phone 51 assumes a telephone mode, without assuming a user authentication mode, to allow a user to receive a phone call, or to make a phone call (in the step S192).

When, on the other hand, the liquid crystal screen 5 and the operating unit 6 are in inverted relationship with each other, in other words, the liquid crystal screen 5 and each of the sub-operating unit 60 and the camera unit 26 are in inverted relationship with each other, the cellular phone 51 assumes the user authentication mode (in the step S193).

In the user authentication mode, the judgment is made (in the step S194) on whether or not the image of the user's iris is taken by the camera unit 26. When the image of the user's iris is taken by the camera unit 26, the verification of the image of the user's iris is performed on the basis of the image data registered as an owner's iris, and stored in the memory unit 25, the memory card 34, or the internet server. The judgment is then made (in the step S195) whether or not the user is identical to the owner on the basis of the verification of the image of the user's iris.

When the user is not identical to the owner on the basis of the verification of the image of the user's iris, the user is not identified (in the step S196). When, on the other hand, the user is identical to the owner on the basis of the verification of the image of the user's iris, the user is identified (in the step S197). When the identify key 60a is pushed by the user, the cellular phone 51 is connected to the internet server to allow the user to receive personal information from the internet server.

From the above detail description, it will be understood that the cellular phone 51 according to the eighth embodiment of the present invention can easily switch between the telephone mode and the user authentication mode with an enhanced operationality.

Ninth Embodiment

Referring now to the drawings, in particular to FIGS. 24, 42, 45, and 46, there is shown a ninth embodiment of the mobile communication apparatus according to the present invention. The elements of the ninth embodiment of the mobile communication apparatus the same as those of the first embodiment of the mobile communication apparatus will not be described but bear the same reference numerals as those of the first embodiment of the mobile communication apparatus.

The cellular phone 51 has, as an additional function 61 shown in FIG. 24, a user authentication function to input a user's secret number in response to the shaft rotation of the liquid crystal screen 45 with respect to the operating unit 6.

In this embodiment, the shaft rotation and the rotation direction detected by the rotation angle detecting means 35 is previously stored as the user's secret number in the memory unit 25 or the memory card 34.

When the cellular phone 51 is connected to the Internet, the secret number is inputted in response to the shaft rotation of the liquid crystal screen 45 with respect to the operating unit 6. The judgment is then made on whether or not to allow the user to utilize the Internet on the basis of the inputted secret number. In other words, the cellular phone 51 can be utilized as an integrated circuit card (IC card).

The user authentication function of the cellular phone 51 according to the ninth embodiment of the present invention will be described hereinafter with reference to FIG. 45. In one method of inputting the secret number, the judgment is firstly made on whether or not the operating unit 6 and the liquid crystal screen 45 are in inverted relationship with each other. When the operating unit 6 and the liquid crystal screen 45 are in inverted relationship with each other, the secret number is inputted in such a manner that the liquid crystal screen 45 is rotated by "n" cycles with respect to the operating unit 6 in one of the clockwise and counterclockwise directions, and then rotated by "m" cycles with respect to the operating unit 6 in the other of the clockwise and counterclockwise directions. The control key 6b is then pushed when the rotation number and the rotation direction of the liquid crystal screen 45 with respect to the operating unit 6 are arbitrarily determined.

As the other method of inputting the secret number, the judgment is firstly made on whether or not the operating unit 6 and the liquid crystal screen 45 are in inverted relationship with each other. When the operating unit 6 and the liquid crystal screen 45 are in inverted relationship with each other, the secret number is inputted in such a manner that the liquid crystal screen 45 is rotated by "n" degrees with respect to the operating unit 6 in one of the clockwise and counterclockwise directions, the liquid crystal screen 45 being then rotated by "n" degrees with respect to the operating unit 6 in the other of the clockwise and counterclockwise directions. The control key 6b is then pushed when the rotation angle and the rotation direction of the liquid crystal screen 45 with respect to the operating unit 6 are arbitrarily determined.

The rotation number and the rotation direction, or the rotation angle and the rotation direction are stored as the secret number in the memory unit 25 or the memory card 34 on the basis of the signal outputted by the rotation angle detecting means 35.

Figure 45:
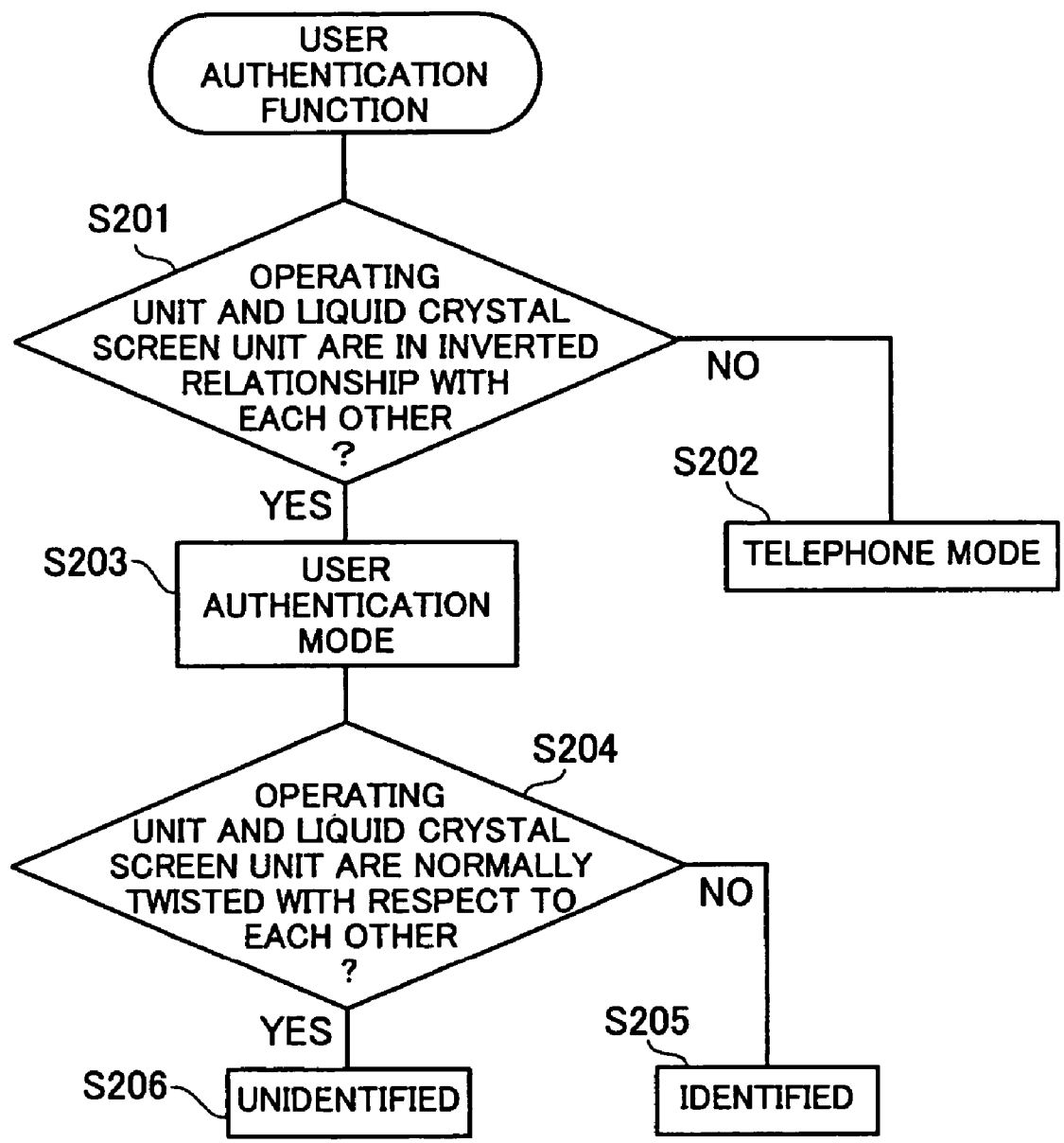
FIG. 45 is a flowchart showing an operation in the user authentication mode of the cellular phone according to the ninth embodiment of the present invention.

As shown in FIG. 45, the judgment is firstly made (in the step S201) on whether or not the liquid crystal screen 5 and the operating unit 6 are in inverted relationship with each other. When the liquid crystal screen 5 and the operating unit 6 are in non-twisted relationship with each other, the cellular phone 51 assumes a telephone mode, without assuming a user authentication mode, to allow a user to receive a phone call, or to make a phone call (in the step S202).

When, on the other hand, the liquid crystal screen 5 and the operating unit 6 are in inverted relationship with each other, in other words, the sub-operating unit 60 and the liquid crystal screen 5 are in non-twisted relationship with each other, the cellular phone 51 assumes the user authentication mode (in the step S203). Here, this rotation positions of the sub-operating unit 60 and the liquid crystal screen 5 collectively define an origin point. The cellular phone 51 assumes the standby mode until the secret number is inputted.

When the rotation number and the rotation direction, or the rotation degrees and the rotation direction are inputted as the secret number, the rotation number and the rotation direction, or the rotation degrees and the rotation direction inputted as the secret number are compared with the rotation number and the rotation direction, or the rotation degrees and the rotation direction registered as the secret number in the memory unit 25 or the memory card 34. The judgment is then made (in the step S204) on whether or not the secret number is rightly inputted in response to the shaft rotation of the liquid crystal screen 45 with respect to the operating unit 6.

Figure 46:
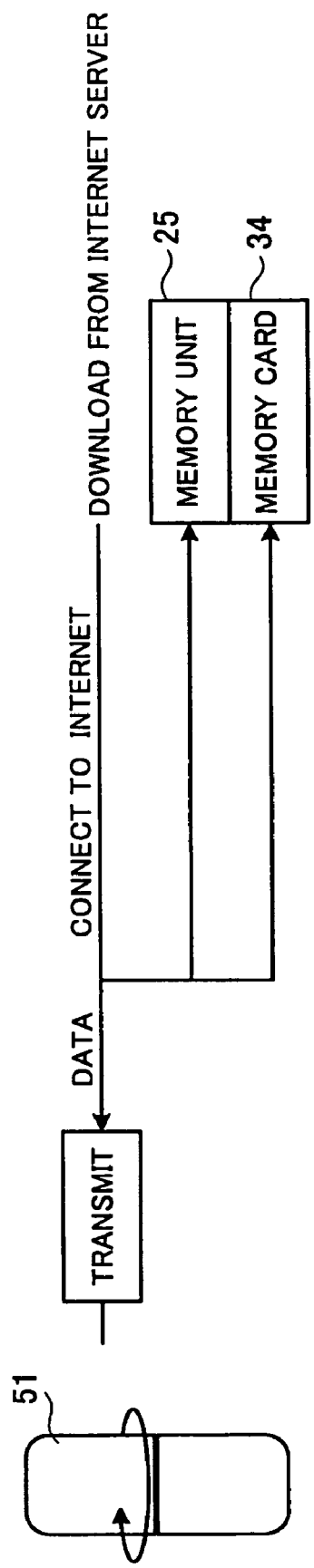
FIG. 46 is a schematic view showing available functions in the user authentication mode of the cellular phone according to the ninth embodiment of the present invention.

When the secret number is wrongly inputted in response to the shaft rotation of the liquid crystal screen 45 with respect to the operating unit 6, the user is not identified (in the step S205). When, on the other hand, the secret number is rightly inputted in response to the shaft rotation of the liquid crystal screen 45 with respect to the operating unit 6, the user is identified (in the step S205). When the identify key 60a is pushed by the user, the cellular phone 51 performs communication with the internet server to allow the user to receive personal information from the internet server as shown in FIG. 46. Here, the cellular phone 51 may performs communication with a cash dispenser installed in the bank, or an automatically lockable door.

From the above detail description, it will be understood that the cellular phone 51 according to the ninth embodiment of the present invention can easily switch to each of the telephone mode and the user authentication mode with an enhanced operationality.

Tenth Embodiment

Referring now to the drawings, in particular to FIGS. 24, 47 to 49, there is shown a tenth embodiment of the mobile communication apparatus according to the present invention. The elements of the tenth embodiment of the mobile communication apparatus the same as those of the first embodiment of the mobile communication apparatus will not be described but bear the same reference numerals as those of the first embodiment of the mobile communication apparatus.

As shown in FIG. 47, the cellular phone 51 has, as a predetermined additional function 61, a backup function. The cellular phone 51 comprises a sub-operating unit 62 for selectively issuing instructions to the system control unit 21. The sub-operating unit 62 is provided on a rear surface of the second housing 53 to have a control key 62a and a save key 62b.

FIG. 24 is a block diagram showing the cellular phone 51. As shown in FIG. 24, the cellular phone 51 further comprises rotation angle detecting means 35 for detecting the rotation angle of the first housings 52 to output a signal indicative of the rotation angle of the first hosing 52 when the first housings 52 is rotated with respect to the second housing 53.

Figure 48:
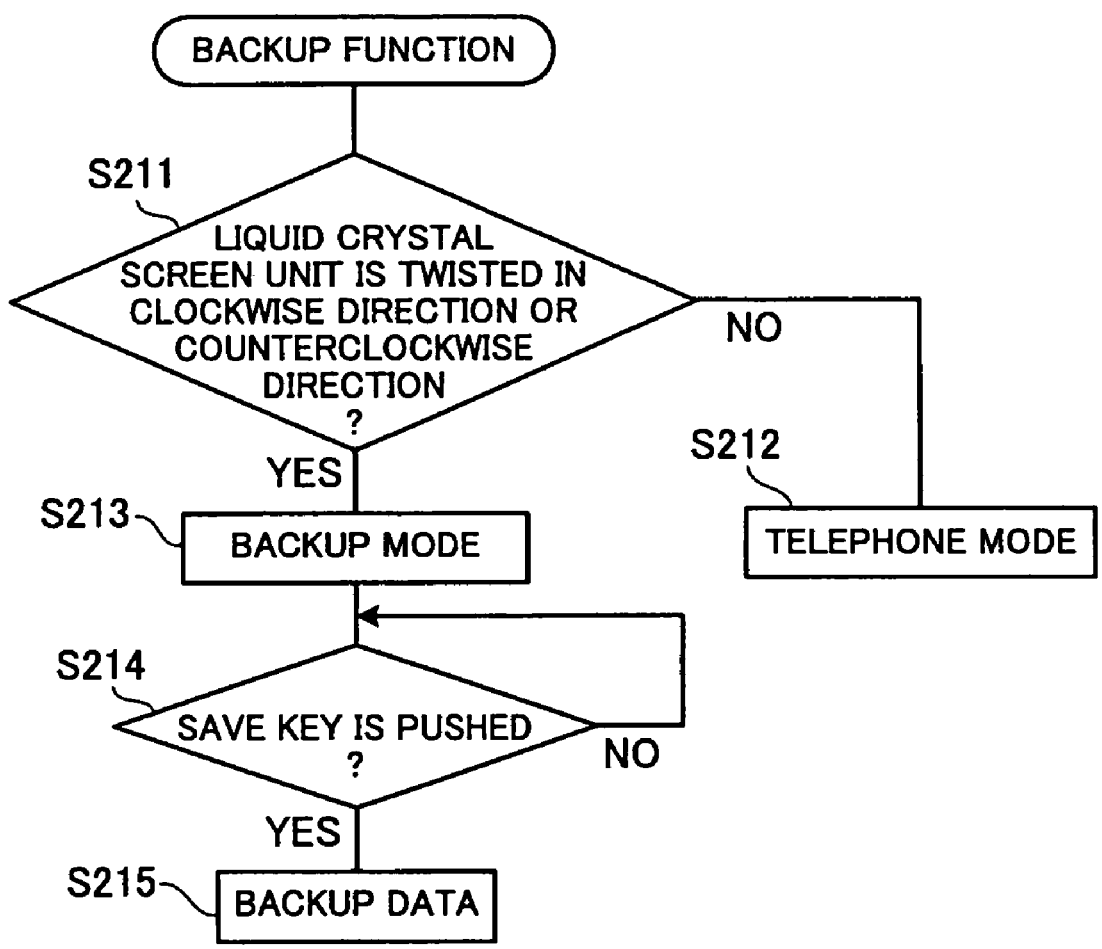
FIG. 48 is a flowchart showing an operation in the backup mode of the cellular phone according to the tenth embodiment of the present invention.

The backup function of the cellular phone 51 according to the tenth embodiment of the present invention will be described hereinafter with reference to FIG. 48. The judgment is firstly made (in the step S211) on whether or not the liquid crystal screen 5 and the operating unit 6 are in inverted relationship with each other. When the liquid crystal screen 5 and the operating unit 6 are in non-twisted relationship with each other, the cellular phone 51 assumes a telephone mode, without assuming a backup mode, to allow a user to receive a phone call, or to make a phone call (in the step S212).

When, on the other hand, the liquid crystal screen 5 and the operating unit 6 are in inverted relationship with each other, in other words, the sub-operating unit 62 and the liquid crystal screen 5 are in non-twisted relationship with each other, the cellular phone 51 assumes the backup mode (in the step S213).

The backup data is then selected by the control key 62a in this backup mode. The judgment is then made (in the step S214) on whether or not the save key 62b is pushed by the user. When the save key 62b is pushed by the user, the backup data is stored in the memory unit 62, the memory card 34. or the internet server.

The judgment is made on whether or not the incoming phone call is being detected in the backup mode. When the incoming phone call is being detected in the backup mode, the judgment is made on whether or not the liquid crystal screen 5 and the operating unit 6 are in non-twisted relationship with each other as a result of the fact that the liquid crystal screen 5 is rotated by an angle of 180 degrees with respect to the operating unit 6. When the liquid crystal screen 5 and the operating unit 6 are in non-twisted relationship with each other, the cellular phone 51 may assume the telephone mode to allows the user to receive the phone call by temporally failing to assume the backup mode. When the backup data is being stored in the memory unit 62, the memory card 34. or the internet server, the cellular phone 51 may start to assume the telephone mode after completing the backup operation.

From the above detail description, it will be understood that the cellular phone 51 according to the tenth embodiment of the present invention can easily switch to each of the telephone mode and the backup mode with an enhanced operationality.

In each of the first to tenth embodiments, the cellular phone 1 or 51 comprises a body divided into two housings along a lateral direction perpendicular to the rotation axis. Here, the body may be divided into three or more housings along a lateral direction substantially perpendicular to the rotation axis, the housings being rotatably connected by the rotating means. When the divided housings are rotated in the clockwise direction or in the counterclockwise direction, the cellular phone 1 or 51 may selectively assume the operation modes in response to the rotation positions of the housings.

INDUSTRIAL APPLICABILITY OF THE PRESENT INVENTION

As will be seen from the foregoing detail description, the cellular phone according to the present invention can easily and selectively assume the operation modes in response to the rotation position of one of the housings rotated through the rotating means with respect to the other of the housings with an enhanced operationality.

What is claimed is:

1. A mobile communication apparatus having a longitudinal axis, and having operation modes, comprising:
   first and second housings each having front and rear surfaces and a rotation axis located between said front and rear surfaces,
   displaying means provided on said front surface of said first housing, and adapted to display image data or character data on a screen;
   operating means provided on said front surface of said second housing, and having a plurality of keys to be selectively operated by a user;
   rotating means for connecting said first housing with said second housing, and to allow said first and second housings to be rotated with respect to each other under the condition that said rotation axis of each of said first and second housings is axially aligned with said longitudinal axis;

rotation angle detecting means for detecting a rotation angle and a rotation direction of one of said first and second housings with respect to the other of said first and second housings when said first and second housings are rotated with respect to each other; and setting means for selecting, from among said operation modes, an operation mode corresponding to the combination of said rotation angle and rotation direction detected by said rotation angle detecting means, and setting said selected operation mode to ensure that said mobile communication apparatus assumes said selected operation mode, wherein said operation modes includes a television mode, said mobile communication apparatus is operative to turn the channel on the basis of the combination of said rotation angle and rotation direction detected by said rotation angle detecting means when said first and second housings are further rotated with respect to each other under the condition that said mobile communication apparatus is in said television mode.

2. A mobile communication apparatus having a longitudinal axis, and having operation modes, comprising:

first and second housings each having front and rear surfaces and a rotation axis located between said front and rear surfaces, displaying means provided on said front surface of said first housing, and adapted to display image data or character data on a screen;

operating means provided on said front surface of said second housing, and having a plurality of keys to be selectively operated by a user;

rotating means for connecting said first housing with said second housing, and to allow said first and second housings to be rotated with respect to each other under the condition that said rotation axis of each of said first and second housings is axially aligned with said longitudinal axis;

rotation angle detecting means for detecting a rotation angle and a rotation direction of one of said first and second housings with respect to the other of said first and second housings when said first and second housings are rotated with respect to each other; and setting means for selecting, from among said operation modes, an operation mode corresponding to the combination of said rotation angle and rotation direction detected by said rotation angle detecting means, and setting said selected operation mode to ensure that said mobile communication apparatus assumes said selected operation mode, wherein said operation modes includes a volume adjusting mode, said mobile communication apparatus is operative to change the volume on the basis of the combination of said rotation angle and rotation direction detected by said rotation angle detecting means when said first and second housings are further rotated with respect to each other in said volume adjusting mode.

* * * * *